(12) United States Patent
Oh et al.

(10) Patent No.: US 11,765,387 B2
(45) Date of Patent: Sep. 19, 2023

(54) POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

(71) Applicant: LG Electronics Inc., Seoul (KR)

(72) Inventors: Hyunmook Oh, Seoul (KR); Sejin Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/520,342

(22) Filed: Nov. 5, 2021

(65) Prior Publication Data

US 2022/0174317 A1    Jun. 2, 2022

(30) Foreign Application Priority Data

Nov. 5, 2020 (KR) ........................ 10-2020-0146596

(51) Int. Cl.
*H04N 19/597* (2014.01)
*H04N 19/174* (2014.01)
*H04N 19/70* (2014.01)

(52) U.S. Cl.
CPC ......... *H04N 19/597* (2014.11); *H04N 19/174* (2014.11); *H04N 19/70* (2014.11)

(58) Field of Classification Search
CPC ......... H04L 65/70; H04L 65/75; H04L 65/65; H04L 65/612; H04L 65/80; H04L 67/02; H04L 67/52; H04L 67/10; H04N 19/597; H04N 21/26258; H04N 19/30; H04N 19/70; H04N 21/8456; H04N 21/816; H04N 21/21805; H04N 21/6587

See application file for complete search history.

(56) References Cited

U.S. PATENT DOCUMENTS

| 2004/0066852 | A1* | 4/2004 | MacInnis | ............... | H04N 19/17 |
| | | | | | 375/E7.207 |
| 2010/0316132 | A1* | 12/2010 | MacInnis | ............... | H04N 19/00 |
| | | | | | 375/240.24 |
| 2016/0234498 | A1* | 8/2016 | Misra | ...................... | H04N 19/46 |
| 2016/0353108 | A1* | 12/2016 | Zhang | .................. | H04N 19/139 |
| 2020/0195962 | A1 | 6/2020 | Li et al. | | |
| 2021/0144391 | A1* | 5/2021 | Poirier | ................. | H04N 19/176 |
| 2021/0407147 | A1* | 12/2021 | Flynn | ........................ | G06T 9/40 |
| 2022/0174317 | A1* | 6/2022 | Oh | ........................ | H04N 19/174 |

FOREIGN PATENT DOCUMENTS

| KR | 20190060846 | 6/2019 |
| WO | WO2020011717 | 1/2020 |
| WO | WO2020013661 | 1/2020 |

OTHER PUBLICATIONS

3DG, "G-PCC codec description v8," ISO/IEC JTC1/SC29/WG11 N19525, International Organisation for Standardisation, Jul. 2020, 140 pages.
International Search Report in International Appln. No. PCT/KR2021/016037, dated Feb. 18, 2022, 27 pages (with English translation).

* cited by examiner

*Primary Examiner* — Neil R Mikeska
(74) *Attorney, Agent, or Firm* — Fish & Richardson P.C.

(57) ABSTRACT

Disclosed herein is a method of transmitting point cloud data, including encoding geometry data of point cloud data, encoding attribute data of the point cloud data based on the geometry data, and transmitting the encoded geometry data, the encoded attribute data, and signaling data.

12 Claims, 43 Drawing Sheets

FIG. 6
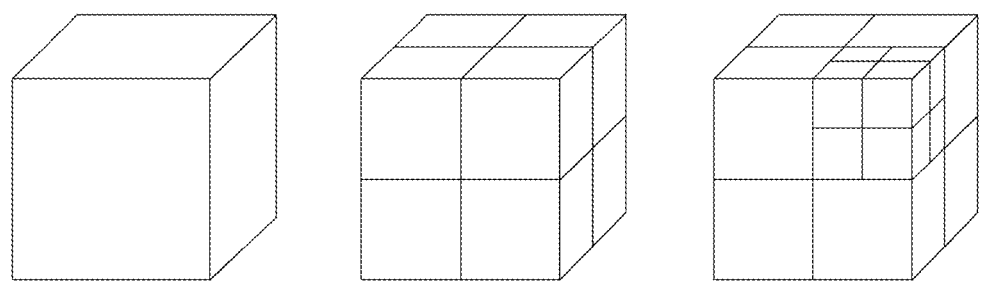
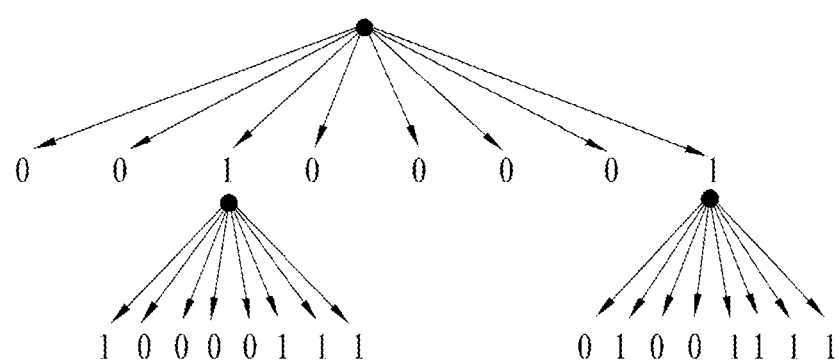

FIG. 7
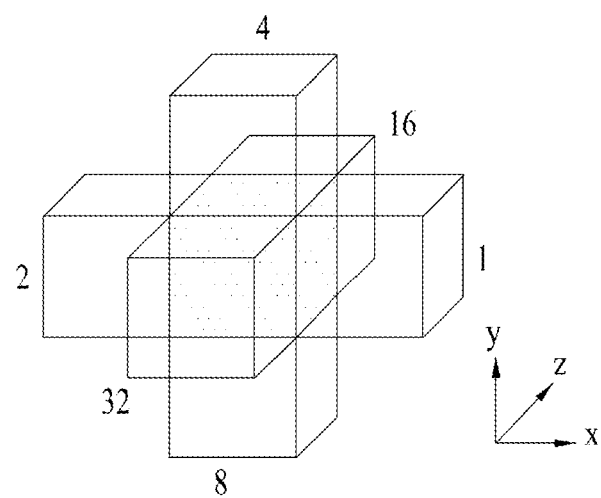
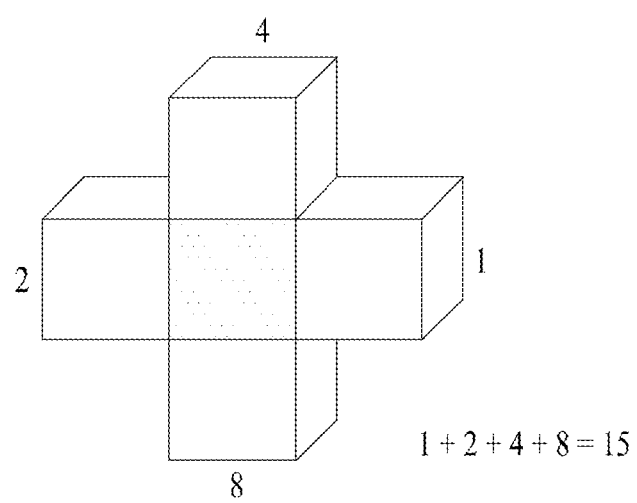
$1 + 2 + 4 + 8 = 15$

FIG. 21

| (a) Geo data | G | slice0 | G | slice1 | G | slice2 |
|---|---|---|---|---|---|---|

| (b) Attr data | A | slice3 | A | slice4 | A | slice5 |
|---|---|---|---|---|---|---|

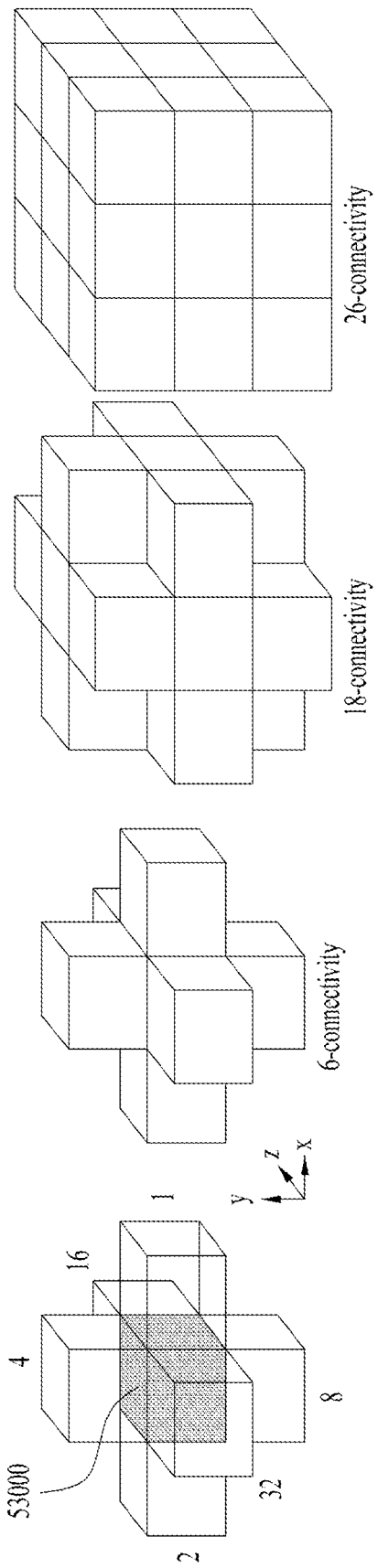

FIG. 28

| seq_parameter_set( ) { | Descriptor |
|---|---|
| main_profile_compatibility_flag | u(1) |
| unique_point_positions_constraint_flag | u(1) |
| level_idc | u(8) |
| sps_seq_parameter_set_id | ue(v) |
| sps_bounding_box_present_flag | u(1) |
| if( sps_bounding_box_present_flag ) { | |
|    sps_bounding_box_offset_x | se(v) |
|    sps_bounding_box_offset_y | se(v) |
|    sps_bounding_box_offset_z | se(v) |
|    sps_bounding_box_offset_log2_scale | ue(v) |
|    sps_bounding_box_size_width | ue(v) |
|    sps_bounding_box_size_height | ue(v) |
|    sps_bounding_box_size_depth | ue(v) |
| } | |
| sps_source_scale_factor_numerator_minus1 | ue(v) |
| sps_source_scale_factor_denominator_minus1 | ue(v) |
| sps_num_attribute_sets | ue(v) |
| for( i = 0; i< sps_num_attribute_sets; i++ ) { | |
|    attribute_dimension_minus1[ i ] | ue(v) |
|    attribute_instance_id[ i ] | ue(v) |
|    if(attribute_dimension_minus1[ i ]>0 ) | |
|      attribute_secondary_bitdepth_minus1[ i ] | ue(v) |
|      attribute_cicp_colour_primaries[ i ] | ue(v) |
|      attribute_cicp_transfer_characteristics[ i ] | ue(v) |
|      attribute_cicp_matrix_coeffs[ i ] | ue(v) |
|      attribute_cicp_video_full_range_flag[ i ] | u(1) |
|    known_attribute_label_flag[ i ] | u(1) |
|    if( known_attribute_label_flag[ i ] ) | |
|      known_attribute_label[ i ] | ue(v) |
|    else | |
|      attribute_label_four_bytes[ i ] | u(32) |
| } | |
| log2_max_frame_idx | u(5) |
| axis_coding_order | u(3) |
| sps_bypass_stream_enabled_flag | u(1) |
| sps_extension_flag | u(1) |
| if( sps_extension_flag ) | |
|    while( more_data_in_byte_stream( ) ) | |
|      sps_extension_data_flag | u(1) |
| byte_alignment( ) | |
| } | |

FIG. 29

| seq_parameter_set( ) { | Descriptor |
|---|---|
| ..... | |
|    sps_entropy_continuation_enabled_flag | u(1) |
| ..... | |
| } | |

FIG. 30

| geometry_parameter_set( ) { | Descriptor |
|---|---|
| gps_geom_parameter_set_id | ue(v) |
| gps_seq_parameter_set_id | ue(v) |
| gps_box_present_flag | u(1) |
| if( gps_box_present_flag ){ | |
| gps_gsh_box_log2_scale_present_flag | u(1) |
| if( gps_gsh_box_log2_scale_present_flag == 0 ) | |
| gps_gsh_box_log2_scale | ue(v) |
| } | |
| unique_geometry_points_flag | u(1) |
| geometry_planar_mode_flag | u(1) |
| if( geometry_planar_mode_flag ){ | |
| geom_planar_mode_th_idcm | ue(v) |
| geom_planar_mode_th[ 1 ] | ue(v) |
| geom_planar_mode_th[ 2 ] | ue(v) |
| } | |
| geometry_angular_mode_flag | u(1) |
| if( geometry_angular_mode_flag ){ | |
| lidar_head_position[0] | se(v) |
| lidar_head_position[1] | se(v) |
| lidar_head_position[2] | se(v) |
| number_lasers | ue(v) |
| for( i = 0; i < number_lasers; i++ ) { | |
| laser_angle[ i ] | se(v) |
| laser_correction[ i ] | se(v) |
| } | |
| planar_buffer_disabled | u(1) |
| implicit_qtbt_angular_max_node_min_dim_log2_to_split_z | se(v) |
| implicit_qtbt_angular_max_diff_to_split_z | se(v) |
| } | |
| neighbour_context_restriction_flag | u(1) |
| inferred_direct_coding_mode_enabled_flag | u(1) |
| bitwise_occupancy_coding_flag | u(1) |
| adjacent_child_contextualization_enabled_flag | u(1) |
| log2_neighbour_avail_boundary | ue(v) |
| log2_intra_pred_max_node_size | ue(v) |
| log2_trisoup_node_size | ue(v) |
| geom_scaling_enabled_flag | u(1) |
| if( geom_scaling_enabled_flag ) | |
| geom_base_qp | ue(v) |
| gps_implicit_geom_partition_flag | u(1) |
| if( gps_implicit_geom_partition_flag ) { | |
| gps_max_num_implicit_qtbt_before_ot | ue(v) |
| gps_min_size_implicit_qtbt | ue(v) |
| } | |
| gps_extension_flag | u(1) |
| if( gps_extension_flag ) | |
| while( more_data_in_byte_stream( ) ) | |
| gps_extension_data_flag | u(1) |
| byte_alignment( ) | |
| } | |

FIG. 31

| geometry_parameter_set( ) { | Descriptor |
|---|---|
| ..... | |
|    geom_slice_segmentation_enabled_flag | u(1) |
| ..... | |
| } | |

FIG. 32

| attribute_parameter_set ( ) { | Descriptor |
|---|---|
|   aps_attr_parameter_set_id | ue(v) |
|   aps_seq_parameter_set_id | ue(v) |
|   attr_coding_type | ue(v) |
|   aps_attr_initial_qp | ue(v) |
|   aps_attr_chroma_qp_offset | se(v) |
|   aps_slice_qp_delta_present_flag | u(1) |
|   LodParametersPresent = ( attr_coding_type == 0 \|\| attr_coding_type == 2 ) ? 1 : 0 | |
|   if ( LodParametersPresent ) { | |
|     lifting_num_pred_nearest_neighbours_minus1 | ue(v) |
|     lifting_search_range_minus1 | ue(v) |
|     for ( k = 0; k < 3; k++ ) | |
|       lifting_neighbour_bias[ k ] | ue(v) |
|     if ( attr_coding_type == 2 ) | |
|       lifting_scalability_enabled_flag | u(1) |
|     if ( ! lifting_scalability_enabled_flag ) { | |
|       lifting_num_detail_levels_minus1<br>[Ed. The V7.0 code use the variable without minus1. It should be aligned] | ue(v) |
|       if ( lifting_num_detail_levels_minus1 > 0 ) { | |
|         lifting_lod_regular_sampling_enabled_flag | u(1) |
|         for ( idx = 0; idx < num_detail_levels_minus1; idx++ ) { | |
|           if ( lifting_lod_regular_sampling_enabled_flag ) | |
|             lifting_sampling_period_minus2[ idx ] | ue(v) |
|           else | |
|             lifting_sampling_distance_squared_scale_minus1[ idx ] | ue(v) |
|           if ( idx != 0 ) | |
|             lifting_sampling_distance_squared_offset[ idx ] | ue(v) |
|         } | |
|       } | |
|     } | |
|     if ( attr_coding_type == 0 ) { | |
|       lifting_adaptive_prediction_threshold | ue(v) |
|       lifting_intra_lod_prediction_num_layers | ue(v) |
|       lifting_max_num_direct_predictors | ue(v) |
|       inter_component_prediction_enabled_flag | u(1) |
|     } | |
|   } | |
|   if ( attribute_coding_type == 1 ) { //RAHT | |
|     raht_prediction_enabled_flag | u(1) |
|     if (raht_prediction_enabled_flag) { | |
|       raht_prediction_threshold0 | ue(v) |
|       raht_prediction_threshold1 | ue(v) |
|     } | |
|   } | |
|   aps_extension_flag | u(1) |
|   if( aps_extension_flag ) | |
|     while( more_data_in_byte_stream( ) ) | |
|       aps_extension_data_flag | u(1) |
|   byte_alignment( ) | |
| } | |

FIG. 33

| attribute_parameter_set( ) { | Descriptor |
|---|---|
| ..... | |
|    attr_slice_segmentation_enabled_flag | u(1) |
| ..... | |
| } | |

FIG. 34

| geometry_slice_bitstream( ) { | Descriptor |
|---|---|
| geometry_slice_header( ) | |
| geometry_slice_data( ) | |
| } | |

FIG. 35

| geometry_slice_header( ) { | Descriptor |
|---|---|
| gsh_geometry_parameter_set_id | ue(v) |
| gsh_tile_id | ue(v) |
| gsh_slice_id | ue(v) |
| frame_idx | u(n) |
| gsh_num_points | u(24) |
| if( gps_box_present_flag ) { | |
|     if( gps_gsh_box_log2_scale_present_flag ) | |
|         gsh_box_log2_scale | ue(v) |
|     gsh_box_origin_x | ue(v) |
|     gsh_box_origin_y | ue(v) |
|     gsh_box_origin_z | ue(v) |
| } | |
| if ( gps_implicit_geom_partition_flag ) { | |
|     gsh_log2_max_nodesize_x | ue(v) |
|     gsh_log2_max_nodesize_y_minus_x | se(v) |
|     gsh_log2_max_nodesize_z_minus_y | se(v) |
| } else { | |
|     gsh_log2_max_nodesize | ue(v) |
| } | |
| if( geom_scaling_enabled_flag ) { | |
|     geom_slice_qp_offset | se(v) |
|     geom_octree_qp_offsets_enabled_flag | u(1) |
|     if( geom_octree_qp_offsets_enabled_flag ) | |
|         geom_octree_qp_offsets_depth | ue(v) |
| } | |
| byte_alignment( ) | |
| } | |

FIG. 36

| geometry_data_unit_header( ) { | Descriptor |
|---|---|
| ...... | |
|   slice_id | ue(v) |
|   if( !sps_entropy_continuation_enabled_flag ) { | |
|     gsh_entropy_continuation_flag | u(1) |
|     if( gsh_entropy_continuation_flag ) | |
|       gsh_prev_slice_id | ue(v) |
|   } | |
|   if( geom_slice_segmentation_enabled_flag ) { | |
|     context_reuse_flag | u(1) |
|     if( context_reuse_flag ) { | |
|       num_context_reuse_minus1 | u(8) |
|       for ( i=0; i<=num_context_reuse_minus1; i++) | |
|         subsequent_slice_id | u(8) |
|     } | |
|     dependent_neighbour_enabled_flag | u(1) |
|     if(dependent_neighbour_enabled_flag) { | |
|       num_neighbour_slice | u(8) |
|       for( i=0; i<num_neighbour_slice; i++ ) | |
|         neighbour_slice_id | u(8) |
|     } | |
|     else | |
|       neighbour_occupancy_type | u(2) |
|   } | |
| ...... | |
| } | |

FIG. 37

| geometry_slice_data( ) { | Descriptor |
|---|---|
| for( depth = 0; depth < MaxGeometryOctreeDepth; depth++ ) { | |
| for( nodeIdx = 0; nodeIdx < NumNodesAtDepth[ depth ]; nodeIdx++ ) { | |
| xN = NodeX[ depth ][ nodeIdx ] | |
| yN = NodeY[ depth ][ nodeIdx ] | |
| zN = NodeZ[ depth ][ nodeIdx ] | |
| geometry_node( depth, nodeIdx, xN, yN, zN ) | |
| } | |
| } | |
| if ( log2_trisoup_node_size > 0 ) | |
| geometry_trisoup_data( ) | |
| } | |

FIG. 38

| attribute_slice_bitstream( ) { | Descriptor |
|---|---|
| attribute_slice_header( ) | |
| attribute_slice_data( ) | |
| } | |

FIG. 39

| attribute_slice_header( ) { | Descriptor |
|---|---|
|   ash_attr_parameter_set_id | ue(v) |
|   ash_attr_sps_attr_idx | ue(v) |
|   ash_attr_geom_slice_id | ue(v) |
|   if( aps_slice_qp_delta_present_flag ) { | |
|     ash_attr_qp_delta_luma | se(v) |
|     if( attribute_dimension_minus1[ ash_attr_sps_attr_idx ] > 0 ) | |
|       ash_attr_qp_delta_chroma | se(v) |
|   } | |
|   ash_attr_layer_qp_delta_present_flag | u(1) |
|   if( ash_attr_layer_qp_delta_present_flag ) { | |
|     ash_attr_num_layer_qp_minus1 | ue(v) |
|     for( i = 0; i < NumLayerQp; i++ ){ | |
|       ash_attr_layer_qp_delta_luma[i] | se(v) |
|       if( attribute_dimension_minus1[ ash_attr_sps_attr_idx ] > 0 ) | |
|         ash_attr_layer_qp_delta_chroma[i] | se(v) |
|     } | |
|   } | |
|   ash_attr_region_qp_delta_present_flag | u(1) |
|   if ( ash_attr_region_qp_delta_present_flag ) { | |
|     ash_attr_qp_region_box_origin_x | ue(v) |
|     ash_attr_qp_region_box_origin_y | ue(v) |
|     ash_attr_qp_region_box_origin_z | ue(v) |
|     ash_attr_qp_region_box_width | ue(v) |
|     ash_attr_qp_region_box_height | ue(v) |
|     ash_attr_qp_region_box_depth | ue(v) |
|     ash_attr_region_qp_delta | se(v) |
|   } | |
|   byte_alignment( ) | |
| } | |

FIG. 40

| attribute_data_unit_header( ) { | Descriptor |
|---|---|
| ...... | |
|   slice_id | ue(v) |
|   if( !sps_entropy_continuation_enabled_flag ) { | |
|     ash_entropy_continuation_flag | u(1) |
|     if( ash_entropy_continuation_flag ) | |
|       ash_prev_slice_id | ue(v) |
|   } | |
|   if( attr_slice_segmentation_enabled_flag ) { | |
|     context_reuse_flag | u(1) |
|     if( context_reuse_flag ) { | |
|       num_context_reuse_minus1 | u(8) |
|       for ( i=0; i<=num_context_reuse_minus1; i++) | |
|         subsequent_slice_id | u(8) |
|     } | |
|     dependent_neighbour_enabled_flag | u(1) |
|     if(dependent_neighbour_enabled_flag) { | |
|       num_neighbour_slice | u(8) |
|       for( i=0; i<num_neighbour_slice; i++ ) | |
|         neighbour_slice_id | u(8) |
|     } | |
|     else | |
|       neighbour_occupancy_type | u(2) |
|   } | |
|   ...... | |
| } | |

FIG. 41

| attribute_slice_data( ) { | Descriptor |
|---|---|
|     dimension = attribute_dimension[ ash_attr_sps_attr_idx ] | |
|     zerorun | ae(v) |
|     for( i = 0; i < pointCount; i++ ) { | |
|         if( attr_coding_type = = 0 && | |
|             maxPredDiff[ i ] > lifting_adaptive_prediction_threshold && | |
|             MaxNumPredictors > 1 ) { | |
|             predIndex[ i ] | ae(v) |
|         } | |
|         if( zerorun > 0 ) { | |
|             for( k = 0; k < dimension ; k++ ) | |
|                 values[ k ][ i ] = 0 | |
|             zerorun -= 1 | |
|         } | |
|         else { | |
|             attribute_coding( dimension, i ) | ae(v) |
|             zerorun | ae(v) |
|         } | |
|     } | |
|     byte_alignment( ) | |
| } | |

POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

CROSS-REFERENCE TO RELATED APPLICATIONS

Pursuant to 35 U.S.C. § 119(a), this application claims the benefit of earlier filing date and right of priority to Korean Patent Application No. 10-2020-0146596, filed on Nov. 5, 2020, the contents of which are hereby incorporated by reference herein in their entirety.

TECHNICAL FIELD

Embodiments relate to a method and apparatus for processing point cloud content.

BACKGROUND

Point cloud content is content represented by a point cloud, which is a set of points belonging to a coordinate system representing a three-dimensional space (or volume). The point cloud content may express media configured in three dimensions, and is used to provide various services such as virtual reality (VR), augmented reality (AR), mixed reality (MR), XR (Extended Reality), and self-driving services. However, tens of thousands to hundreds of thousands of point data are required to represent point cloud content. Therefore, there is a need for a method for efficiently processing a large amount of point data.

In other words, a high throughput is required to transmit and receive data of the point cloud. Accordingly, in the process of transmitting and receiving the point cloud data, in which encoding for compression and decoding for decompression are performed, the computational operation is complicated and time-consuming due to the large volume of the point cloud data.

SUMMARY

An object of the present disclosure devised to solve the above-described problems is to provide a point cloud data transmission device, a point cloud data transmission method, a point cloud data reception device, and a point cloud data reception method for efficiently transmitting and receiving a point cloud Another object of the present disclosure is to provide a point cloud data transmission device, a point cloud data transmission method, a point cloud data reception device, and a point cloud data reception method for addressing latency and encoding/decoding complexity.

Another object of the present disclosure is to provide a point cloud data transmission point cloud data device, a transmission method, a point cloud data reception device, and a point cloud data reception method that may allow the reception device to efficiently perform buffer management when entropy continuity is given between multiple slices.

Objects of the present disclosure are not limited to the aforementioned objects, and other objects of the present disclosure which are not mentioned above will become apparent to those having ordinary skill in the art upon examination of the following description.

To achieve these objects and other advantages and in accordance with the purpose of the disclosure, as embodied and broadly described herein, a method of transmitting point cloud data may include encoding geometry data of the point cloud data, encoding attribute data of the point cloud data based on the geometry data, and transmitting the encoded geometry data, the encoded attribute data, and signaling data.

According to embodiments, the encoded geometry data is segmented into a plurality of slices and a context of one of the plurality of slices is referenced by at least one other slice.

According to embodiments, the signaling data includes slice related information and buffer control related information.

According to embodiments, the buffer control related information includes at least information for indicating whether a context of a current slice is referenced by at least one other slice, or information for identifying the number of times the context of the current slice is referenced when the context of the current slice is referenced by the at least one other slice.

According to embodiments, an apparatus for transmitting point cloud data may include a geometry encoder configured to encode geometry data of the point cloud data, an attribute encoder configured to encode attribute data of the point cloud data based on the geometry data, and a transmitter configured to transmit the encoded geometry data, the encoded attribute data, and signaling data.

According to embodiments, the encoded geometry data is segmented into a plurality of slices and a context of one of the plurality of slices is referenced by at least one other slice.

According to embodiments, the signaling data includes slice related information and buffer control related information.

According to embodiments, the buffer control related information includes at least information for indicating whether a context of a current slice is referenced by at least one other slice, or information for identifying the number of times the context of the current slice is referenced when the context of the current slice is referenced by the at least one other slice.

According to embodiments, a method of receiving point cloud data may include receiving geometry data, attribute data, and signaling data, decoding the geometry data based on the signaling data, decoding the attribute data based on the signaling data and the decoded geometry data, and rendering the decoded point cloud data based on the signaling data.

According to embodiments, the geometry data is included in a plurality of slices and a context of one of the plurality of slices is referenced by at least one other slice.

According to embodiments, the signaling data includes slice related information and buffer control related information.

According to embodiments, the buffer control related information includes at least information for indicating whether a context of a current slice is referenced by at least one other slice, or information for identifying the number of times the context of the current slice is referenced when the context of the current slice is referenced by the at least one other slice.

According to embodiments, the decoding of the geometry data comprises controlling buffer storage of a context of a current slice based on the signaling related information and the buffer control related information.

According to embodiments, the decoding of the geometry data comprises, when it is determined that the context of the current slice is not referenced by the at least one other slice based on the signaling related information and the buffer control related information, deleting the context of the current slice from a buffer.

According to embodiments, the decoding of the geometry data comprises, when it is determined that the context of the current slice is referenced by the at least one other slice based on the signaling related information and the buffer control related information, deleting the context of the current slice from a buffer after the current slice context is referenced by the at least one other slice.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure.

FIG. 6 illustrates an example of octree and occupancy code according to embodiments.

FIG. 7 illustrates an example of a neighbor node pattern according to embodiments.

FIG. 21(a) is a diagram illustrating an example of dividing a geometry bitstream into multiple slices according to embodiments.

FIG. 21(b) is a diagram illustrating an example of dividing an attribute bitstream into multiple slices according to embodiments.

FIGS. 26A to 26D are diagrams illustrating examples of a neighbor structure according to embodiments.

FIG. 28 shows an embodiment of a syntax structure of a sequence parameter set according to embodiments.

FIG. 29 shows an embodiment of a syntax structure of a sequence parameter set according to embodiments.

FIG. 30 shows an exemplary syntax structure of a geometry parameter set according to embodiments.

FIG. 31 shows another exemplary syntax structure of a geometry parameter set according to embodiments.

FIG. 32 shows an exemplary syntax structure of an attribute parameter set according to embodiments.

FIG. 33 shows an exemplary syntax structure of an attribute parameter set according to embodiments.

FIG. 34 shows an exemplary syntax structure of geometry_slice_bitstream( ) according to embodiments.

FIG. 35 shows an exemplary syntax structure of a geometry slice header according to embodiments.

FIG. 36 shows an exemplary syntax structure of a geometry data unit header according to embodiments.

FIG. 37 shows an exemplary syntax structure of a geometry data unit according to embodiments.

FIG. 38 shows an exemplary syntax structure of attribute_slice_bitstream( ) according to embodiments.

FIG. 39 shows an exemplary syntax structure of an attribute slice header according to embodiments.

FIG. 40 shows another exemplary syntax structure of an attribute data unit header according to embodiments.

FIG. 41 shows another exemplary syntax structure of an attribute data unit according to embodiments.

DETAILED DESCRIPTION

Figure 1:
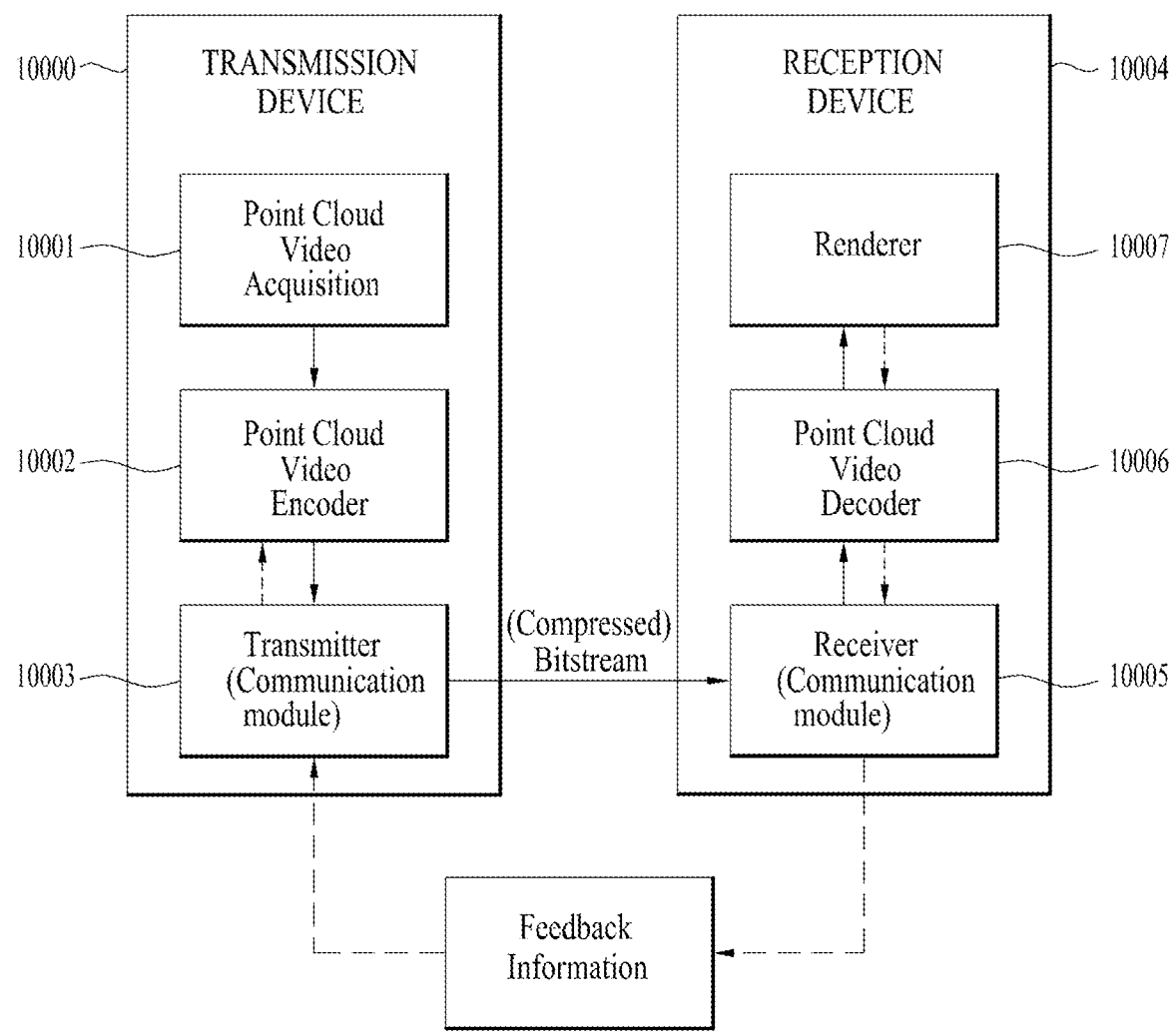
FIG. 1 illustrates an exemplary point cloud content providing system according to embodiments.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. It should be noted that the following examples are only for embodying the present disclosure and do not limit the scope of the present disclosure. What can be easily inferred by an expert in the technical field to which the present invention belongs from the detailed description and examples of the present disclosure is to be interpreted as being within the scope of the present disclosure.

The detailed description in this present specification should be construed in all aspects as illustrative and not restrictive. The scope of the disclosure should be determined by the appended claims and their legal equivalents, and all changes coming within the meaning and equivalency range of the appended claims are intended to be embraced therein.

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that can be implemented according to the present disclosure. The following detailed description includes specific details in order to provide a thorough understanding of the present disclosure. However, it will be apparent to those skilled in the art that the present disclosure may be practiced without such specific details. Although most terms used in this specification have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings. In addition, the following drawings and detailed description should not be construed as being limited to the specifically described embodiments, but should be construed as including equivalents or substitutes of the embodiments described in the drawings and detailed description.

FIG. 1 shows an exemplary point cloud content providing system according to embodiments.

The point cloud content providing system illustrated in FIG. 1 may include a transmission device 10000 and a reception device 10004. The transmission device 10000 and the reception device 10004 are capable of wired or wireless communication to transmit and receive point cloud data.

The point cloud data transmission device 10000 according to the embodiments may secure and process point cloud video (or point cloud content) and transmit the same. According to embodiments, the transmission device 10000 may include a fixed station, a base transceiver system (BTS), a network, an artificial intelligence (AI) device and/or system, a robot, an AR/VR/XR device and/or server. According to embodiments, the transmission device 10000 may include a device, a robot, a vehicle, an AR/VR/XR device, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The transmission device 10000 according to the embodiments includes a point cloud video acquisition unit 10001, a point cloud video encoder 10002, and/or a transmitter (or communication module) 10003.

The point cloud video acquisition unit 10001 according to the embodiments acquires a point cloud video through a processing process such as capture, synthesis, or generation. The point cloud video is point cloud content represented by a point cloud, which is a set of points positioned in a 3D space, and may be referred to as point cloud video data. The point cloud video according to the embodiments may include one or more frames. One frame represents a still image/picture. Therefore, the point cloud video may include a point cloud image/frame/picture, and may be referred to as a point cloud image, frame, or picture.

The point cloud video encoder 10002 according to the embodiments encodes the acquired point cloud video data. The point cloud video encoder 10002 may encode the point cloud video data based on point cloud compression coding. The point cloud compression coding according to the embodiments may include geometry-based point cloud compression (G-PCC) coding and/or video-based point cloud compression (V-PCC) coding or next-generation coding. The point cloud compression coding according to the embodiments is not limited to the above-described embodiment. The point cloud video encoder 10002 may output a bitstream containing the encoded point cloud video data. The bitstream may contain not only the encoded point cloud video data, but also signaling information related to encoding of the point cloud video data.

The transmitter 10003 according to the embodiments transmits the bitstream containing the encoded point cloud video data. The bitstream according to the embodiments is encapsulated in a file or segment (for example, a streaming segment), and is transmitted over various networks such as a broadcasting network and/or a broadband network. Although not shown in the figure, the transmission device 10000 may include an encapsulator (or an encapsulation module) configured to perform an encapsulation operation. According to embodiments, the encapsulator may be included in the transmitter 10003. According to embodiments, the file or segment may be transmitted to the reception device 10004 over a network, or stored in a digital storage medium (e.g., USB, SD, CD, DVD, Blu-ray, HDD, SSD, etc.). The transmitter 10003 according to the embodiments is capable of wired/wireless communication with the reception device 10004 (or the receiver 10005) over a network of 4G, 5G, 6G, etc. In addition, the transmitter may perform a necessary data processing operation according to the network system (e.g., a 4G, 5G or 6G communication network system). The transmission device 10000 may transmit the encapsulated data in an on-demand manner.

The reception device 10004 according to the embodiments includes a receiver 10005, a point cloud video decoder 10006, and/or a renderer 10007. According to embodiments, the reception device 10004 may include a device, a robot, a vehicle, an AR/VR/XR device, a portable device, a home appliance, an Internet of Things (IoT) device, and an AI device/server which are configured to perform communication with a base station and/or other wireless devices using a radio access technology (e.g., 5G New RAT (NR), Long Term Evolution (LTE)).

The receiver 10005 according to the embodiments receives the bitstream containing the point cloud video data or the file/segment in which the bitstream is encapsulated from the network or storage medium. The receiver 10005 may perform necessary data processing according to the network system (for example, a communication network system of 4G, 5G, 6G, etc.). The receiver 10005 according to the embodiments may decapsulate the received file/segment and output a bitstream. According to embodiments, the receiver 10005 may include a decapsulator (or a decapsulation module) configured to perform a decapsulation operation. The decapsulator may be implemented as an element (or component or module) separate from the receiver 10005.

The point cloud video decoder 10006 decodes the bitstream containing the point cloud video data. The point cloud video decoder 10006 may decode the point cloud video data according to the method by which the point cloud video data is encoded (for example, in a reverse process of the operation of the point cloud video encoder 10002). Accordingly, the point cloud video decoder 10006 may decode the point cloud video data by performing point cloud decompression coding, which is the inverse process of the point cloud compression. The point cloud decompression coding includes G-PCC coding.

The renderer 10007 renders the decoded point cloud video data. According to an embodiment, the render may render the decoded point cloud video data according to a viewport, etc. The renderer 10007 may output point cloud content by rendering not only the point cloud video data but also audio data. According to embodiments, the renderer 10007 may include a display configured to display the point cloud content. According to embodiments, the display may be implemented as a separate device or component rather than being included in the renderer 10007.

The arrows indicated by dotted lines in the drawing represent a transmission path of feedback information acquired by the reception device 10004. The feedback information is information for reflecting interactivity with a user who consumes the point cloud content, and includes information about the user (e.g., head orientation information, viewport information, and the like). In particular, when the point cloud content is content for a service (e.g., self-driving service, etc.) that requires interaction with the user, the feedback information may be provided to the content transmitting side (e.g., the transmission device 10000) and/or the service provider. According to embodiments, the feedback information may be used in the reception device 10004 as well as the transmission device 10000, or may not be provided.

The head orientation information according to the embodiments may represent information about a position, orientation, angle, and motion of a user's head. The reception device 10004 according to the embodiments may calculate viewport information based on the head orientation information. The viewport information is information about a region of a point cloud video that the user is viewing (that is, a region that the user is currently viewing). That is, the viewport information is information about a region that the user is currently viewing in the point cloud video. In other words, the viewport or viewport region may represent a region that the user is viewing in the point cloud video. A viewpoint is a point that the user is viewing in the point cloud video, and may represent a center point of the viewport region. That is, the viewport is a region centered on a viewpoint, and the size and shape of the region may be determined by a field of view (FOV). Accordingly, the reception device 10004 may extract the viewport information based on a vertical or horizontal FOV supported by the device as well as the head orientation information. In addition, the reception device 10004 may perform gaze analysis or the like based on the head orientation information and/or the viewport information to determine the way the user consumes a point cloud video, a region that the user gazes at in the point cloud video, and the gaze time. According to embodiments, the reception device 10004 may transmit feedback information including the result of the gaze analysis to the transmission device 10000. According to embodiments, a device such as a VR/XR/AR/MR display may extract a viewport region based on the position/orientation of a user's head and a vertical or horizontal FOV supported by the device. According to embodiments, the head orientation information and the viewport information may be referred to as feedback information, signaling information, or metadata.

The feedback information according to the embodiments may be acquired in the rendering and/or display process. The feedback information may be secured by one or more sensors included in the reception device 10004. According to embodiments, the feedback information may be secured by the renderer 10007 or a separate external element (or device, component, or the like). The dotted lines in FIG. 1 represent a process of transmitting the feedback information secured by the renderer 10007. The feedback information may not only be transmitted to the transmitting side, but also be consumed by the receiving side. That is, the point cloud content providing system may process (encode/decode/render) point cloud data based on the feedback information. For example, the point cloud video decoder 10006 and the renderer 10007 may preferentially decode and render only the point cloud video for a region currently viewed by the user, based on the feedback information, that is, the head orientation information and/or the viewport information.

The reception device 10004 may transmit the feedback information to the transmission device 10000. The transmission device 10000 (or the point cloud video encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) the entire point cloud data, and provide point cloud content to the user.

According to embodiments, the transmission device 10000 may be called an encoder, a transmitting device, a transmitter, a transmission system, or the like, and the reception device 10004 may be called a decoder, a receiving device, a receiver, a reception system, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud content providing system illustrated in FIG. 1 may be implemented by hardware, software, a processor, and/or a combination thereof.

Figure 2:
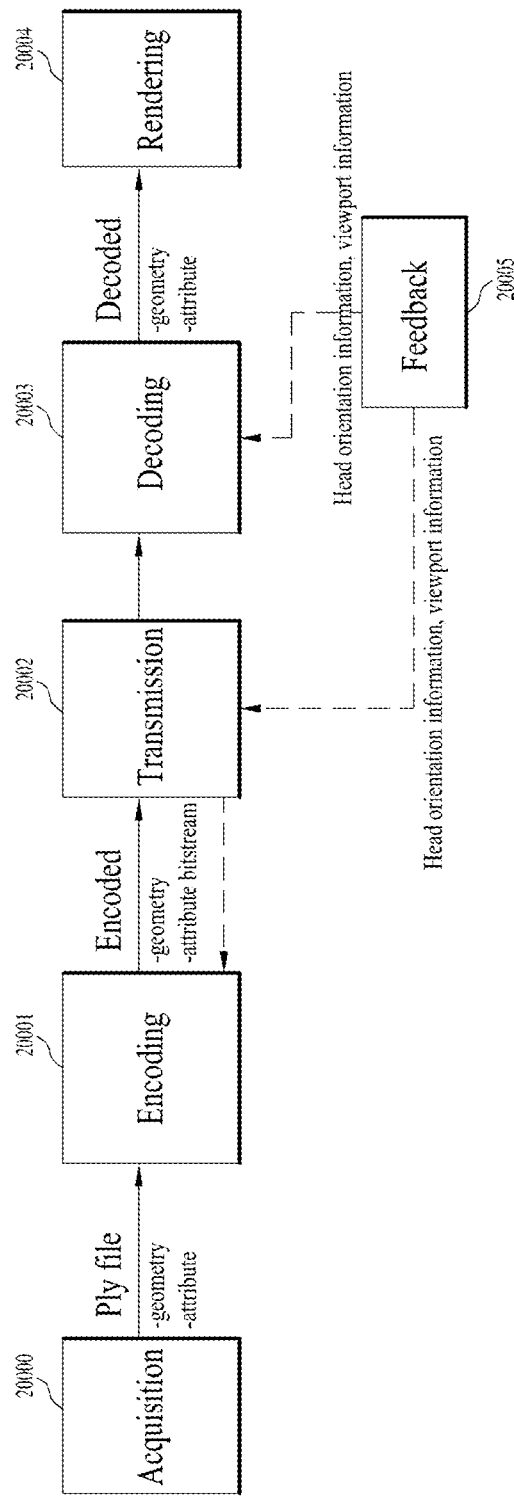
FIG. 2 is a block diagram illustrating a point cloud content providing operation according to embodiments.

FIG. 2 is a block diagram illustrating a point cloud content providing operation according to embodiments.

The block diagram of FIG. 2 shows the operation of the point cloud content providing system described in FIG. 1. As described above, the point cloud content providing system may process point cloud data based on point cloud compression coding (e.g., G-PCC).

The point cloud content providing system according to the embodiments (for example, the point cloud transmission device 10000 or the point cloud video acquisition unit 10001) may acquire a point cloud video (20000). The point cloud video is represented by a point cloud belonging to a coordinate system for expressing a 3D space. The point cloud video according to the embodiments may include a Ply (Polygon File format or the Stanford Triangle format) file. When the point cloud video has one or more frames, the acquired point cloud video may include one or more Ply files. The Ply files contain point cloud data, such as point geometry and/or attributes. The geometry includes positions of points. The position of each point may be represented by parameters (for example, values of the X, Y, and Z axes) representing a three-dimensional coordinate system (e.g., a coordinate system composed of X, Y and Z axes). The attributes include attributes of points (e.g., information about texture, color (in YCbCr or RGB), reflectance r, transparency, etc. of each point). A point has one or more attributes. For example, a point may have an attribute that is a color, or two attributes that are color and reflectance. According to embodiments, the geometry may be called positions, geometry information, geometry data, or the like, and the attribute may be called attributes, attribute information, attribute data, or the like. The point cloud content providing system (for example, the point cloud transmission device 10000 or the point cloud video acquisition unit 10001) may secure point cloud data from information (e.g., depth information, color information, etc.) related to the acquisition process of the point cloud video.

The point cloud content providing system (for example, the transmission device 10000 or the point cloud video encoder 10002) according to the embodiments may encode the point cloud data (20001). The point cloud content providing system may encode the point cloud data based on point cloud compression coding. As described above, the point cloud data may include the geometry and attributes of a point. Accordingly, the point cloud content providing system may perform geometry encoding of encoding the geometry and output a geometry bitstream. The point cloud content providing system may perform attribute encoding of encoding attributes and output an attribute bitstream. According to embodiments, the point cloud content providing system may perform the attribute encoding based on the geometry encoding. The geometry bitstream and the attribute bitstream according to the embodiments may be multiplexed and output as one bitstream. The bitstream according to the embodiments may further contain signaling information related to the geometry encoding and attribute encoding.

The point cloud content providing system (for example, the transmission device 10000 or the transmitter 10003) according to the embodiments may transmit the encoded point cloud data (20002). As illustrated in FIG. 1, the encoded point cloud data may be represented by a geometry bitstream and an attribute bitstream. In addition, the encoded point cloud data may be transmitted in the form of a bitstream together with signaling information related to encoding of the point cloud data (for example, signaling information related to the geometry encoding and the attribute encoding). The point cloud content providing system may encapsulate a bitstream that carries the encoded point cloud data and transmit the same in the form of a file or segment.

The point cloud content providing system (for example, the reception device 10004 or the receiver 10005) according to the embodiments may receive the bitstream containing the encoded point cloud data. In addition, the point cloud content providing system (for example, the reception device 10004 or the receiver 10005) may demultiplex the bitstream.

The point cloud content providing system (e.g., the reception device 10004 or the point cloud video decoder 10005) may decode the encoded point cloud data (e.g., the geometry bitstream, the attribute bitstream) transmitted in the bitstream. The point cloud content providing system (for example, the reception device 10004 or the point cloud video decoder 10005) may decode the point cloud video data based on the signaling information related to encoding of the point cloud video data contained in the bitstream. The point cloud content providing system (for example, the reception device 10004 or the point cloud video decoder 10005) may decode the geometry bitstream to reconstruct the positions (geometry) of points. The point cloud content providing system may reconstruct the attributes of the points by decoding the attribute bitstream based on the reconstructed geometry. The point cloud content providing system (for example, the reception device 10004 or the point cloud video decoder 10005) may reconstruct the point cloud video based on the positions according to the reconstructed geometry and the decoded attributes.

The point cloud content providing system according to the embodiments (for example, the reception device 10004 or the renderer 10007) may render the decoded point cloud data (20004). The point cloud content providing system (for example, the reception device 10004 or the renderer 10007) may render the geometry and attributes decoded through the decoding process, using various rendering methods. Points in the point cloud content may be rendered to a vertex having a certain thickness, a cube having a specific minimum size centered on the corresponding vertex position, or a circle centered on the corresponding vertex position. All or part of the rendered point cloud content is provided to the user through a display (e.g., a VR/AR display, a general display, etc.).

The point cloud content providing system (for example, the reception device 10004) according to the embodiments may secure feedback information (20005). The point cloud content providing system may encode and/or decode point cloud data based on the feedback information. The feedback information and the operation of the point cloud content providing system according to the embodiments are the same as the feedback information and the operation described with reference to FIG. 1, and thus detailed description thereof is omitted.

Figure 3:
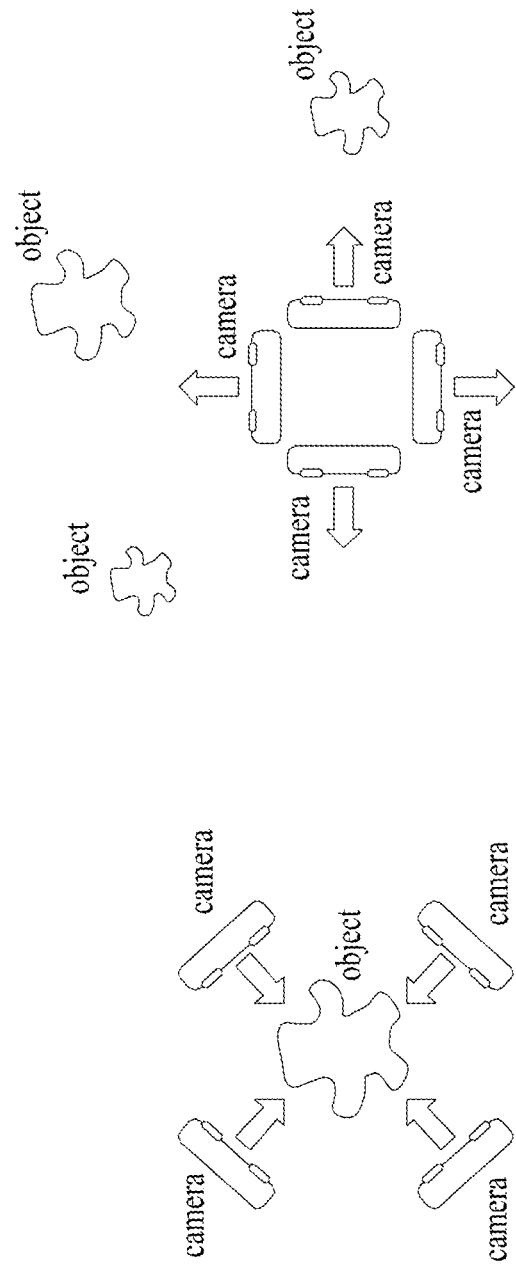
FIG. 3 illustrates an exemplary process of capturing a point cloud video according to embodiments.

FIG. 3 illustrates an exemplary process of capturing a point cloud video according to embodiments.

FIG. 3 illustrates an exemplary point cloud video capture process of the point cloud content providing system described with reference to FIGS. 1 to 2.

Point cloud content includes a point cloud video (images and/or videos) representing an object and/or environment located in various 3D spaces (e.g., a 3D space representing a real environment, a 3D space representing a virtual environment, etc.). Accordingly, the point cloud content providing system according to the embodiments may capture a point cloud video using one or more cameras (e.g., an infrared camera capable of securing depth information, an RGB camera capable of extracting color information corresponding to the depth information, etc.), a projector (e.g., an infrared pattern projector to secure depth information), a LiDAR, or the like. The point cloud content providing system according to the embodiments may extract the shape of geometry composed of points in a 3D space from the depth information and extract the attributes of each point from the color information to secure point cloud data. An image and/or video according to the embodiments may be captured based on at least one of the inward-facing technique and the outward-facing technique.

The left part of FIG. 3 illustrates the inward-facing technique. The inward-facing technique refers to a technique of capturing images a central object with one or more cameras (or camera sensors) positioned around the central object. The inward-facing technique may be used to generate point cloud content providing a 360-degree image of a key object to the user (e.g., VR/AR content providing a 360-degree image of an object (e.g., a key object such as a character, player, object, or actor) to the user).

The right part of FIG. 3 illustrates the outward-facing technique. The outward-facing technique refers to a technique of capturing images an environment of a central object rather than the central object with one or more cameras (or camera sensors) positioned around the central object. The outward-facing technique may be used to generate point cloud content for providing a surrounding environment that appears from the user's point of view (e.g., content representing an external environment that may be provided to a user of a self-driving vehicle).

As shown in figure, the point cloud content may be generated based on the capturing operation of one or more cameras. In this case, the coordinate system may differ among the cameras, and accordingly the point cloud content providing system may calibrate one or more cameras to set a global coordinate system before the capturing operation. In addition, the point cloud content providing system may generate point cloud content by synthesizing an arbitrary image and/or video with an image and/or video captured by the above-described capture technique. The point cloud content providing system may not perform the capturing operation described in FIG. 3 when it generates point cloud content representing a virtual space. The point cloud content providing system according to the embodiments may perform post-processing on the captured image and/or video. In other words, the point cloud content providing system may remove an unwanted area (for example, a background), recognize a space to which the captured images and/or videos are connected, and, when there is a spatial hole, perform an operation of filling the spatial hole.

The point cloud content providing system may generate one piece of point cloud content by performing coordinate transformation on points of the point cloud video secured from each camera. The point cloud content providing system may perform coordinate transformation on the points based on the coordinates of the position of each camera. Accordingly, the point cloud content providing system may generate content representing one wide range, or may generate point cloud content having a high density of points.

Figure 4:
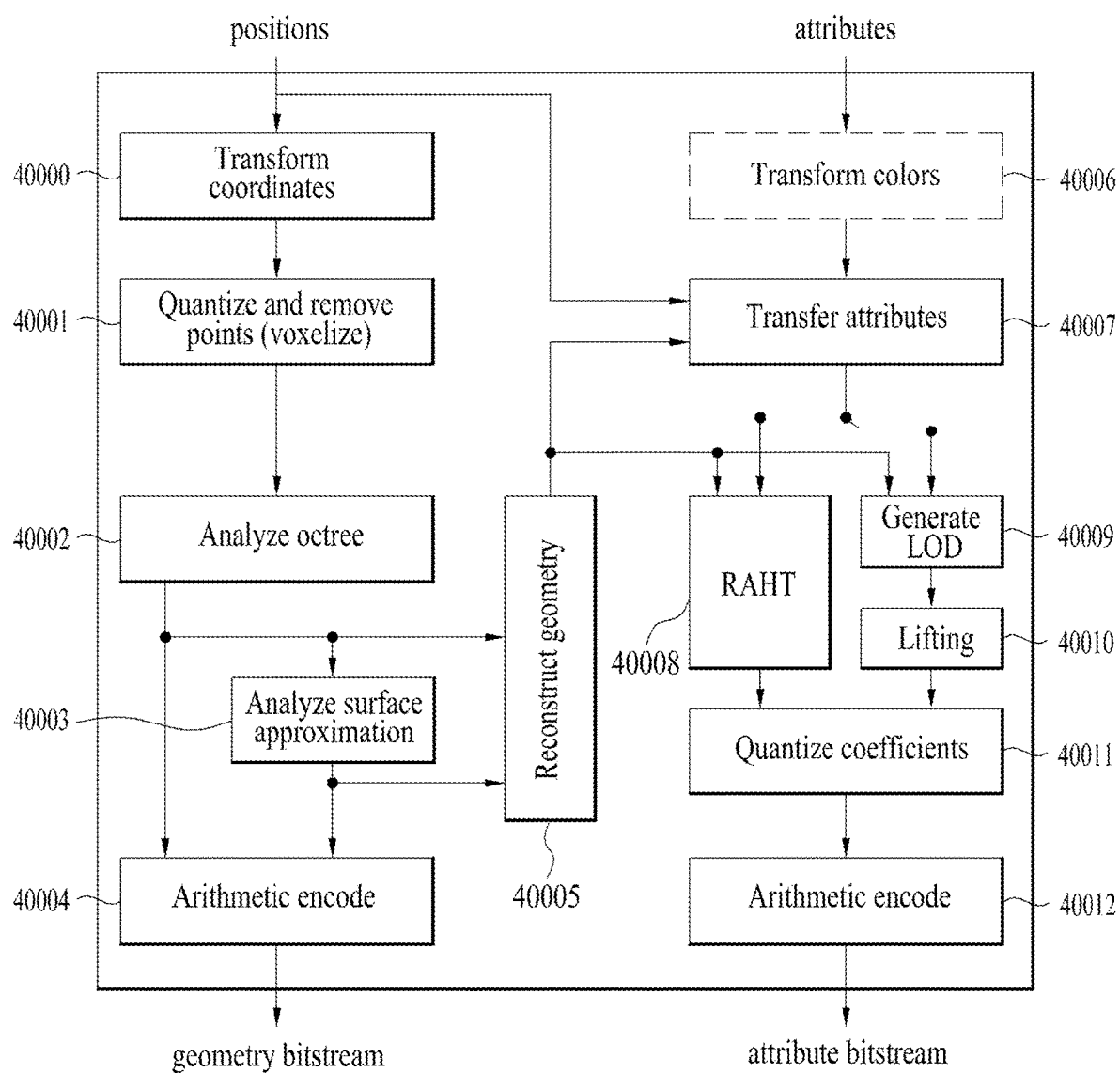
FIG. 4 illustrates an exemplary block diagram of point cloud video encoder according to embodiments.

FIG. 4 illustrates an exemplary point cloud video encoder according to embodiments.

FIG. 4 shows an example of the point cloud video encoder 10002 of FIG. 1. The point cloud video encoder reconstructs and encodes point cloud data (e.g., positions and/or attributes of the points) to adjust the quality of the point cloud content (to, for example, lossless, lossy, or near-lossless) according to the network condition or applications. When the overall size of the point cloud content is large (e.g., point cloud content of 60 Gbps is given for 30 fps), the point cloud content providing system may fail to stream the content in real time. Accordingly, the point cloud content providing system may reconstruct the point cloud content based on the maximum target bitrate to provide the same in accordance with the network environment or the like. As described with reference to FIGS. 1 to 2, the point cloud video encoder may perform geometry encoding and attribute encoding. The geometry encoding is performed before the attribute encoding.

The point cloud video encoder according to the embodiments includes a coordinate transformer (Transform coordinates) 40000, a quantizer (Quantize and remove points (voxelize)) 40001, an octree analyzer (Analyze octree) 40002, and a surface approximation analyzer (Analyze surface approximation) 40003, an arithmetic encoder (Arithmetic encode) 40004, a geometric reconstructor (Reconstruct geometry) 40005, a color transformer (Transform colors) 40006, an attribute transformer (Transform attributes) 40007, a RAHT transformer (RAHT) 40008, an LOD generator (Generate LOD) 40009, a lifting transformer (Lifting) 40010, a coefficient quantizer (Quantize coefficients) 40011, and/or an arithmetic encoder (Arithmetic encode) 40012.

The coordinate transformer 40000, the quantizer 40001, the octree analyzer 40002, the surface approximation analyzer 40003, the arithmetic encoder 40004, and the geometry reconstructor 40005 may perform geometry encoding. The geometry encoding according to the embodiments may include octree geometry coding, direct coding, trisoup geometry encoding, and entropy encoding. The direct coding and trisoup geometry encoding are applied selectively or in combination. The geometry encoding is not limited to the above-described example.

As shown in the figure, the coordinate transformer 40000 according to the embodiments receives positions and transforms the same into coordinates. For example, the positions may be transformed into position information in a three-dimensional space (for example, a three-dimensional space represented by an XYZ coordinate system). The position information in the three-dimensional space according to the embodiments may be referred to as geometry information.

The quantizer 40001 according to the embodiments quantizes the geometry information. For example, the quantizer 40001 may quantize the points based on a minimum position value of all points (for example, a minimum value on each of the X, Y, and Z axes). The quantizer 40001 performs a quantization operation of multiplying the difference between the minimum position value and the position value of each point by a preset quantization scale value and then finding the nearest integer value by rounding the value obtained through the multiplication. Thus, one or more points may have the same quantized position (or position value). The quantizer 40001 according to the embodiments performs voxelization based on the quantized positions to reconstruct quantized points. The voxelization means a minimum unit representing position information in 3D space. Points of point cloud content (or 3D point cloud video) according to the embodiments may be included in one or more voxels. The term voxel, which is a compound of volume and pixel, refers to a 3D cubic space generated when a 3D space is divided into units (unit=1.0) based on the axes representing the 3D space (e.g., X-axis, Y-axis, and Z-axis). The quantizer 40001 may match groups of points in the 3D space with voxels. According to embodiments, one voxel may include only one point. According to embodiments, one voxel may include one or more points. In order to express one voxel as one point, the position of the center point of a voxel may be set based on the positions of one or more points included in the voxel. In this case, attributes of all positions included in one voxel may be combined and assigned to the voxel.

The octree analyzer 40002 according to the embodiments performs octree geometry coding (or octree coding) to present voxels in an octree structure. The octree structure represents points matched with voxels, based on the octal tree structure.

The surface approximation analyzer 40003 according to the embodiments may analyze and approximate the octree. The octree analysis and approximation according to the embodiments is a process of analyzing a region containing a plurality of points to efficiently provide octree and voxelization.

The arithmetic encoder 40004 according to the embodiments performs entropy encoding on the octree and/or the approximated octree. For example, the encoding scheme includes arithmetic encoding. As a result of the encoding, a geometry bitstream is generated.

The color transformer 40006, the attribute transformer 40007, the RAHT transformer 40008, the LOD generator 40009, the lifting transformer 40010, the coefficient quantizer 40011, and/or the arithmetic encoder 40012 perform attribute encoding. As described above, one point may have one or more attributes. The attribute encoding according to the embodiments is equally applied to the attributes that one point has. However, when an attribute (e.g., color) includes one or more elements, attribute encoding is independently applied to each element. The attribute encoding according to the embodiments includes color transform coding, attribute transform coding, region adaptive hierarchical transform (RAHT) coding, interpolation-based hierarchical nearest-neighbor prediction (prediction transform) coding, and interpolation-based hierarchical nearest-neighbor prediction with an update/lifting step (lifting transform) coding. Depending on the point cloud content, the RAHT coding, the prediction transform coding and the lifting transform coding described above may be selectively used, or a combination of one or more of the coding schemes may be used. The attribute encoding according to the embodiments is not limited to the above-described example.

The color transformer 40006 according to the embodiments performs color transform coding of transforming color values (or textures) included in the attributes. For example, the color transformer 40006 may transform the format of color information (for example, from RGB to YCbCr). The operation of the color transformer 40006 according to embodiments may be optionally applied according to the color values included in the attributes.

The geometry reconstructor 40005 according to the embodiments reconstructs (decompresses) the octree and/or the approximated octree. The geometry reconstructor 40005 reconstructs the octree/voxels based on the result of analyzing the distribution of points. The reconstructed octree/voxels may be referred to as reconstructed geometry (restored geometry).

The attribute transformer 40007 according to the embodiments performs attribute transformation to transform the attributes based on the reconstructed geometry and/or the positions on which geometry encoding is not performed. As described above, since the attributes are dependent on the geometry, the attribute transformer 40007 may transform the attributes based on the reconstructed geometry information. For example, based on the position value of a point included in a voxel, the attribute transformer 40007 may transform the attribute of the point at the position. As described above, when the position of the center of a voxel is set based on the positions of one or more points included in the voxel, the attribute transformer 40007 transforms the attributes of the one or more points. When the trisoup geometry encoding is performed, the attribute transformer 40007 may transform the attributes based on the trisoup geometry encoding.

The attribute transformer 40007 may perform the attribute transformation by calculating the average of attributes or attribute values of neighboring points (e.g., color or reflectance of each point) within a specific position/radius from the position (or position value) of the center of each voxel. The attribute transformer 40007 may apply a weight according to the distance from the center to each point in calculating the average. Accordingly, each voxel has a position and a calculated attribute (or attribute value).

The attribute transformer 40007 may search for neighboring points existing within a specific position/radius from the position of the center of each voxel based on the K-D tree or the Morton code. The K-D tree is a binary search tree and supports a data structure capable of managing points based on the positions such that nearest neighbor search (NNS) can be performed quickly. The Morton code is generated by presenting coordinates (e.g., (x, y, z)) representing 3D positions of all points as bit values and mixing the bits. For example, when the coordinates representing the position of a point are (5, 9, 1), the bit values for the coordinates are (0101, 1001, 0001). Mixing the bit values according to the bit index in order of z, y, and x yields 010001000111. This value is expressed as a decimal number of 1095. That is, the Morton code value of the point having coordinates (5, 9, 1) is 1095. The attribute transformer 40007 may order the points based on the Morton code values and perform NNS through a depth-first traversal process. After the attribute transformation operation, the K-D tree or the Morton code is used when the NNS is needed in another transformation process for attribute coding.

As shown in the figure, the transformed attributes are input to the RAHT transformer 40008 and/or the LOD generator 40009.

The RAHT transformer 40008 according to the embodiments performs RAHT coding for predicting attribute information based on the reconstructed geometry information. For example, the RAHT transformer 40008 may predict attribute information of a node at a higher level in the octree based on the attribute information associated with a node at a lower level in the octree.

The LOD generator 40009 according to the embodiments generates a level of detail (LOD). The LOD according to the embodiments is a degree of detail of point cloud content. As the LOD value decrease, it indicates that the detail of the point cloud content is degraded. As the LOD value increases, it indicates that the detail of the point cloud content is enhanced. Points may be classified by the LOD.

The lifting transformer 40010 according to the embodiments performs lifting transform coding of transforming the attributes a point cloud based on weights. As described above, lifting transform coding may be optionally applied.

The coefficient quantizer 40011 according to the embodiments quantizes the attribute-coded attributes based on coefficients.

The arithmetic encoder 40012 according to the embodiments encodes the quantized attributes based on arithmetic coding.

Although not shown in the figure, the elements of the point cloud video encoder of FIG. 4 may be implemented by hardware including one or more processors or integrated circuits configured to communicate with one or more memories included in the point cloud content providing apparatus, software, firmware, or a combination thereof. The one or more processors may perform at least one of the operations and/or functions of the elements of the point cloud video encoder of FIG. 4 described above. Additionally, the one or more processors may operate or execute a set of software programs and/or instructions for performing the operations and/or functions of the elements of the point cloud video encoder of FIG. 4. The one or more memories according to the embodiments may include a high speed random access memory, or include a non-volatile memory (e.g., one or more magnetic disk storage devices, flash memory devices, or other non-volatile solid-state memory devices).

Figure 5:
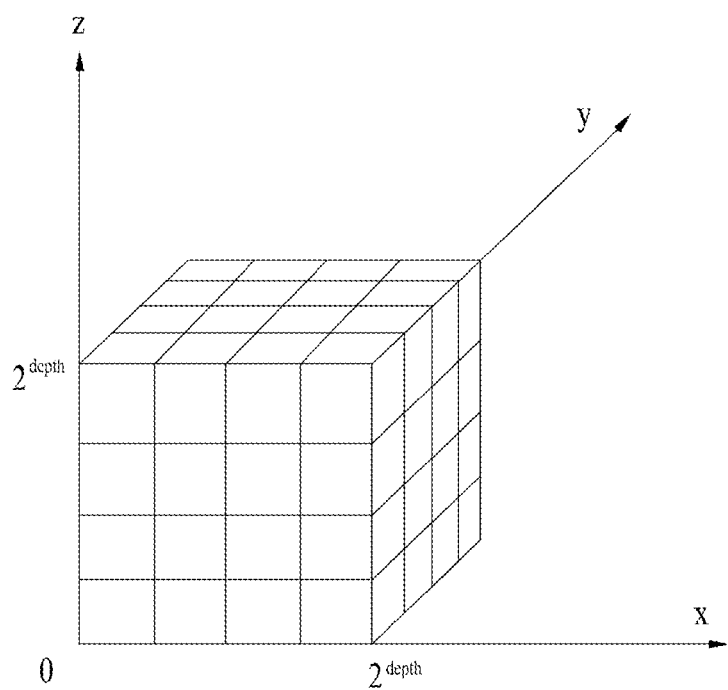
FIG. 5 illustrates an example of voxels in a 3D space according to embodiments.

FIG. 5 shows an example of voxels according to embodiments.

FIG. 5 shows voxels positioned in a 3D space represented by a coordinate system composed of three axes, which are the X-axis, the Y-axis, and the Z-axis. As described with reference to FIG. 4, the point cloud video encoder (e.g., the quantizer 40001) may perform voxelization. Voxel refers to a 3D cubic space generated when a 3D space is divided into units (unit=1.0) based on the axes representing the 3D space (e.g., X-axis, Y-axis, and Z-axis). FIG. 5 shows an example of voxels generated through an octree structure in which a cubical axis-aligned bounding box defined by two poles (0, 0, 0) and ($2^d$, $2^d$, $2^d$) is recursively subdivided. One voxel includes at least one point. The spatial coordinates of a voxel may be estimated from the positional relationship with a voxel group. As described above, a voxel has an attribute (such as color or reflectance) like pixels of a 2D image/video. The details of the voxel are the same as those described with reference to FIG. 4, and therefore a description thereof is omitted.

FIG. 6 shows an example of an octree and occupancy code according to embodiments.

As described with reference to FIGS. 1 to 4, the point cloud content providing system (point cloud video encoder 10002) or the octree analyzer 40002 of the point cloud video encoder performs octree geometry coding (or octree coding) based on an octree structure to efficiently manage the region and/or position of the voxel.

The upper part of FIG. 6 shows an octree structure. The 3D space of the point cloud content according to the embodiments is represented by axes (e.g., X-axis, Y-axis, and Z-axis) of the coordinate system. The octree structure is created by recursive subdividing of a cubical axis-aligned bounding box defined by two poles (0, 0, 0) and ($2^d$, $2^d$, $2^d$). Here, $2^d$ may be set to a value constituting the smallest bounding box surrounding all points of the point cloud content (or point cloud video). Here, d denotes the depth of the octree. The value of d is determined in Equation 1. In Equation 1, ($x^{int}_n$, $y^{int}_n$, $z^{int}_n$) denotes the positions (or position values) of quantized points.

$$d = \text{Ceil}(\text{Log2}(\text{Max}(x^{int}_n, y^{int}_n, z^{int}_n, n = 1, \ldots, N) + 1)) \quad \text{Equation 1}$$

As shown in the middle of the upper part of FIG. 6, the entire 3D space may be divided into eight spaces according to partition. Each divided space is represented by a cube with six faces. As shown in the upper right of FIG. 6, each of the eight spaces is divided again based on the axes of the coordinate system (e.g., X-axis, Y-axis, and Z-axis). Accordingly, each space is divided into eight smaller spaces. The divided smaller space is also represented by a cube with six faces. This partitioning scheme is applied until the leaf node of the octree becomes a voxel.

The lower part of FIG. 6 shows an octree occupancy code. The occupancy code of the octree is generated to indicate whether each of the eight divided spaces generated by dividing one space contains at least one point. Accordingly, a single occupancy code is represented by eight child nodes. Each child node represents the occupancy of a divided space, and the child node has a value in 1 bit. Accordingly, the occupancy code is represented as an 8-bit code. That is, when at least one point is contained in the space corresponding to a child node, the node is assigned a value of 1. When no point is contained in the space corresponding to the child node (the space is empty), the node is assigned a value of 0. Since the occupancy code shown in FIG. 6 is 00100001, it indicates that the spaces corresponding to the third child node and the eighth child node among the eight child nodes each contain at least one point. As shown in the figure, each of the third child node and the eighth child node has eight child nodes, and the child nodes are represented by an 8-bit occupancy code. The figure shows that the occupancy code of the third child node is 10000111, and the occupancy code of the eighth child node is 01001111. The point cloud video encoder (for example, the arithmetic encoder 40004) according to the embodiments may perform entropy encoding on the occupancy codes. In order to increase the compression efficiency, the point cloud video encoder may perform intra/inter-coding on the occupancy codes. The reception device (for example, the reception device 10004 or the point cloud video decoder 10006) according to the embodiments reconstructs the octree based on the occupancy codes.

The point cloud video encoder (for example, the octree analyzer 40002) according to the embodiments may perform voxelization and octree coding to store the positions of points. However, points are not always evenly distributed in the 3D space, and accordingly there may be a specific region in which fewer points are present. Accordingly, it is inefficient to perform voxelization for the entire 3D space. For example, when a specific region contains few points, voxelization does not need to be performed in the specific region.

Accordingly, for the above-described specific region (or a node other than the leaf node of the octree), the point cloud video encoder according to the embodiments may skip voxelization and perform direct coding to directly code the positions of points included in the specific region. The coordinates of a direct coding point according to the embodiments are referred to as direct coding mode (DCM). The point cloud video encoder according to the embodiments may also perform trisoup geometry encoding, which is to reconstruct the positions of the points in the specific region (or node) based on voxels, based on a surface model. The trisoup geometry encoding is geometry encoding that represents an object as a series of triangular meshes. Accordingly, the point cloud video decoder may generate a point cloud from the mesh surface. The direct coding and trisoup geometry encoding according to the embodiments may be selectively performed. In addition, the direct coding and trisoup geometry encoding according to the embodiments may be performed in combination with octree geometry coding (or octree coding).

To perform direct coding, the option to use the direct mode for applying direct coding should be activated. A node to which direct coding is to be applied is not a leaf node, and points less than a threshold should be present within a specific node. In addition, the total number of points to which direct coding is to be applied should not exceed a preset threshold. When the conditions above are satisfied, the point cloud video encoder (or the arithmetic encoder 40004) according to the embodiments may perform entropy coding on the positions (or position values) of the points.

The point cloud video encoder (for example, the surface approximation analyzer 40003) according to the embodiments may determine a specific level of the octree (a level less than the depth d of the octree), and the surface model may be used staring with that level to perform trisoup geometry encoding to reconstruct the positions of points in the region of the node based on voxels (Trisoup mode). The point cloud video encoder according to the embodiments may specify a level at which trisoup geometry encoding is to be applied. For example, when the specific level is equal to the depth of the octree, the point cloud video encoder does not operate in the trisoup mode. In other words, the point cloud video encoder according to the embodiments may operate in the trisoup mode only when the specified level is less than the value of depth of the octree. The 3D cube region of the nodes at the specified level according to the embodiments is called a block. One block may include one or more voxels. The block or voxel may correspond to a brick. Geometry is represented as a surface within each block. The surface according to embodiments may intersect with each edge of a block at most once.

One block has 12 edges, and accordingly there are at least 12 intersections in one block. Each intersection is called a vertex (or apex). A vertex present along an edge is detected when there is at least one occupied voxel adjacent to the edge among all blocks sharing the edge. The occupied voxel according to the embodiments refers to a voxel containing a point. The position of the vertex detected along the edge is the average position along the edge of all voxels adjacent to the edge among all blocks sharing the edge.

-continued $$\sum_{i=1}^{n} \begin{bmatrix} \overline{x}_i^2 \\ \overline{y}_i^2 \\ \overline{z}_i^2 \end{bmatrix}$$

Then, the minimum value of the sum is estimated, and the projection process is performed according to the axis with the minimum value. For example, when the element x is the minimum, each vertex is projected on the x-axis with respect to the center of the block, and projected on the (y, z) plane. When the values obtained through projection on the (y, z) plane are (ai, bi), the value of θ is estimated through a tan 2(bi, ai), and the vertices are ordered based on the value of θ. The table 1 below shows a combination of vertices for creating a triangle according to the number of the vertices. The vertices are ordered from 1 to n. The table 1 below shows that for four vertices, two triangles may be constructed according to combinations of vertices. The first triangle may consist of vertices 1, 2, and 3 among the ordered vertices, and the second triangle may consist of vertices 3, 4, and 1 among the ordered vertices.

TABLE 1

Triangles formed from vertices ordered 1,...,n

| n | Triangles |
|---|---|
| 3 | (1,2,3) |
| 4 | (1,2,3), (3,4,1) |
| 5 | (1,2,3), (3,4,5), (5,1,3) |
| 6 | (1,2,3), (3,4,5), (5,6,1), (1,3,5) |
| 7 | (1,2,3), (3,4,5), (5,6,7), (7,1,3), (3,5,7) |
| 8 | (1,2,3), (3,4,5), (5,6,7), (7,8,1), (1,3,5), (5,7,1) |
| 9 | (1,2,3), (3,4,5), (5,6,7), (7,8,9), (9,1,3), (3,5,7), (7,9,3) |
| 10 | (1,2,3), (3,4,5), (5,6,7), (7,8,9), (9,10,1), (1,3,5), (5,7,9), (9,1,5) |
| 11 | (1,2,3), (3,4,5), (5,6,7), (7,8,9), (9,10,11), (11,1,3), (3,5,7), (7,9,11), (11,3,7) |
| 12 | (1,2,3), (3,4,5), (5,6,7), (7,8,9), (9,10,11), (11,12,1), (1,3,5), (5,7,9), (9,11,1), (1,5,9) |

Once the vertex is detected, the point cloud video encoder according to the embodiments may perform entropy encoding on the starting point (x, y, z) of the edge, the direction vector (Δx, Δy, Δz) of the edge, and the vertex position value (relative position value within the edge). When the trisoup geometry encoding is applied, the point cloud video encoder according to the embodiments (for example, the geometry reconstructor 40005) may generate restored geometry (reconstructed geometry) by performing the triangle reconstruction, up-sampling, and voxelization processes.

The vertices positioned at the edge of the block determine a surface that passes through the block. The surface according to the embodiments is a non-planar polygon. In the triangle reconstruction process, a surface represented by a triangle is reconstructed based on the starting point of the edge, the direction vector of the edge, and the position values of the vertices. The triangle reconstruction process is performed according to Equation 2 by: i) calculating the centroid value of each vertex, ii) subtracting the center value from each vertex value, and iii) estimating the sum of the squares of the values obtained by the subtraction.

$$① \begin{bmatrix} \mu_x \\ \mu_y \\ \mu_z \end{bmatrix} = \frac{1}{n} \sum_{i=1}^{n} \begin{bmatrix} x_i \\ y_i \\ z_i \end{bmatrix} \quad ② \begin{bmatrix} \overline{x}_i \\ \overline{y}_i \\ \overline{z}_i \end{bmatrix} = \begin{bmatrix} x_i \\ y_i \\ z_i \end{bmatrix} - \begin{bmatrix} \mu_x \\ \mu_y \\ \mu_z \end{bmatrix} \quad ③ \begin{bmatrix} \sigma_x^2 \\ \sigma_y^2 \\ \sigma_z^2 \end{bmatrix} = \quad \text{Equation 2}$$

The upsampling process is performed to add points in the middle along the edge of the triangle and perform voxelization. The added points are generated based on the upsampling factor and the width of the block. The added points are called refined vertices. The point cloud video encoder according to the embodiments may voxelize the refined vertices. In addition, the point cloud video encoder may perform attribute encoding based on the voxelized positions (or position values).

FIG. 7 shows an example of a neighbor node pattern according to embodiments.

In order to increase the compression efficiency of the point cloud video, the point cloud video encoder according to the embodiments may perform entropy coding based on context adaptive arithmetic coding.

As described with reference to FIGS. 1 to 6, the point cloud content providing system or the point cloud video encoder 10002 of FIG. 1, or the point cloud video encoder or arithmetic encoder 40004 of FIG. 4 may perform entropy coding on the occupancy code immediately. In addition, the point cloud content providing system or the point cloud video encoder may perform entropy encoding (intra encoding) based on the occupancy code of the current node and the occupancy of neighboring nodes, or perform entropy encoding (inter encoding) based on the occupancy code of the previous frame. A frame according to embodiments represents a set of point cloud videos generated at the same time.

The compression efficiency of intra encoding/inter encoding according to the embodiments may depend on the number of neighboring nodes that are referenced. When the bits increase, the operation becomes complicated, but the encoding may be biased to one side, which may increase the compression efficiency. For example, when a 3-bit context is given, coding needs to be performed using $2^3=8$ methods. The part divided for coding affects the complexity of implementation. Accordingly, it is necessary to meet an appropriate level of compression efficiency and complexity.

FIG. 7 illustrates a process of obtaining an occupancy pattern based on the occupancy of neighbor nodes. The point cloud video encoder according to the embodiments determines occupancy of neighbor nodes of each node of the octree and obtains a value of a neighbor pattern. The neighbor node pattern is used to infer the occupancy pattern of the node. The up part of FIG. 7 shows a cube corresponding to a node (a cube positioned in the middle) and six cubes (neighbor nodes) sharing at least one face with the cube. The nodes shown in the figure are nodes of the same depth. The numbers shown in the figure represent weights (1, 2, 4, 8, 16, and 32) associated with the six nodes, respectively. The weights are assigned sequentially according to the positions of neighboring nodes.

The down part of FIG. 7 shows neighbor node pattern values. A neighbor node pattern value is the sum of values multiplied by the weight of an occupied neighbor node (a neighbor node having a point). Accordingly, the neighbor node pattern values are 0 to 63. When the neighbor node pattern value is 0, it indicates that there is no node having a point (no occupied node) among the neighbor nodes of the node. When the neighbor node pattern value is 63, it indicates that all neighbor nodes are occupied nodes. As shown in the figure, since neighbor nodes to which weights 1, 2, 4, and 8 are assigned are occupied nodes, the neighbor node pattern value is 15, the sum of 1, 2, 4, and 8. The point cloud video encoder may perform coding according to the neighbor node pattern value (for example, when the neighbor node pattern value is 63, 64 kinds of coding may be performed). According to embodiments, the point cloud video encoder may reduce coding complexity by changing a neighbor node pattern value (for example, based on a table by which 64 is changed to 10 or 6).

Figure 8:
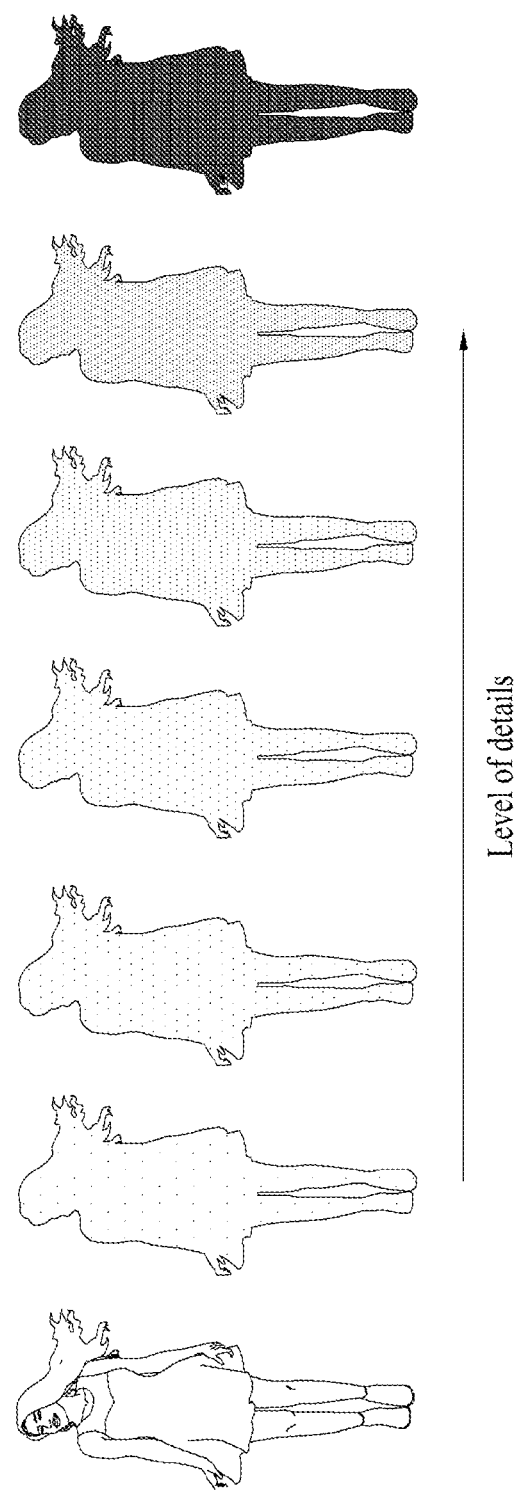
FIG. 8 illustrates an example of point configuration of a point cloud content for each LOD according to embodiments.

FIG. 8 illustrates an example of point configuration in each LOD according to embodiments.

As described with reference to FIGS. 1 to 7, encoded geometry is reconstructed (decompressed) before attribute encoding is performed. When direct coding is applied, the geometry reconstruction operation may include changing the placement of direct coded points (e.g., placing the direct coded points in front of the point cloud data). When trisoup geometry encoding is applied, the geometry reconstruction process is performed through triangle reconstruction, up-sampling, and voxelization. Since the attribute depends on the geometry, attribute encoding is performed based on the reconstructed geometry.

The point cloud video encoder (for example, the LOD generator 40009) may classify (reorganize or group) points by LOD. Figure shows the point cloud content corresponding to LODs. The leftmost picture in figure represents original point cloud content. The second picture from the left of figure represents distribution of the points in the lowest LOD, and the rightmost picture in figure represents distribution of the points in the highest LOD. That is, the points in the lowest LOD are sparsely distributed, and the points in the highest LOD are densely distributed. That is, as the LOD rises in the direction pointed by the arrow indicated at the bottom of figure, the space (or distance) between points is narrowed.

Figure 9:
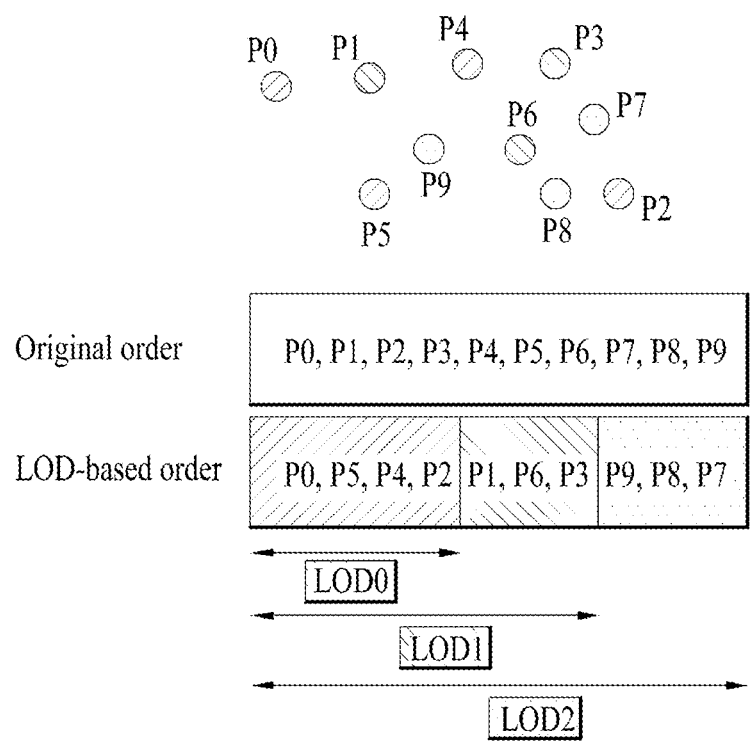
FIG. 9 illustrates an example of point configuration of a point cloud content for each LOD according to embodiments.

FIG. 9 illustrates an example of point configuration for each LOD according to embodiments.

As described with reference to FIGS. 1 to 8, the point cloud content providing system, or the point cloud video encoder (for example, the point cloud video encoder 10002 of FIG. 1, the point cloud video encoder of FIG. 4, or the LOD generator 40009) may generates an LOD. The LOD is generated by reorganizing the points into a set of refinement levels according to a set LOD distance value (or a set of Euclidean distances). The LOD generation process is performed not only by the point cloud video encoder, but also by the point cloud video decoder.

The upper part of FIG. 9 shows examples (P0 to P9) of points of the point cloud content distributed in a 3D space. In FIG. 9, the original order represents the order of points P0 to P9 before LOD generation. In FIG. 9, the LOD based order represents the order of points according to the LOD generation. Points are reorganized by LOD. Also, a high LOD contains the points belonging to lower LODs. As shown in FIG. 9, LOD0 contains P0, P5, P4 and P2. LOD1 contains the points of LOD0, P1, P6 and P3. LOD2 contains the points of LOD0, the points of LOD1, P9, P8 and P7.

As described with reference to FIG. 4, the point cloud video encoder according to the embodiments may perform prediction transform coding based on LOD, lifting transform coding based on LOD, and RAHT transform coding selectively or in combination.

The point cloud video encoder according to the embodiments may generate a predictor for points to perform prediction transform coding based on LOD for setting a predicted attribute (or predicted attribute value) of each point. That is, N predictors may be generated for N points. The predictor according to the embodiments may calculate a weight (=1/distance) based on the LOD value of each point, indexing information about neighboring points present within a set distance for each LOD, and a distance to the neighboring points.

The predicted attribute (or attribute value) according to the embodiments is set to the average of values obtained by multiplying the attributes (or attribute values) (e.g., color, reflectance, etc.) of neighbor points set in the predictor of each point by a weight (or weight value) calculated based on the distance to each neighbor point. The point cloud video encoder according to the embodiments (for example, the coefficient quantizer 40011) may quantize and inversely quantize the residual of each point (which may be called residual attribute, residual attribute value, attribute prediction residual value or prediction error attribute value and so on) obtained by subtracting a predicted attribute (or attribute value) each point from the attribute (i.e., original attribute value) of each point. The quantization process performed for a residual attribute value in a transmission device is configured as shown in table 2. The inverse quantization process performed for a residual attribute value in a reception device is configured as shown in table 3.

TABLE 2

```
int PCCQuantization(int value, int quantStep) {
if( value >=0) {
return floor(value / quantStep + 1.0 / 3.0);
} else {
return -floor(-value / quantStep + 1.0 / 3.0);
}
}
```

TABLE 3

```
int PCCInverseQuantization(int value, int quantStep) {
if( quantStep ==0) {
return value;
} else {
return value * quantStep;
}
}
```

When the predictor of each point has neighbor points, the point cloud video encoder (e.g., the arithmetic encoder 40012) according to the embodiments may perform entropy coding on the quantized and inversely quantized residual attribute values (or residual values) as described above. When the predictor of each point has no neighbor point, the point cloud video encoder according to the embodiments (for example, the arithmetic encoder 40012) may perform entropy coding on the attributes of the corresponding point without performing the above-described operation.

The point cloud video encoder according to the embodiments (for example, the lifting transformer 40010) may generate a predictor of each point, set the calculated LOD and register neighbor points in the predictor, and set weights according to the distances to neighbor points to perform lifting transform coding. The lifting transform coding according to the embodiments is similar to the above-described prediction transform coding, but differs therefrom in that weights are cumulatively applied to attribute values. The process of cumulatively applying weights to the attribute values according to embodiments is configured as follows.

1) Create an array Quantization Weight (QW) for storing the weight value of each point. The initial value of all elements of QW is 1.0. Multiply the QW values of the predictor indexes of the neighbor nodes registered in the predictor by the weight of the predictor of the current point, and add the values obtained by the multiplication.

2) Lift prediction process: Subtract the value obtained by multiplying the attribute value of the point by the weight from the existing attribute value to calculate a predicted attribute value.

3) Create temporary arrays called updateweight and update and initialize the temporary arrays to zero.

4) Cumulatively add the weights calculated by multiplying the weights calculated for all predictors by a weight stored in the QW corresponding to a predictor index to the updateweight array as indexes of neighbor nodes. Cumulatively add, to the update array, a value obtained by multiplying the attribute value of the index of a neighbor node by the calculated weight.

5) Lift update process: Divide the attribute values of the update array for all predictors by the weight value of the updateweight array of the predictor index, and add the existing attribute value to the values obtained by the division.

6) Calculate predicted attributes by multiplying the attribute values updated through the lift update process by the weight updated through the lift prediction process (stored in the QW) for all predictors. The point cloud video encoder (e.g., coefficient quantizer 40011) according to the embodiments quantizes the predicted attribute values. In addition, the point cloud video encoder (e.g., the arithmetic encoder 40012) performs entropy coding on the quantized attribute values.

The point cloud video encoder (for example, the RAHT transformer 40008) according to the embodiments may perform RAHT transform coding in which attributes of nodes of a higher level are predicted using the attributes associated with nodes of a lower level in the octree. RAHT transform coding is an example of attribute intra coding through an octree backward scan. The point cloud video encoder according to the embodiments scans the entire region from the voxel and repeats the merging process of merging the voxels into a larger block at each step until the root node is reached. The merging process according to the embodiments is performed only on the occupied nodes. The merging process is not performed on the empty node. The merging process is performed on an upper node immediately above the empty node.

Equation 3 below represents a RAHT transformation matrix. In Equation 3, $g_{l_{x,y,z}}$ denotes the average attribute value of voxels at level l. $g_{l_{x,y,z}}$ may be calculated based on $g_{l+1_{2x,y,z}}$ and $g_{l+1_{2x+1,y,z}}$. The weights for $g_{l_{2x,y,z}}$ and $g_{l_{2x+1,y,z}}$ are $w1=w_{l_{2x,y,z}}$ and $w2=w_{l_{2x+1,y,z}}$.

$$\begin{bmatrix} g_{l-1_{x,y,z}} \\ h_{l-1_{x,y,z}} \end{bmatrix} = T_{w1\,w2} \begin{bmatrix} g_{l_{2x,y,z}} \\ g_{l_{2x+1,y,z}} \end{bmatrix} T_{w1\,w2} = \frac{1}{\sqrt{w1+w2}} \begin{bmatrix} \sqrt{w1} & \sqrt{w2} \\ -\sqrt{w2} & \sqrt{w1} \end{bmatrix}$$

Equation 3

Here, $g_{l-1_{x,y,z}}$ is a low-pass value and is used in the merging process at the next higher level. $h_{l-1_{x,y,z}}$ denotes high-pass coefficients. The high-pass coefficients at each step are quantized and subjected to entropy coding (for example, encoding by the arithmetic encoder 40012). The weights are calculated as $w_{l-1_{x,y,z}} = w_{l_{2x,y,z}} + w_{l_{2x+1,y,z}}$. The root node is created through the $g_{l_{0,0,0}}$ and $g_{l_{0,0,1}}$ as Equation 4.

$$\begin{bmatrix} gDC \\ h_{0_{0,0,0}} \end{bmatrix} = T_{w1000\,w1001} \begin{bmatrix} g_{l_{0,0,0z}} \\ g_{l_{0,0,1}} \end{bmatrix}$$

Equation 4

The value of gDC is also quantized and subjected to entropy coding like the high-pass coefficients.

Figure 10:
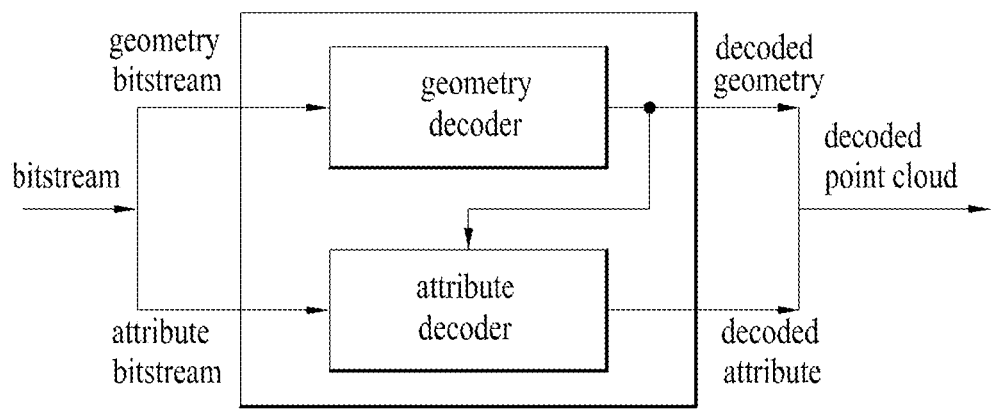
FIG. 10 illustrates an example of a block diagram of a point cloud video decoder according to embodiments.

FIG. 10 illustrates a point cloud video decoder according to embodiments.

The point cloud video decoder illustrated in FIG. 10 is an example of the point cloud video decoder 10006 described in FIG. 1, and may perform the same or similar operations as the operations of the point cloud video decoder 10006 illustrated in FIG. 1. As shown in the figure, the point cloud video decoder may receive a geometry bitstream and an attribute bitstream contained in one or more bitstreams. The point cloud video decoder includes a geometry decoder and an attribute decoder. The geometry decoder performs geometry decoding on the geometry bitstream and outputs decoded geometry. The attribute decoder performs attribute decoding on the attribute bitstream based on the decoded geometry, and outputs decoded attributes. The decoded geometry and decoded attributes are used to reconstruct point cloud content (a decoded point cloud).

Figure 11:
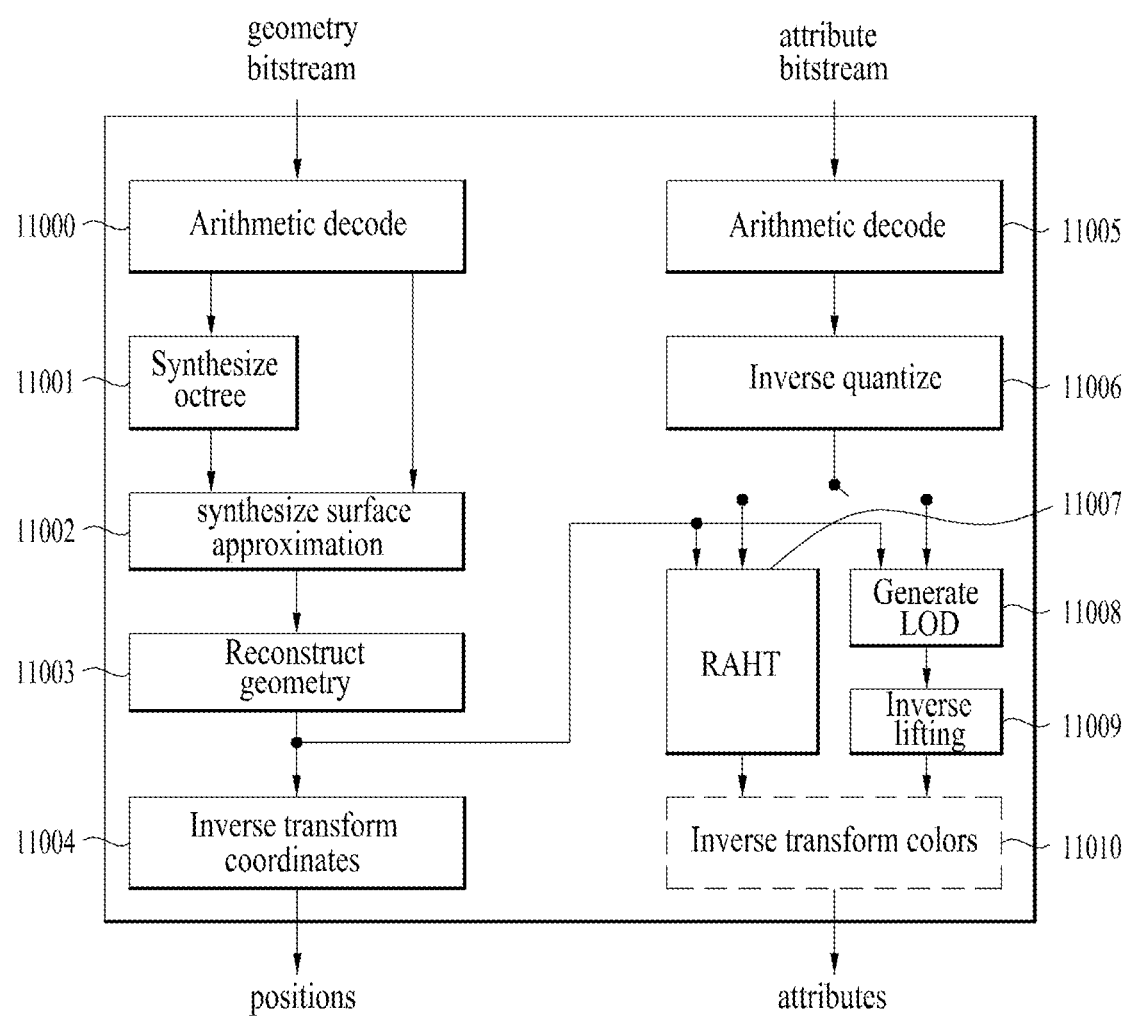
FIG. 11 illustrates an example of a point cloud video decoder according to embodiments.

FIG. 11 illustrates a point cloud video decoder according to embodiments.

The point cloud video decoder illustrated in FIG. 11 is an example of the point cloud video decoder illustrated in FIG. 10, and may perform a decoding operation, which is an inverse process of the encoding operation of the point cloud video encoder illustrated in FIGS. 1 to 9.

As described with reference to FIGS. 1 and 10, the point cloud video decoder may perform geometry decoding and attribute decoding. The geometry decoding is performed before the attribute decoding.

The point cloud video decoder according to the embodiments includes an arithmetic decoder (Arithmetic decode) 11000, an octree synthesizer (Synthesize octree) 11001, a surface approximation synthesizer (Synthesize surface approximation) 11002, and a geometry reconstructor (Reconstruct geometry) 11003, a coordinate inverse transformer (Inverse transform coordinates) 11004, an arithmetic decoder (Arithmetic decode) 11005, an inverse quantizer (Inverse quantize) 11006, a RAHT transformer 11007, an LOD generator (Generate LOD) 11008, an inverse lifter (inverse lifting) 11009, and/or a color inverse transformer (Inverse transform colors) 11010.

The arithmetic decoder 11000, the octree synthesizer 11001, the surface approximation synthesizer 11002, and the geometry reconstructor 11003, and the coordinate inverse transformer 11004 may perform geometry decoding. The geometry decoding according to the embodiments may include direct decoding and trisoup geometry decoding. The direct decoding and trisoup geometry decoding are selectively applied. The geometry decoding is not limited to the above-described example, and is performed as an inverse process of the geometry encoding described with reference to FIGS. 1 to 9.

The arithmetic decoder 11000 according to the embodiments decodes the received geometry bitstream based on the arithmetic coding. The operation of the arithmetic decoder 11000 corresponds to the inverse process of the arithmetic encoder 40004.

The octree synthesizer 11001 according to the embodiments may generate an octree by acquiring an occupancy code from the decoded geometry bitstream (or information on the geometry secured as a result of decoding). The occupancy code is configured as described in detail with reference to FIGS. 1 to 9.

When the trisoup geometry encoding is applied, the surface approximation synthesizer 11002 according to the embodiments may synthesize a surface based on the decoded geometry and/or the generated octree.

The geometry reconstructor 11003 according to the embodiments may regenerate geometry based on the surface and/or the decoded geometry. As described with reference to FIGS. 1 to 9, direct coding and trisoup geometry encoding are selectively applied. Accordingly, the geometry reconstructor 11003 directly imports and adds position information about the points to which direct coding is applied. When the trisoup geometry encoding is applied, the geometry reconstructor 11003 may reconstruct the geometry by performing the reconstruction operations of the geometry reconstructor 40005, for example, triangle reconstruction, up-sampling, and voxelization. Details are the same as those described with reference to FIG. 6, and thus description thereof is omitted. The reconstructed geometry may include a point cloud picture or frame that does not contain attributes.

The coordinate inverse transformer 11004 according to the embodiments may acquire positions of the points by transforming the coordinates based on the reconstructed geometry.

The arithmetic decoder 11005, the inverse quantizer 11006, the RAHT transformer 11007, the LOD generator 11008, the inverse lifter 11009, and/or the color inverse transformer 11010 may perform the attribute decoding described with reference to FIG. 10. The attribute decoding according to the embodiments includes region adaptive hierarchical transform (RAHT) decoding, interpolation-based hierarchical nearest-neighbor prediction (prediction transform) decoding, and interpolation-based hierarchical nearest-neighbor prediction with an update/lifting step (lifting transform) decoding. The three decoding schemes described above may be used selectively, or a combination of one or more decoding schemes may be used. The attribute decoding according to the embodiments is not limited to the above-described example.

The arithmetic decoder 11005 according to the embodiments decodes the attribute bitstream by arithmetic coding.

The inverse quantizer 11006 according to the embodiments inversely quantizes the information about the decoded attribute bitstream or attributes secured as a result of the decoding, and outputs the inversely quantized attributes (or attribute values). The inverse quantization may be selectively applied based on the attribute encoding of the point cloud video encoder.

According to embodiments, the RAHT transformer 11007, the LOD generator 11008, and/or the inverse lifter 11009 may process the reconstructed geometry and the inversely quantized attributes. As described above, the RAHT transformer 11007, the LOD generator 11008, and/or the inverse lifter 11009 may selectively perform a decoding operation corresponding to the encoding of the point cloud video encoder.

The color inverse transformer 11010 according to the embodiments performs inverse transform coding to inversely transform a color value (or texture) included in the decoded attributes. The operation of the color inverse transformer 11010 may be selectively performed based on the operation of the color transformer 40006 of the point cloud video encoder.

Although not shown in the figure, the elements of the point cloud video decoder of FIG. 11 may be implemented by hardware including one or more processors or integrated circuits configured to communicate with one or more memories included in the point cloud content providing apparatus, software, firmware, or a combination thereof. The one or more processors may perform at least one or more of the operations and/or functions of the elements of the point cloud video decoder of FIG. 11 described above. Additionally, the one or more processors may operate or execute a set of software programs and/or instructions for performing the operations and/or functions of the elements of the point cloud video decoder of FIG. 11.

Figure 12:
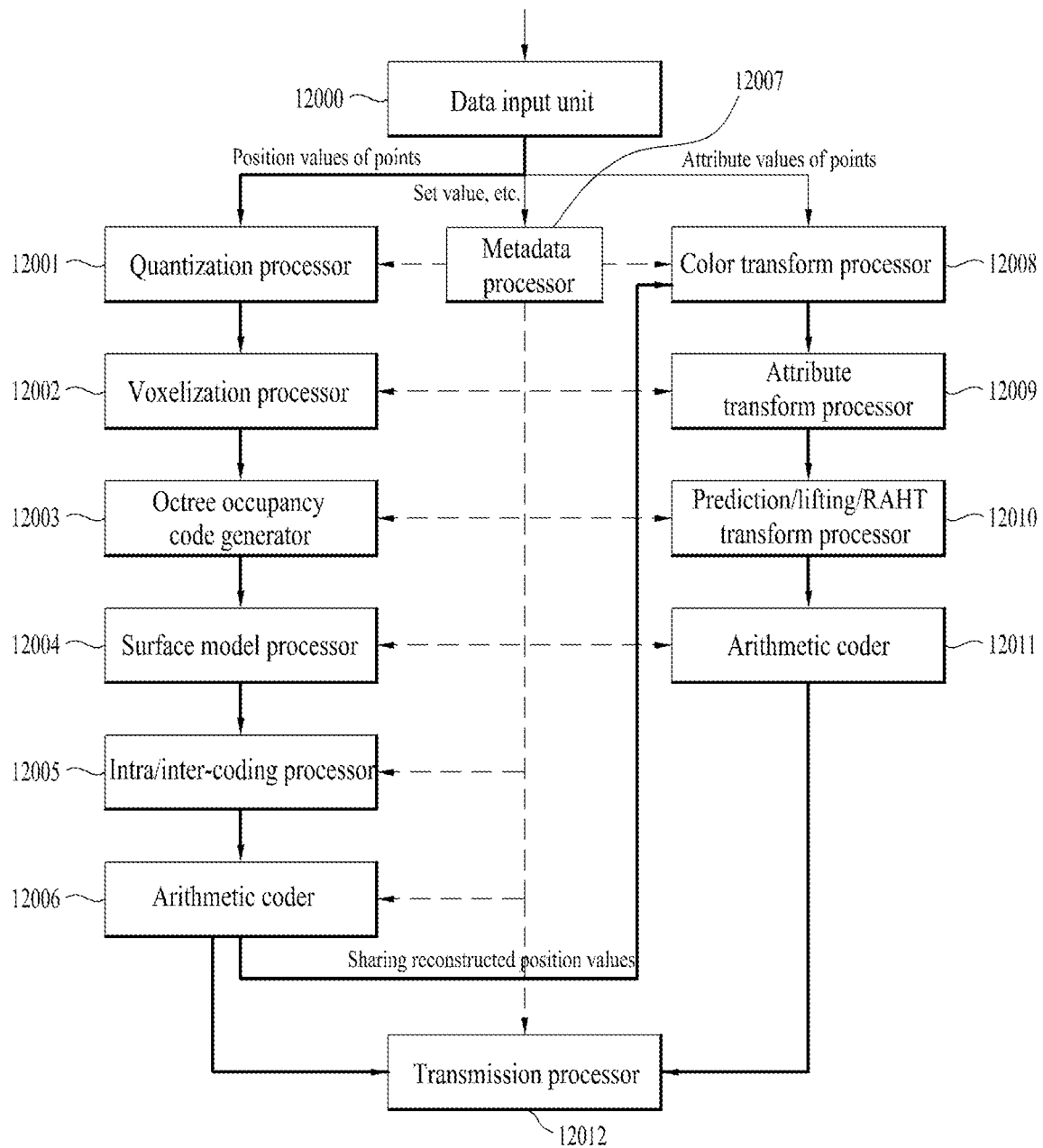
FIG. 12 illustrates a configuration for point cloud video encoding of a transmission device according to embodiments.

FIG. 12 illustrates a transmission device according to embodiments.

The transmission device shown in FIG. 12 is an example of the transmission device 10000 of FIG. 1 (or the point cloud video encoder of FIG. 4). The transmission device illustrated in FIG. 12 may perform one or more of the operations and methods the same as or similar to those of the point cloud video encoder described with reference to FIGS. 1 to 9. The transmission device according to the embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a prediction/lifting/RAHT transform processor 12010, an arithmetic coder 12011 and/or a transmission processor 12012.

The data input unit 12000 according to the embodiments receives or acquires point cloud data. The data input unit 12000 may perform an operation and/or acquisition method the same as or similar to the operation and/or acquisition method of the point cloud video acquisition unit 10001 (or the acquisition process 20000 described with reference to FIG. 2).

The data input unit 12000, the quantization processor 12001, the voxelization processor 12002, the octree occupancy code generator 12003, the surface model processor 12004, the intra/inter-coding processor 12005, and the arithmetic coder 12006 perform geometry encoding. The geometry encoding according to the embodiments is the same as or similar to the geometry encoding described with reference to FIGS. 1 to 9, and thus a detailed description thereof is omitted.

The quantization processor 12001 according to the embodiments quantizes geometry (e.g., position values of points). The operation and/or quantization of the quantization processor 12001 is the same as or similar to the operation and/or quantization of the quantizer 40001 described with reference to FIG. 4. Details are the same as those described with reference to FIGS. 1 to 9.

The voxelization processor 12002 according to embodiments voxelizes the quantized position values of the points. The voxelization processor 12002 may perform an operation and/or process the same or similar to the operation and/or the voxelization process of the quantizer 40001 described with reference to FIG. 4. Details are the same as those described with reference to FIGS. 1 to 9.

The octree occupancy code generator 12003 according to the embodiments performs octree coding on the voxelized positions of the points based on an octree structure. The octree occupancy code generator 12003 may generate an occupancy code. The octree occupancy code generator 12003 may perform an operation and/or method the same as or similar to the operation and/or method of the point cloud video encoder (or the octree analyzer 40002) described with reference to FIGS. 4 and 6. Details are the same as those described with reference to FIGS. 1 to 9.

The surface model processor 12004 according to the embodiments may perform trisoup geometry encoding based on a surface model to reconstruct the positions of points in a specific region (or node) on a voxel basis. The surface model processor 12004 may perform an operation and/or method the same as or similar to the operation and/or method of the point cloud video encoder (for example, the surface approximation analyzer 40003) described with reference to FIG. 4. Details are the same as those described with reference to FIGS. 1 to 9.

The intra/inter-coding processor 12005 according to the embodiments may perform intra/inter-coding on point cloud data. The intra/inter-coding processor 12005 may perform coding the same as or similar to the intra/inter-coding described with reference to FIG. 7. Details are the same as those described with reference to FIG. 7. According to embodiments, the intra/inter-coding processor 12005 may be included in the arithmetic coder 12006.

The arithmetic coder 12006 according to the embodiments performs entropy encoding on an octree of the point cloud data and/or an approximated octree. For example, the encoding scheme includes arithmetic encoding. The arithmetic coder 12006 performs an operation and/or method the same as or similar to the operation and/or method of the arithmetic encoder 40004.

The metadata processor 12007 according to the embodiments processes metadata about the point cloud data, for example, a set value, and provides the same to a necessary processing process such as geometry encoding and/or attribute encoding. Also, the metadata processor 12007 according to the embodiments may generate and/or process signaling information related to the geometry encoding and/or the attribute encoding. The signaling information according to the embodiments may be encoded separately from the geometry encoding and/or the attribute encoding. The signaling information according to the embodiments may be interleaved.

The color transform processor 12008, the attribute transform processor 12009, the prediction/lifting/RAHT transform processor 12010, and the arithmetic coder 12011 perform the attribute encoding. The attribute encoding according to the embodiments is the same as or similar to the attribute encoding described with reference to FIGS. 1 to 9, and thus a detailed description thereof is omitted.

The color transform processor 12008 according to the embodiments performs color transform coding to transform color values included in attributes. The color transform processor 12008 may perform color transform coding based on the reconstructed geometry. The reconstructed geometry is the same as described with reference to FIGS. 1 to 9. Also, it performs an operation and/or method the same as or similar to the operation and/or method of the color transformer 40006 described with reference to FIG. 4 is performed. The detailed description thereof is omitted.

The attribute transform processor 12009 according to the embodiments performs attribute transformation to transform the attributes based on the reconstructed geometry and/or the positions on which geometry encoding is not performed. The attribute transform processor 12009 performs an operation and/or method the same as or similar to the operation and/or method of the attribute transformer 40007 described with reference to FIG. 4. The detailed description thereof is omitted. The prediction/lifting/RAHT transform processor 12010 according to the embodiments may code the transformed attributes by any one or a combination of RAHT coding, prediction transform coding, and lifting transform coding. The prediction/lifting/RAHT transform processor 12010 performs at least one of the operations the same as or similar to the operations of the RAHT transformer 40008, the LOD generator 40009, and the lifting transformer 40010 described with reference to FIG. 4. In addition, the prediction transform coding, the lifting transform coding, and the RAHT transform coding are the same as those described with reference to FIGS. 1 to 9, and thus a detailed description thereof is omitted.

The arithmetic coder 12011 according to the embodiments may encode the coded attributes based on the arithmetic coding. The arithmetic coder 12011 performs an operation and/or method the same as or similar to the operation and/or method of the arithmetic encoder 40012.

The transmission processor 12012 according to the embodiments may transmit each bitstream containing encoded geometry and/or encoded attributes and/or metadata (or referred to as metadata information), or transmit one bitstream configured with the encoded geometry and/or the encoded attributes and/or the metadata. When the encoded geometry and/or the encoded attributes and/or the metadata according to the embodiments are configured into one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS or tile inventory) for signaling of a tile level, and slice data. The slice data may include information about one or more slices. One slice according to embodiments may include one geometry bitstream Geom0⁰ and one or more attribute bitstreams Attr0⁰ and Attr1⁰. The TPS (or tile inventory) according to the embodiments may include information about each tile (for example, coordinate information and height/size information about a bounding box) for one or more tiles. The geometry bitstream may contain a header and a payload. The header of the geometry bitstream according to the embodiments may contain a parameter set identifier (geom_parameter_set id), a tile identifier (geom_tile_id) and a slice identifier (geom_slice_id) included in the GPS, and information about the data contained in the payload. As described above, the metadata processor 12007 according to the embodiments may generate and/or process the signaling information and transmit the same to the transmission processor 12012. According to embodiments, the elements to perform geometry encoding and the elements to perform attribute encoding may share data/information with each other as indicated by dotted lines. The transmission processor 12012 according to the embodiments may perform an operation and/or transmission method the same as or similar to the operation and/or transmission method of the transmitter 10003. Details are the same as those described with reference to FIGS. 1 and 2, and thus a description thereof is omitted.

Figure 13:
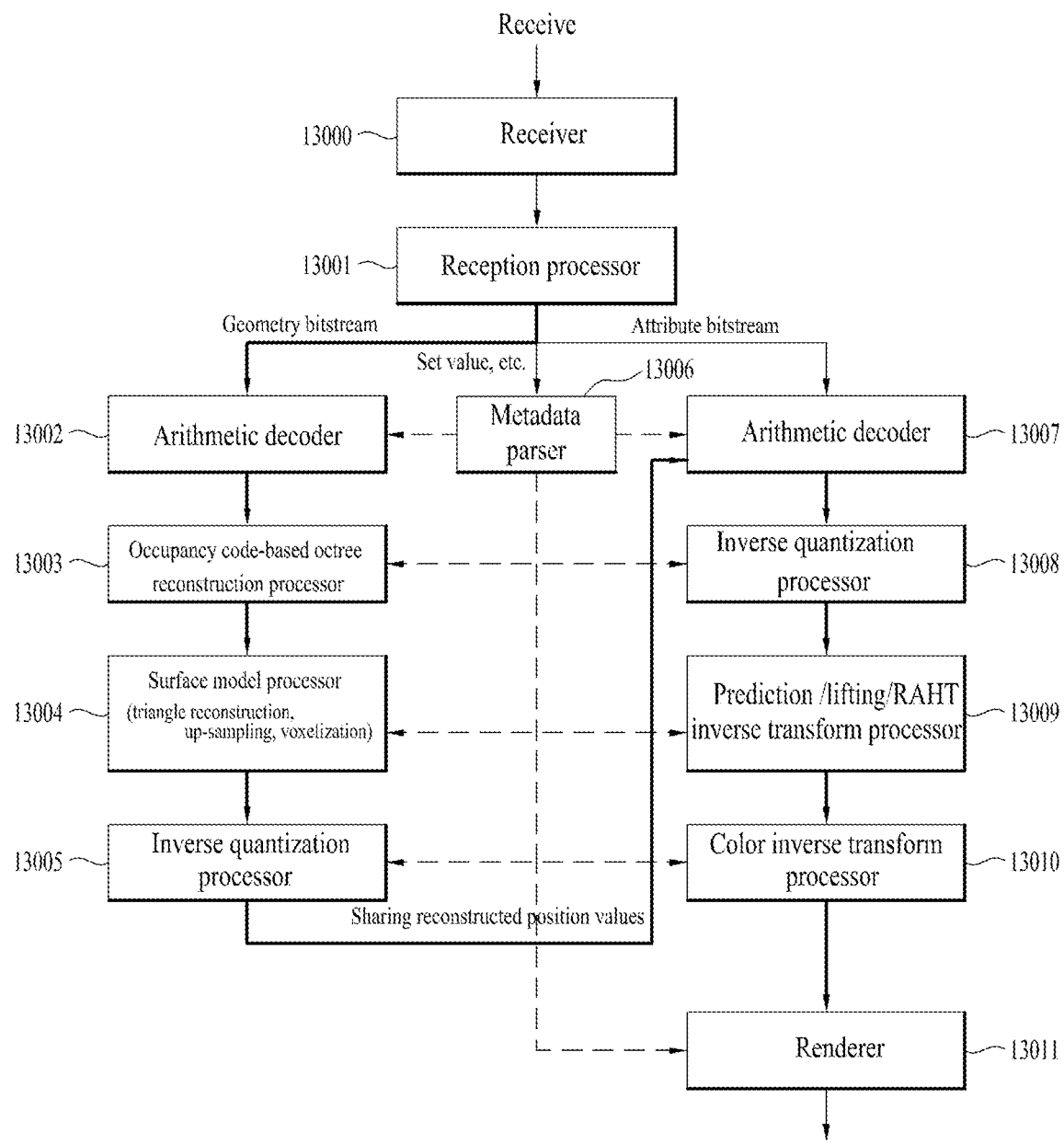
FIG. 13 illustrates a configuration for point cloud video decoding of a reception device according to embodiments.

FIG. 13 illustrates a reception device according to embodiments.

The reception device illustrated in FIG. 13 is an example of the reception device 10004 of FIG. 1 (or the point cloud video decoder of FIGS. 10 and 11). The reception device illustrated in FIG. 13 may perform one or more of the operations and methods the same as or similar to those of the point cloud video decoder described with reference to FIGS. 1 to 11.

The reception device according to the embodiment includes a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a prediction/lifting/RAHT inverse transform processor 13009, a color inverse transform processor 13010, and/or a renderer 13011. Each element for decoding according to the embodiments may perform an inverse process of the operation of a corresponding element for encoding according to the embodiments.

The receiver 13000 according to the embodiments receives point cloud data. The receiver 13000 may perform an operation and/or reception method the same as or similar to the operation and/or reception method of the receiver 10005 of FIG. 1. The detailed description thereof is omitted.

The reception processor 13001 according to the embodiments may acquire a geometry bitstream and/or an attribute bitstream from the received data. The reception processor 13001 may be included in the receiver 13000.

The arithmetic decoder 13002, the occupancy code-based octree reconstruction processor 13003, the surface model processor 13004, and the inverse quantization processor 1305 may perform geometry decoding. The geometry decoding according to embodiments is the same as or similar to the geometry decoding described with reference to FIGS. 1 to 10, and thus a detailed description thereof is omitted.

The arithmetic decoder 13002 according to the embodiments may decode the geometry bitstream based on arithmetic coding. The arithmetic decoder 13002 performs an operation and/or coding the same as or similar to the operation and/or coding of the arithmetic decoder 11000.

The occupancy code-based octree reconstruction processor 13003 according to the embodiments may reconstruct an octree by acquiring an occupancy code from the decoded geometry bitstream (or information about the geometry secured as a result of decoding). The occupancy code-based octree reconstruction processor 13003 performs an operation and/or method the same as or similar to the operation and/or octree generation method of the octree synthesizer 11001. When the trisoup geometry encoding is applied, the surface model processor 1302 according to the embodiments may perform trisoup geometry decoding and related geometry reconstruction (for example, triangle reconstruction, up-sampling, voxelization) based on the surface model method. The surface model processor 1302 performs an operation the same as or similar to that of the surface approximation synthesizer 11002 and/or the geometry reconstructor 11003.

The inverse quantization processor 1305 according to the embodiments may inversely quantize the decoded geometry.

The metadata parser 1306 according to the embodiments may parse metadata contained in the received point cloud data, for example, a set value. The metadata parser 1306 may pass the metadata to geometry decoding and/or attribute decoding. The metadata is the same as that described with reference to FIG. 12, and thus a detailed description thereof is omitted.

The arithmetic decoder 13007, the inverse quantization processor 13008, the prediction/lifting/RAHT inverse transform processor 13009 and the color inverse transform processor 13010 perform attribute decoding. The attribute decoding is the same as or similar to the attribute decoding described with reference to FIGS. 1 to 10, and thus a detailed description thereof is omitted.

The arithmetic decoder 13007 according to the embodiments may decode the attribute bitstream by arithmetic coding. The arithmetic decoder 13007 may decode the attribute bitstream based on the reconstructed geometry. The arithmetic decoder 13007 performs an operation and/or coding the same as or similar to the operation and/or coding of the arithmetic decoder 11005.

The inverse quantization processor 13008 according to the embodiments may inversely quantize the decoded attribute bitstream. The inverse quantization processor 13008 performs an operation and/or method the same as or similar to the operation and/or inverse quantization method of the inverse quantizer 11006.

The prediction/lifting/RAHT inverse transformer 13009 according to the embodiments may process the reconstructed geometry and the inversely quantized attributes. The prediction/lifting/RAHT inverse transform processor 1301 performs one or more of operations and/or decoding the same as or similar to the operations and/or decoding of the RAHT transformer 11007, the LOD generator 11008, and/or the inverse lifter 11009. The color inverse transform processor 13010 according to the embodiments performs inverse transform coding to inversely transform color values (or textures) included in the decoded attributes. The color inverse transform processor 13010 performs an operation and/or inverse transform coding the same as or similar to the operation and/or inverse transform coding of the color inverse transformer 11010. The renderer 13011 according to the embodiments may render the point cloud data.

Figure 14:
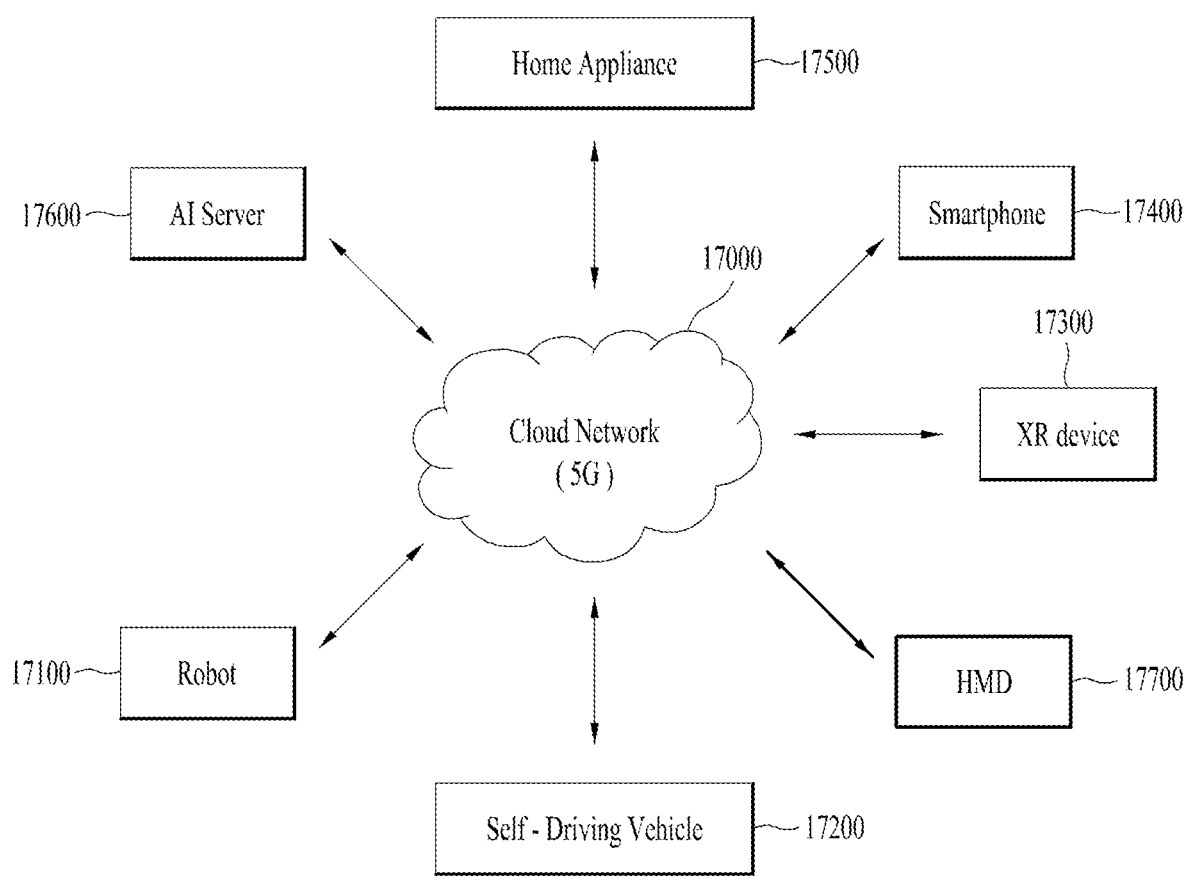
FIG. 14 illustrates an exemplary structure operatively connectable with a method/device for transmitting and receiving point cloud data according to embodiments.

FIG. 14 shows an exemplary structure operatively connectable with a method/device for transmitting and receiving point cloud data according to embodiments.

The structure of FIG. 14 represents a configuration in which at least one of a server 17600, a robot 17100, a self-driving vehicle 17200, an XR device 17300, a smartphone 17400, a home appliance 17500, and/or a head-mount display (HMD) 17700 is connected to a cloud network 17000. The robot 17100, the self-driving vehicle 17200, the XR device 17300, the smartphone 17400, or the home appliance 17500 is referred to as a device. In addition, the XR device 17300 may correspond to a point cloud compressed data (PCC) device according to embodiments or may be operatively connected to the PCC device.

The cloud network 17000 may represent a network that constitutes part of the cloud computing infrastructure or is present in the cloud computing infrastructure. Here, the cloud network 17000 may be configured using a 3G network, 4G or Long Term Evolution (LTE) network, or a 5G network.

The server 17600 may be connected to at least one of the robot 17100, the self-driving vehicle 17200, the XR device 17300, the smartphone 17400, the home appliance 17500, and/or the HMD 17700 over the cloud network 17000 and may assist in at least a part of the processing of the connected devices 17100 to 17700.

The HMD 17700 represents one of the implementation types of the XR device and/or the PCC device according to the embodiments. The HMD type device according to the embodiments includes a communication unit, a control unit, a memory, an I/O unit, a sensor unit, and a power supply unit.

Hereinafter, various embodiments of the devices 17100 to 17500 to which the above-described technology is applied will be described. The devices 17100 to 17500 illustrated in FIG. 14 may be operatively connected/coupled to a point cloud data transmission device and reception according to the above-described embodiments.

<PCC+XR>

The XR/PCC device 17300 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 17300 may analyze 3D point cloud data or image data acquired through various sensors or from an external device and generate position data and attribute data about 3D points. Thereby, the XR/PCC device 17300 may acquire information about the surrounding space or a real object, and render and output an XR object. For example, the XR/PCC device 17300 may match an XR object including auxiliary information about a recognized object with the recognized object and output the matched XR object.

<PCC+Self-Driving+XR>

The self-driving vehicle 17200 may be implemented as a mobile robot, a vehicle, an unmanned aerial vehicle, or the like by applying the PCC technology and the XR technology.

The self-driving vehicle 17200 to which the XR/PCC technology is applied may represent a self-driving vehicle provided with means for providing an XR image, or a self-driving vehicle that is a target of control/interaction in the XR image. In particular, the self-driving vehicle 17200 which is a target of control/interaction in the XR image may be distinguished from the XR device 17300 and may be operatively connected thereto.

The self-driving vehicle 17200 having means for providing an XR/PCC image may acquire sensor information from sensors including a camera, and output the generated XR/PCC image based on the acquired sensor information. For example, the self-driving vehicle 17200 may have an HUD and output an XR/PCC image thereto, thereby providing an occupant with an XR/PCC object corresponding to a real object or an object present on the screen.

When the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap an object on the screen. For example, the self-driving vehicle 17200 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only CG images of real-world objects, backgrounds, and the like. On the other hand, the AR technology refers to a technology that shows a virtually created CG image on the image of a real object. The MR technology is similar to the AR technology described above in that virtual objects to be shown are mixed and combined with the real world. However, the MR technology differs from the AR technology in that the AR technology makes a clear distinction between a real object and a virtual object created as a CG image and uses virtual objects as complementary objects for real objects, whereas the MR technology treats virtual objects as objects having equivalent characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, V-PCC, and G-PCC techniques is applicable to such technologies.

The PCC method/device according to the embodiments may be applied to a vehicle that provides a self-driving service.

A vehicle that provides the self-driving service is connected to a PCC device for wired/wireless communication.

When the point cloud compression data (PCC) transmission/reception device according to the embodiments is connected to a vehicle for wired/wireless communication, the device may receive/process content data related to an AR/VR/PCC service, which may be provided together with the self-driving service, and transmit the same to the vehicle. In the case where the PCC transmission/reception device is mounted on a vehicle, the PCC transmission/reception device may receive/process content data related to the AR/VR/PCC service according to a user input signal input through a user interface device and provide the same to the user. The vehicle or the user interface device according to the embodiments may receive a user input signal. The user input signal according to the embodiments may include a signal indicating the self-driving service.

Figure 42:
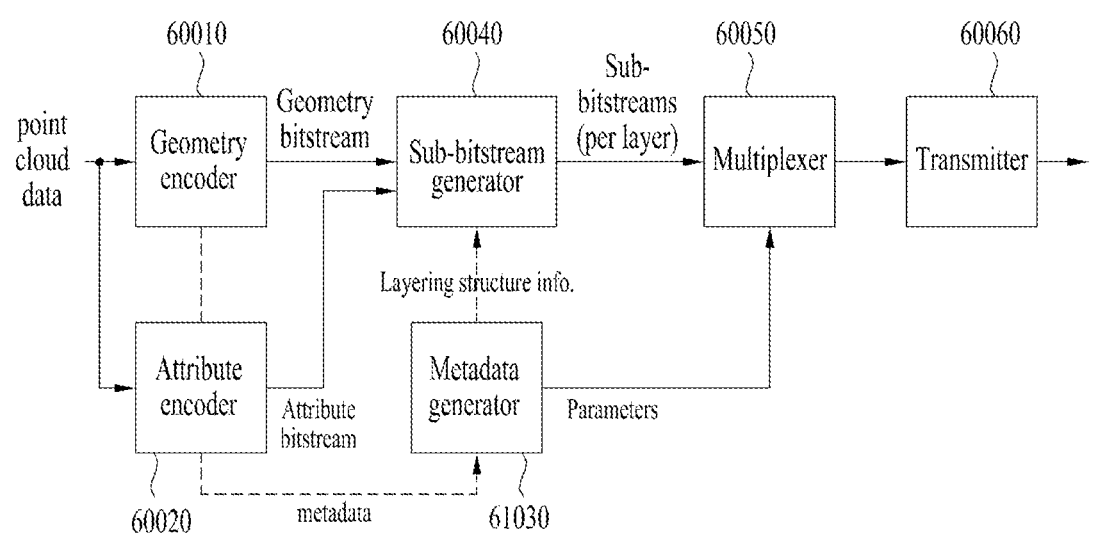
FIG. 42 illustrates another example of a point cloud transmission device according to embodiments.

The point cloud data transmission method/device according to the embodiments is construed as a term referring to the transmission device 10000 of FIG. 1, the point cloud video encoder 10002 of FIG. 1, the transmitter 10003 of FIG. 1, the acquisition 20000/encoding 20001/transmission 20002 of FIG. 2, the point cloud video encoder of FIG. 4, the transmission device of FIG. 12, the device of FIG. 14, the transmission method of FIG. 42, and the like.

Figure 43:
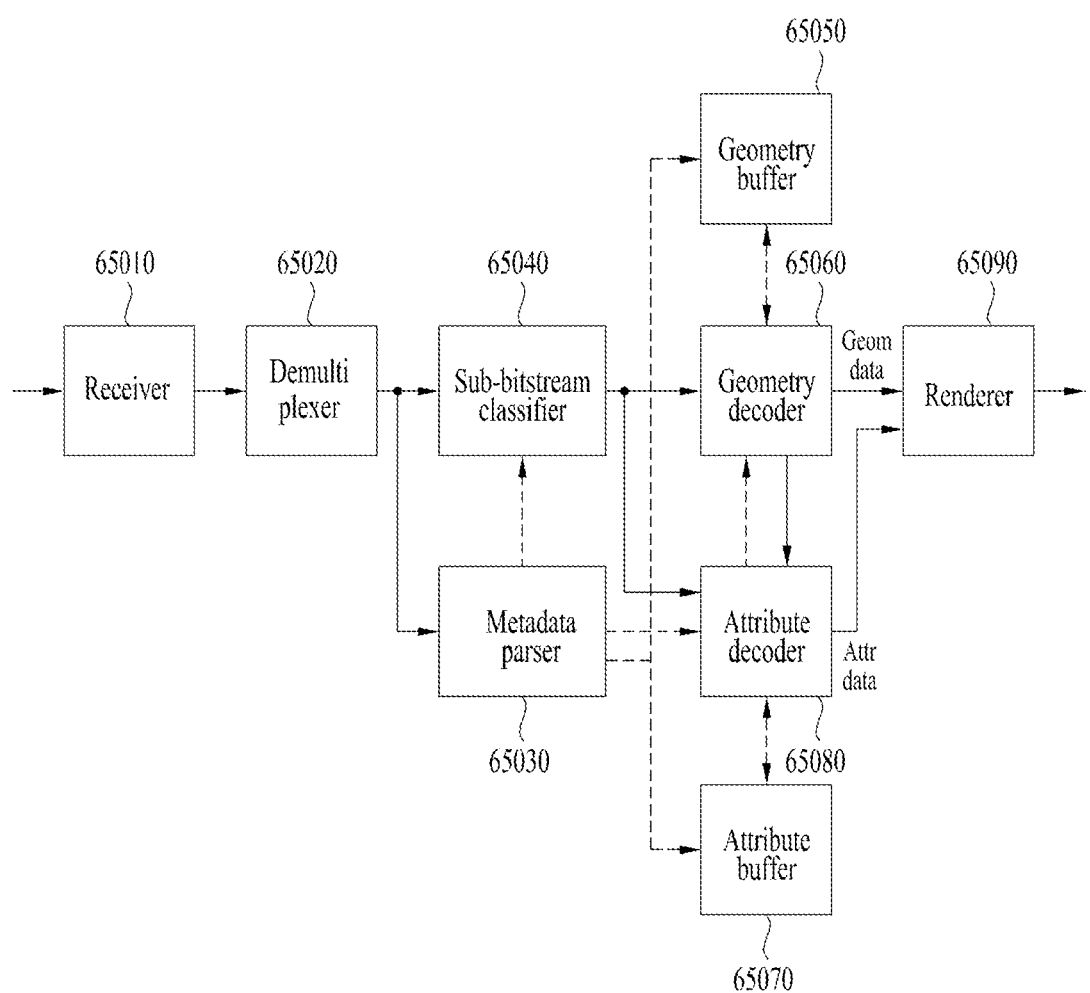
FIG. 43 is a block diagram illustrating another example of a point cloud reception device according to embodiments.

The point cloud data reception method/device according to the embodiments is construed as a term referring to the reception device 10004, the receiver 10005 of FIG. 1, the point cloud video decoder 10006 of FIG. 1, the transmission 20002/decoding 20003/rendering 20004 of FIG. 2, the decoder of FIG. 10, the point cloud video decoder of FIG. 11, the reception device of FIG. 13, the device of FIG. 14, the reception device of FIG. 43, and the like.

The method/device for transmitting or receiving point cloud data according to the embodiments may be referred to simply as a method/device.

According to embodiments, geometry data, geometry information, and position information constituting point cloud data are to be construed as having the same meaning. Attribute data, attribute information, and attribute information constituting the point cloud data are to be construed as having the same meaning.

The method/device according to the embodiments may process point cloud data in consideration of scalable transmission.

The method/device according to the embodiments may need selective decoding of a part of data due to receiver performance, the transmission speed, or the like in transmitting and receiving point cloud data. In this regard, a method for efficiently supporting the selective decoding is described.

To this end, in the present disclosure, geometry and attribute data may be divided into units such as geometry octree and LoD (Level of Detail) to select information required in the bitstream level, or remove unnecessary information.

In addition, in the present disclosure, the geometry and attribute data may be transmitted in multiple slices, such that the reception device may perform selective decoding or parallel decoding.

According to embodiments, a geometry bitstream and/or an attribute bitstream, and/or a point cloud bitstream structure in which the geometry bitstream and the attribute bitstream are multiplexed may be subdivided, and the subdivided bitstreams may be transmitted on a slice-by-slice basis. Thereby, the reception device may perform selective decoding or parallel decoding.

In embodiments, a technique for constructing a data structure composed of a point cloud will be discussed. Specifically, a method for reducing performance degradation that may occur due to segmentation in configuring slices and reducing a burden on the receiver is proposed. Referring to the point cloud data transmission/reception device (which may be referred to simply as an encoder/decoder) according to the embodiments shown in FIGS. 4 and 11, point cloud data is composed of a set of points. Each of the points includes geometry information (or geometry or geometry data) and attribute information (or an attribute or attribute data). The geometry information is three-dimensional position information (xyz) about each point. That is, the position of each point is represented by parameters in a coordinate system representing a three-dimensional space (e.g., parameters (x, y, z) of three axes representing the space, such as the X-axis, Y-axis, and Z-axis). The attribute information represents the color (RGB, YUV, etc.), reflectance, normal vectors, transparency, and the like of the points. In point cloud compression (PCC), octree-based compression is performed to efficiently compress non-uniform distribution in a three-dimensional space, and attribute information is compressed based on the octree-based compression. The point cloud video encoder and the point cloud video decoder shown in FIGS. 4 and 11 may process operation(s) according to embodiments through respective components.

According to embodiments, the transmission device compresses the geometry information (e.g., position) and attribute information (e.g., color/brightness/reflectance, etc.) about the point cloud data and transmits the compressed information to the reception device. In this case, point cloud data may be configured according to an octree structure that has layers according to the degree of detail or levels of detail (LoDs). Then, scalable point cloud data coding and representation may be performed based the configuration. In this case, only a part of the point cloud data may be decoded or represented according to the performance of the reception device or the transfer rate.

Figure 15:
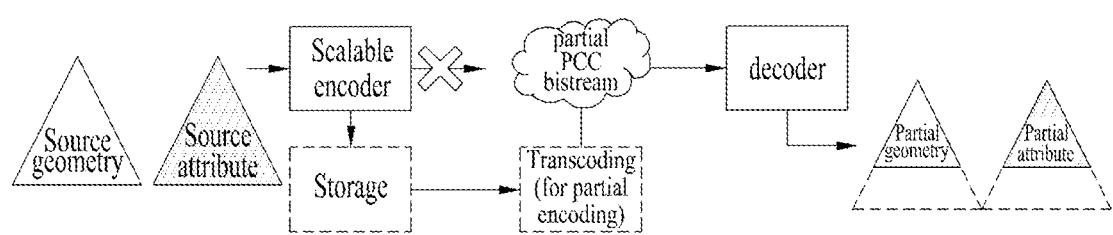
FIGS. 15 and 16 illustrate encoding, transmission, and decoding of point cloud data according to embodiments.

That is, in the case where only a part of the scalable point cloud compression bitstream needs to be transmitted (e.g., when only a part of the layers are decoded in scalable decoding), the necessary part cannot be selected and sent. Accordingly, the transmission device is required to re-encode the necessary part after decoding as shown in FIG. 15. Alternatively, after the entire data is delivered to the reception device, the reception device is required to selectively apply the necessary data after decoding.

Figure 16:
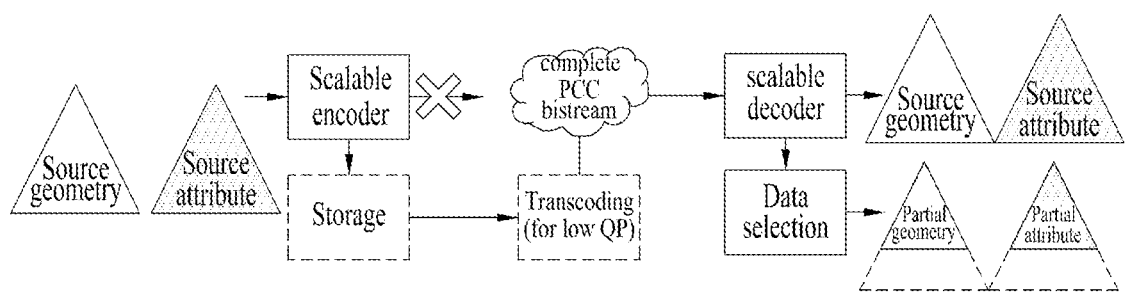

However, in the case of FIG. 15, a delay may occur due to the time for decoding and re-encoding. Also, in the case of FIG. 16, bandwidth efficiency may be degraded due to transmission of unnecessary data to the reception device. Further, when a fixed bandwidth is used, data quality may need to be lowered for transmission.

Accordingly, in order to address this issue, the method/device according to the embodiments may provide slices such that the point cloud may be divided into regions and processed.

In particular, in the method/device according to the embodiments, slices may be divided and transmitted. When slices are independently coded, compression efficiency may be lowered due to deterioration of entropy continuity. In this regard, in the method/device according to the embodiments, a method for continuously using entropy between separated slices is proposed. In this regard, the resources of the reception device may be efficiently managed by pre-transmitting information about the slices that are continuously used. In addition, it may be necessary to use information of another slice to refer to a neighbor at a boundary of a separated slice. In this regard, proposed herein is a method of processing at the slice boundary in order to guarantee independence between slices for parallel processing or to increase compression efficiency. In the device and method according to the embodiments, a method for efficiently performing buffer management by a reception device when entropy continuity is given between multiple slices is proposed.

Also, in the method/device according to the embodiments, a slice segmentation structure of point cloud data may be defined, and a scalable layer and slice structure for scalable transmission may be signaled.

In addition, according the present disclosure, geometry and attribute data may be transmitted through multiple slices. Thereby, the reception device may perform selective decoding or parallel decoding.

According to embodiments, the method/device segments (or divides, separates, or partitions) a slice into multiple slices and transmit a point cloud bitstream through the multiple segmented slices. Thereby, selective decoding or parallel decoding by the reception device may be supported.

In this regard, the present disclosure may define a brick as a superordinate concept to the segmented slices. According to embodiments, a brick may be considered as a sub-tree for a tree constituting input data. In addition, each brick may be considered as a unit including sub-tree depths of an occupied node at a specific tree depth with respect to the tree structure constituting the input data.

Figure 17:
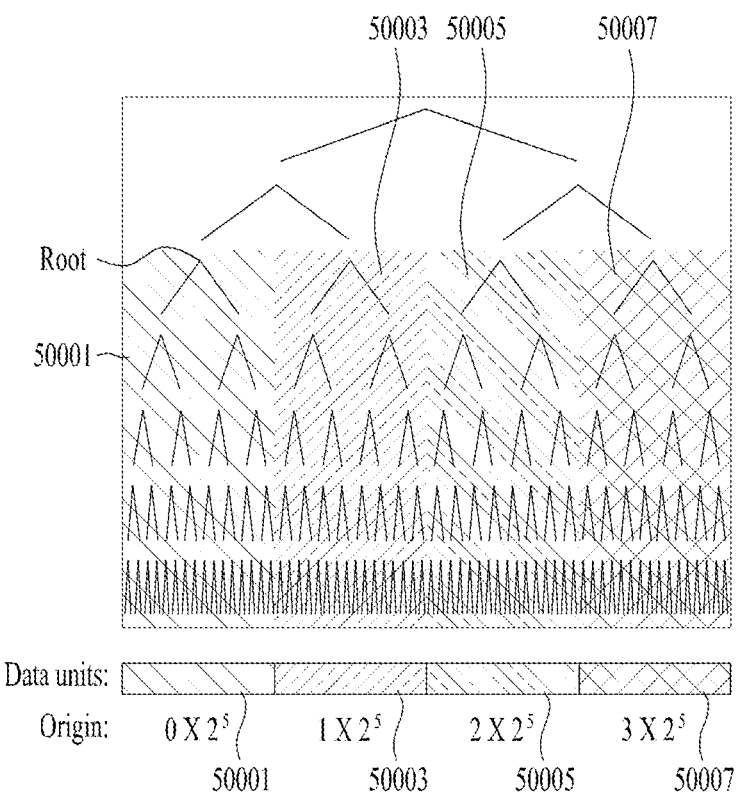
FIG. 17 illustrates an example of configuring one or more bricks in a tree structure according to embodiments.

FIG. 17 illustrates an example of configuring one or more bricks in a tree structure according to embodiments.

Referring to FIG. 17 as an example, four sub-trees in which occupied nodes for a tree depth 2 are considered as roots are configured as different bricks. For example, a tree structure based on point cloud data (e.g., geometry data) may be divided into four bricks indicated by 50001, 50003, 50005, and 50007, respectively. The number of bricks shown in FIG. 17 is merely an exemplary embodiment for understanding of those skilled in the art. The number of bricks may vary. In addition, point cloud data belonging to each brick may be transmitted through each data unit. Here, each brick may be configured independently. In this case, parallel processing may be performed. Also, a brick may be composed of one or more slices.

Figure 18:
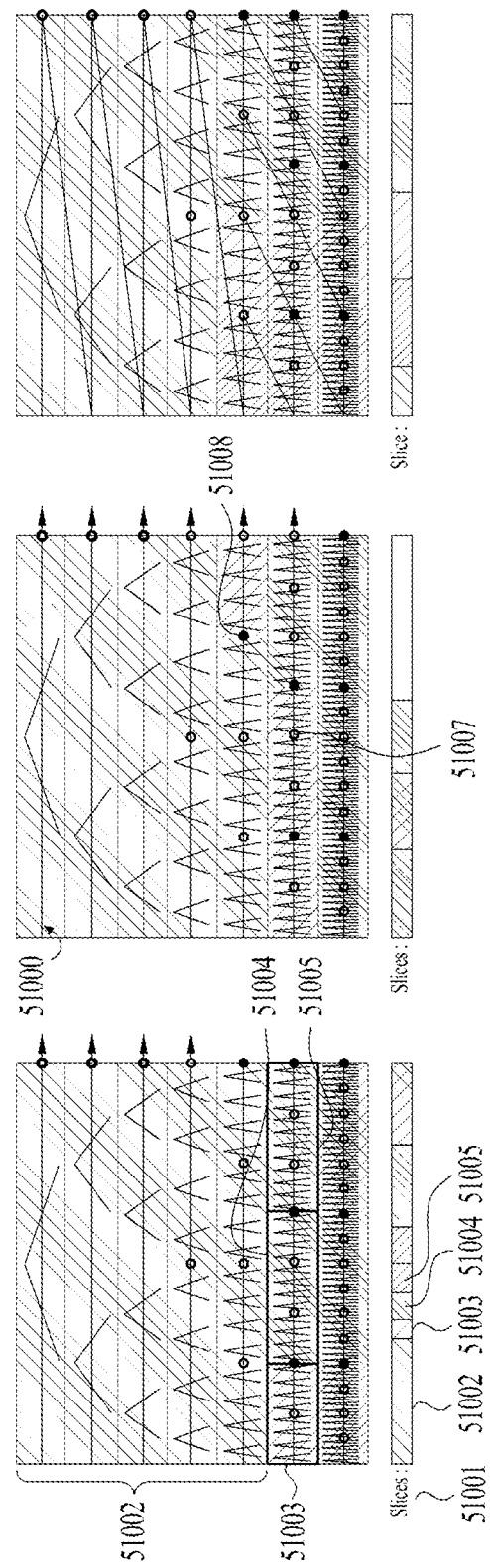
FIGS. 18A to 18C illustrate examples of a matching relationship between tree layers and slices established to transmit point cloud data belonging to a brick according to embodiments.

FIGS. 18A to 18C illustrate examples of a matching relationship between tree layers and slices established to transmit point cloud data belonging to a brick according to embodiments.

When the transmission method/device/encoder according to the embodiments divides the point cloud bit stream in a slice structure, slices, which are detailed units, may be configured. A data unit for detailed data representation may be a slice.

For example, one or more octree layers may be matched to a slice.

The transmission method/device according to the embodiments, for example, the encoder, may configure a slice 51001-based bitstream by scanning nodes (points) included in an octree in a scan order 51000 direction. A slice may include nodes of one or more levels in the octree structure, may include only nodes of a specific level, or may include only some nodes of a specific level. Alternatively, it may include only some nodes of one or more levels.

FIG. 18A shows an exemplary octree structure composed of 7 slices. In this example, a slice 51002 may include nodes of level 0 to level 4. A slice 51003 may include some nodes of level 5, a slice 51004 may include some nodes of level 5, and a slice 51005 may include some other nodes of level 5. That is, in FIG. 18A, level 5 is divided into three slices. Similarly, in FIG. 18A, level 6 (i.e., the leaf level) is also divided into three slices. In other words, a slice may be configured with some nodes of a specific level.

FIG. 18B shows an exemplary octree structure composed of four slices. In this example, a slice is composed of the nodes of level 0 to level 3 and some nodes of level 4, and another slice is composed of the remaining nodes of level 4 and some nodes of level 5. In addition, another slice is composed of the remaining nodes of level 5 and some nodes of level 6, and the other slice is composed of the remaining nodes of level 6.

FIG. 18C shows an exemplary octree structure composed of five slices. a slice is composed of the nodes of level 0 to level 3, and four slices are composed of the nodes of level 4 to level 6. That is, a slice is composed of some nodes of level 4, some nodes of level 5, and some nodes of level 6.

In other words, as shown in FIGS. 18B and 18C, when multiple octree layers are matched to a slice, only some nodes of each of the layers may be included in the slice. When multiple slices constitute a geometry/attribute frame in this way, information necessary for the reception device to configure layers may be transmitted to the reception device through signaling information. For example, the signaling information may include layer information included in each slice and node information included in each layer. In FIGS. 18A to 18C, a hollow circle (e.g., 51007) may serve to indicate a coding unit, and a solid circle (e.g., 51008) may indicate the end point of the corresponding slice (or the start point of the previous slice).

The encoder and the device corresponding to the encoder according to the embodiments may encode the point cloud data, and generate and transmit a bitstream including the encoded data and signaling information (or parameter information) about the point cloud data.

Furthermore, the bitstream may be generated based on the bitstream structure according to the embodiments. Accordingly, the reception device, the decoder, a corresponding device, or the like according to the embodiments may receive and parse a bitstream configured to be suitable for selective decoding of some data, thereby decoding only a part of the point cloud data and providing the same efficiently.

Next, scalable transmission of point cloud data will be described.

The point cloud data transmission method/device according to the embodiments may scalably transmit a bitstream including point cloud data, and the point cloud data reception method/device according to the embodiments may scalably receive the bitstream and decode the same.

When the structure illustrated FIGS. 18A to 18C is used for scalable transmission, signaling information for selecting a slice required by the reception device may be transmitted to the reception device. The scalable transmission does not mean transmitting or decoding the entire bitstream, but means transmitting or decoding only a part of the bitstream. Accordingly, the reception device may provide low resolution point cloud data (or content).

When the scalable transmission is applied to an octree-based geometry bitstream according to embodiments, point cloud data should be allowed to be constructed using only information up to a specific octree layer for the bitstream of each octree layer from a root node to a leaf node.

To this end, a target octree layer should not have a dependency on lower octree layer information. This may be a constraint applied to geometry/attribute coding in common.

In addition, in scalable transmission, the transmission/reception device needs to transmit a scalable structure for selecting a scalable layer to the reception device. Considering the octree structure according to the embodiments, all octree layers may support scalable transmission, or scalable transmission may be allowed only for a specific octree layer or lower layers. For example, some of the octree layers are included, signaling information may be delivered to the reception device to indicate a scalable layer in which a slice is included. Thus, the reception device may determine whether the slice is necessary/unnecessary in the bitstream step. In the example of FIG. 18A, level 0 (i.e., root level) to level 4 51002 may constitute one scalable layer without supporting scalable transmission, and the lower octree layers may be matched to scalable layers in a one-to-one correspondence manner. In general, scalability may be supported for a part corresponding to the leaf node. As shown in FIG. 18C, when multiple octree layers are included in a slice, it may be defined that one scalable layer shall be configured for the layers.

In this case, scalable transmission and scalable decoding may be used separately depending on the purpose. According to embodiments, the scalable transmission may be used in order for the transmitting/reception device to select information up to a specific layer without operation of the decoder. According to embodiments, scalable decoding may be used for the purpose of selecting a specific layer during coding. That is, the scalable transmission may support selection of necessary information without involving the decoder in a compressed state (i.e., in the bitstream stage), such that the transmission or reception device may determine a specific layer. On the other hand, in the case of scalable decoding, encoding/decoding may be supported only up to a part required in the encoding/decoding process. Therefore, scalable decoding may be used in the case of scalable representation.

In this case, the layer configuration for scalable transmission may be different from the layer configuration for scalable decoding. For example, the lower three octree layers including leaf nodes may constitute one layer from the perspective of scalable transmission. On the other hand, from the perspective of scalable decoding, when all layer information is included, scalable decoding may be possible for each of the leaf node layers, leaf node layer-1 and leaf node layer-2.

The slice structure for layer configuration and the signaling method for scalable transmission described above will be described in more detail later.

As described above, the method/device according to the embodiments may divide and process the bitstream into specific units for efficient bitstream transmission and decoding.

The method/device according to the embodiments enables the point cloud data composed of layers to be selectively transmitted and decoded in the bitstream level.

The unit according to the embodiments may be referred to as an LOD, a layer, a slice, or the like. LOD is the same term as LOD in attribute data coding, but may mean a data unit for a layered structure of a bitstream. The LOD according to the embodiments may be a concept corresponding to one depth or a bundle of two or more depths based on the hierarchical structure of point cloud data, for example, depths (levels) of an octree or multiple trees. Similarly, a layer is provided to generate a unit of a sub-bitstream, and is a concept that corresponds to one depth or a bundle of two or more depths, and may correspond to one LOD or two or more LODs. Also, a slice is a unit for configuring a unit of a sub-bitstream, and may correspond to one depth, a part of one depth, or two or more depths. Also, a slice may correspond to one LOD, a part of one LOD, or two or more LODs. According to embodiments, the LOD, the layer, and the slice may correspond to each other or one of the LOD, the layer, and the slice may be included in another one. Also, a unit according to embodiments may include an LOD, a layer, a slice, a layer group, or a subgroup, and may be referred to as complementary to each other. According to embodiments, in the octree structure, a layer, a depth, a level, and a depth level may have the same meaning.

Figure 19:
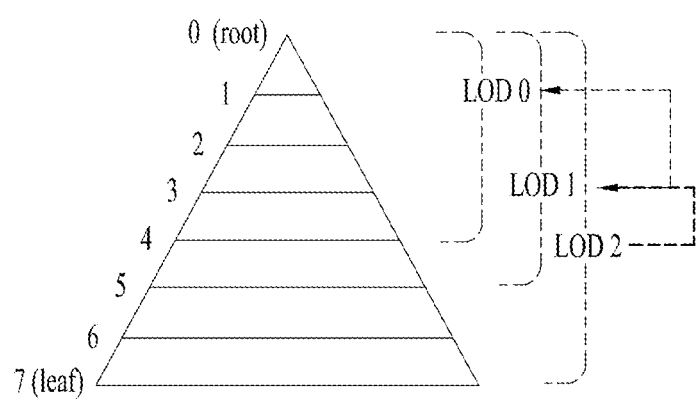
FIG. 19 is a diagram illustrating an example of layer-based configuration of point cloud data according to embodiments.

FIG. 19 is a diagram illustrating an example of layer-based configuration of point cloud data according to embodiments. FIG. 19 shows an exemplary octree structure in which the depth level of the root node is set to 0 and the depth level of the leaf node is set to 7.

The transmission method/device according to the embodiments may configure layer-based point cloud data as shown in FIG. 19 to encode and decode the point cloud data.

Layering of point cloud data according to the embodiments may have a layer structure in terms of SNR, spatial resolution, color, temporal frequency, bit depth, or the like depending on the application field, and may construct layers in a direction in which data density increases based on the octree structure or LOD structure.

That is, when the LOD is generated based on the octree structure, they may be defined such that the LOD increases in a direction in which the detail is increased, that is, in a direction in which the octree depth level is increased. In the present disclosure, a layer may have the same meaning as a level, a depth, and a depth level.

Referring to FIG. 19, for example, in an octree structure having 7 depth levels except for the root node level (or referred to as a root level), LOD 0 is configured to include levels from the root node level to the octree depth level 4, and LOD 1 is configured to include levels from the root node level to octree depth level 5, and LOD 2 is configured to include levels from root node level to octree depth level 7.

Figure 20:
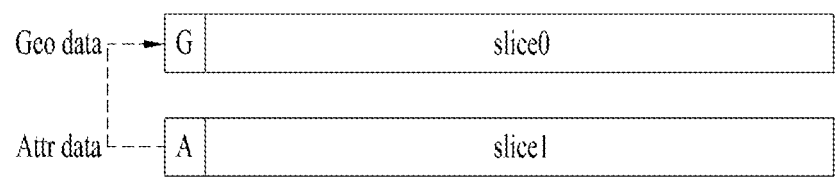
FIG. 20 is a diagram illustrating an example in which a geometry bitstream and an attribute bitstream are included in respective slices according to embodiments.

According to embodiments, a bitstream acquired through point cloud compression may be delivered by being divided into a geometry bitstream and an attribute bitstream according to the type of data as shown in FIG. 20. In this case, each bitstream may be configured as a slice and transmitted.

FIG. 20 is a diagram illustrating an example in which a geometry bitstream and an attribute bitstream are included in respective slices according to embodiments. That is, referring to FIG. 20, a geometry bitstream including geometry data may be configured as slice0, and an attribute bitstream including attribute data may be configured as slice1.

The method/device according to the embodiments may generate LODs based on the layering of the octree structure as shown in FIG. 19 and configure a geometry bitstream and an attribute bitstream as shown in FIG. 20.

When the geometry bitstream and the attribute bitstream are configured in one slice and delivered regardless of the layer information or LoD information, an operation of decoding the bitstream, an operation of selecting only a desired part and removing unnecessary parts, and an operation of re-encoding the bitstream based on only the necessary information should be performed to use only a part of the layers or LoDs.

The present disclosure proposes a method of dividing a bitstream into multiple slices and transmitting the bitstream in order to avoid such unnecessary intermediate operations.

FIG. 21(a) is a diagram illustrating an example of dividing a geometry bitstream into multiple slices according to embodiments, and FIG. 21(b) is a diagram illustrating an example of dividing an attribute bitstream into multiple slices according to embodiments.

That is, when the bitstream is divided into multiple slices and transmitted to the reception device, the geometry bitstream and the attribute bitstream may be divided into multiple slices and transmitted as shown in FIGS. 21(a) and 21(b). Each slice is composed of a slice header (also referred to as a data unit header) and slice data (also referred to as data unit data). In this case, the slice header includes reference information related to the slice and/or a reference slice (e.g., a previous slice), and the slice data includes an actual bitstream.

In this case, each of the divided slices may be present independently. That is, in the example of FIGS. 21(a) and 21(b), geometry slices (slice 0, slice 1, slice 2) may be coded without a correlation among slice 0, slice 1, and slice 2. In this case, since each slice may be coded independently, three geometry coders may be operated simultaneously in terms of parallel processing. Accordingly, slices may be most efficiently configured based on the execution time in the application field of live encoding/decoding and the like. For example, in the case of predictive geometry coding in which the correlation between layers is poor, slices may be configured independently of each other as shown in FIG. 21(*a*). In this case, the number of independently decodable slices may be indicated to the reception device through signaling information, thereby allowing the reception device to perform a parallel operation. This scheme may be equally or similarly applied to attribute slices (slice 3, slice 4, and slice 5).

Figure 22:
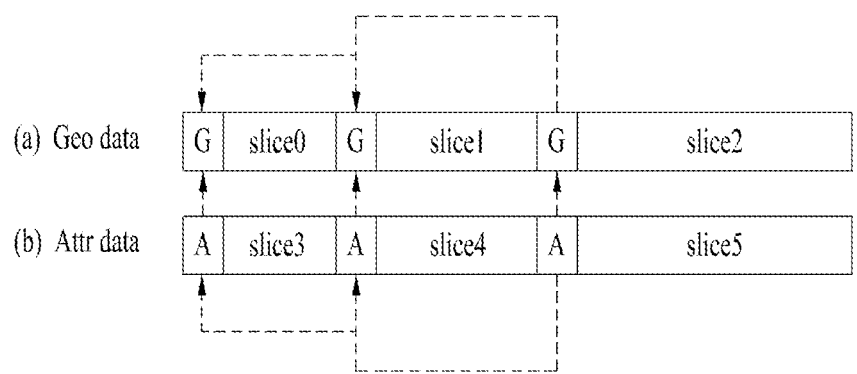
FIG. 22(a) is a diagram illustrating another example of dividing a geometry bitstream into multiple slices according to embodiments.
FIG. 22(b) is a diagram illustrating another example of dividing an attribute bitstream into multiple slices according to embodiments.

As another method, when a bitstream is divided into multiple slices and transmitted, the correlation between the slices may be considered as shown in FIGS. 22(*a*) and 22(*b*). FIG. 22(*a*) is a diagram illustrating another example of dividing a geometry bitstream into multiple slices according to embodiments, and FIG. 22(*b*) is a diagram illustrating another example of dividing an attribute bitstream into multiple slices according to embodiments.

For example, for octree-based geometry coding, compression performance may be enhanced by sequentially and cumulatively using context information about previous nodes. In addition, in neighbor search and intra prediction, decoded occupancy information about a neighbor (or peripheral) node is first used. In this case, information about the previous slice may be used. Alternatively, the information about the preceding slice may be used for parallel processing. In this case, as shown in FIGS. 22(*a*) and 22(*b*), dependency between slices occurs. In this case, information about the preceding slice may be specified by delivering the same to the reception device through signaling information.

FIG. 22(*a*) illustrates an example in which slice 2 refers to slice 1 and slice 1 refers to slice 0. FIG. 22(*b*) illustrates an example in which slice 5 refers to slice 4 and slice 4 refers to slice 3.

In this regard, various embodiments may be applied as a bitstream sorting method for delivering a geometry bitstream and an attribute bitstream through multiple slices.

Figure 23:
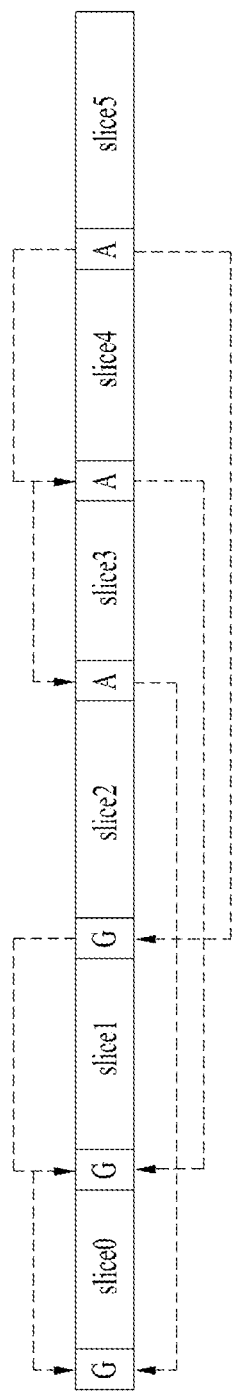
FIG. 23 illustrates an exemplary method of sorting a geometry bitstream and an attribute bitstream according to embodiments.

FIG. 23 illustrates an exemplary method of sorting a geometry bitstream and an attribute bitstream according to embodiments.

In transmitting a bitstream, the transmission method/device according to the embodiments may transmit geometry data (or referred to as a geometry bitstream or geometry information) and attribute data (or referred to as an attribute bitstream or attribute information) in series as shown in FIG. 23. In this operation, depending on the type of data, the entire geometry data may be transmitted first, and then the attribute data may be transmitted. In this case, the geometry data may be quickly reconstructed based on the transmitted bitstream information.

FIG. 23 illustrates an example in which slice 0, slice 1, slice 2, which contain geometry data, slice 3, slice 4, and slice 5, which contain attribute data, are transmitted in order. In this case, the positions may be changed according to embodiments. Also, reference may be made between geometry headers, and between an attribute header and a geometry header.

Figure 24:
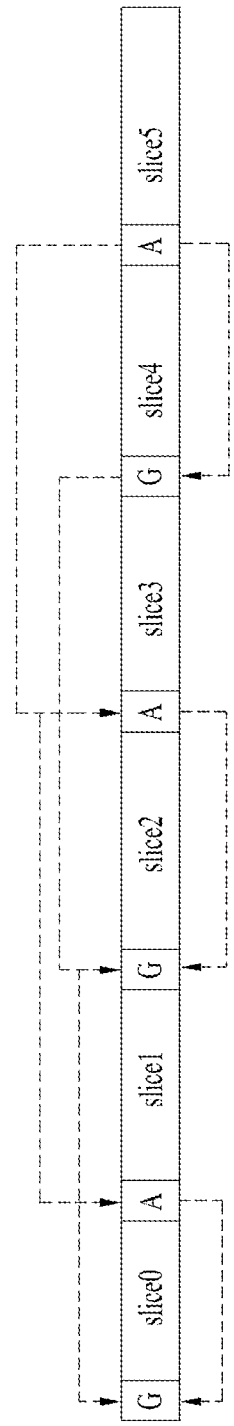
FIG. 24 illustrates another exemplary method of sorting a geometry bitstream and an attribute bitstream according to embodiments.

FIG. 24 illustrates another exemplary method of sorting a geometry bitstream and an attribute bitstream according to embodiments.

In transmitting a bitstream, the transmission method/device according to the embodiments may collect and transmit a geometry bitstream and an attribute bitstream constituting the same layer as shown in FIG. 24. In this case, by using a compression technique capable of parallel decoding of geometry and attributes, the decoding execution time may be shortened. In this case, information that needs to be processed first (i.e., lower LoD, wherein geometry must precede attribute) may be placed first.

FIG. 24 illustrates an example in which slice 0 containing geometry data, slice 3 containing attribute data, slice 1 containing geometry data, slice 4 containing attribute data, slice 2 containing geometry data, and slice 5 containing attribute data are transmitted in this order. In this case, the positions may be changed according to embodiments. Also, reference may be made between geometry headers, and between an attribute header and a geometry header.

The transmission/reception method/device according to the embodiments may efficiently select a desired layer (or LoD) in an application field at a bitstream level in transmitting and receiving a bitstream. In the bitstream sorting method according to the embodiments, collecting and transmitting geometry information as shown in FIG. 23 may produce an empty part in the middle after a specific bitstream level is selected. In this case, the bitstream may need to be rearranged.

By bundling and transmitting the geometry data and attribute data according to layers as shown in FIG. 24, necessary information may be selectively delivered and/or unnecessary information may be selectively removed according to an application field.

For example, referring to FIG. 24, when a part of the bitstream needs to be selected, the transmission device may select and transmit only geometry slice 0 and attribute slice 3 of one layer, and geometry slice 1 and attribute slice 4 of another layer and remove geometry slice 2 and attribute slice 5 of another layer from the bitstream. That is, in the case of symmetrical geometry-attribute selection, geometry data and attribute data of the same layer are simultaneously selected and transmitted, or simultaneously selected and removed.

For example, referring to FIG. 24, when a part of the bitstream needs to be selected, the transmission device may select and transmit geometry slice 0 and attribute slice 3 of one layer, geometry slice 1 and attribute slice 4 of another layer, and geometry slice 2 between geometry slice 2 and attribute slice 5 of another layer, and remove attribute slice 5 from the bitstream. That is, in the case of asymmetric geometry-attribute selection, only one of the geometry data and the attribute data of the same layer is selected and transmitted or removed.

Segmentation of the bitstream and selection of a part of the bitstream described above are intended to support the scalability of the point cloud data.

Hereinafter, a continuous slice operation and management of a context buffer will be described. According to an embodiment, the context buffer may include a geometry buffer and/or an attribute buffer of the reception device of FIG. 43.

As described above, in octree-based geometry coding, compression performance may be increased by sequentially and cumulatively using context information about previous nodes. In addition, in neighbor search and intra prediction, decoded occupancy information about a neighbor (or peripheral) node is first used. In this case, information about the previous slice may be used. Alternatively, the information about the preceding slice may be used for parallel processing. In this case, dependency between slices occurs.

In the case of a dependent slice, by using the information about the previous slice for coding of the subsequent slice, degradation of coding efficiency caused by dividing the slice may be addressed. In geometry coding, information such as context-based adaptive binary arithmetic coding (CABAC)

context, a context map, dictionary LuT, and planar coding variables may be used continuously. When the context is continuously used in this way, it is necessary to control the context buffer.

Figure 25A:
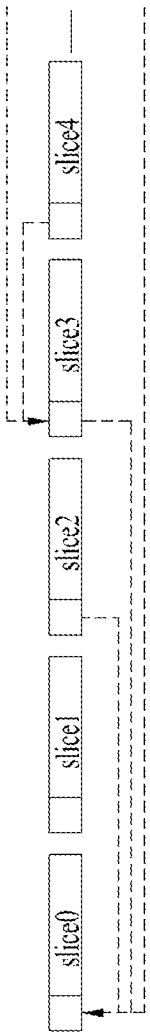
FIG. 25A is a diagram illustrating an example of dependency between slices in a bitstream structure according to embodiments.
Figure 25B:
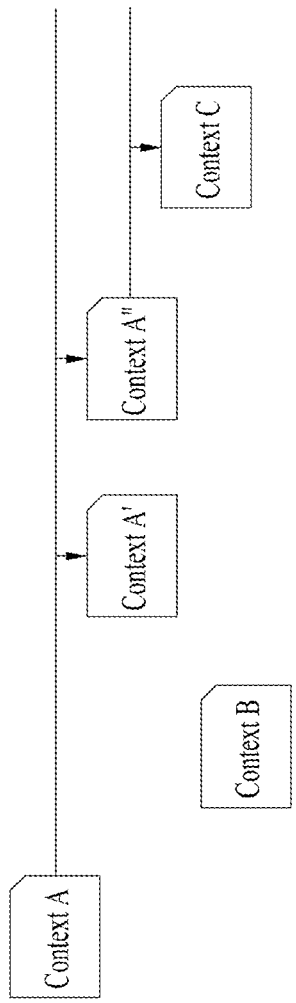
FIG. 25B is a diagram illustrating an example of contexts generated in respective slices when inter-slice dependency occurs according to embodiments.
Figure 25C:
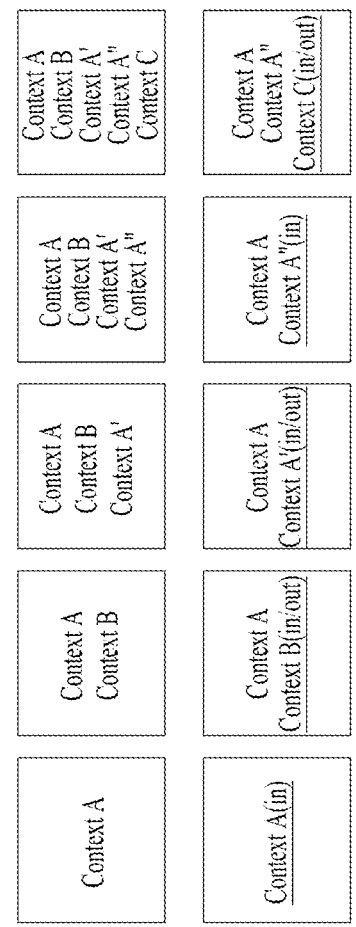
FIGS. 25C to 25E are diagrams illustrating examples of context buffer control when inter-slice dependency occurs according to embodiments.
Figure 25D:
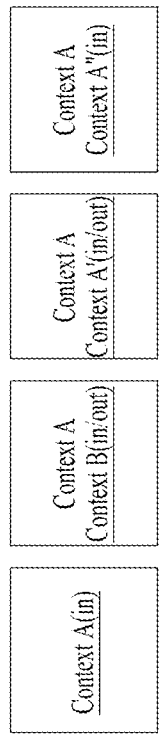
Figure 25E:

FIG. 25A is a diagram illustrating an example of dependency between slices in a bitstream structure according to embodiments. FIG. 25B is a diagram illustrating an example of contexts generated in respective slices when inter-slice dependency occurs as shown in FIG. 25A. FIGS. 25C to 25E are diagrams illustrating examples of context buffer control when inter-slice dependency occurs according to embodiments.

FIG. 25A illustrates an example in which a bitstream is divided into multiple slices and transmitted, and thus slice 2 and slice 3 use information of slice 0, and slice 4 uses information of slice 3. That is, slice 2 and slice 3 depend on slice 0, and slice 4 depends on slice 3. For example, since encoding of slice 2 is performed based on context information (e.g., geometry data or attribute data) of slice 0, encoding of slice 2 may start after encoding of slice 0 is completed. In FIG. 25A, slice 0 is referenced by slice 2 and slice 3, and accordingly the number of times slice 0 is referenced by other slices may be 2. In contrast, slice 1 is independent of other slices. Therefore, data (e.g., geometry data or attribute data) of slice 1 may be independently encoded without a relation to other slices.

Although the embodiment of FIG. 25A is described in consideration of a case where the tree is divided into slices, this is merely an example. That is, continuation information, context usage information, and neighbor reference status about another brick, another tile, or another frame may be used even for a bitstream divided into bricks, which are a concept including a subtree, or tiles or frames, which are divided by regions.

When data (e.g., geometry data or attribute data) belonging to each slice are encoded by the encoder, a context is generated for each slice. Here, the encoder may be the point cloud video encoder 10002 of FIG. 1, the encoding 20001 of FIG. 2, the point cloud video encoder of FIG. 4, the transmission device of FIG. 12, the encoder of FIG. 42, or the like.

Referring to FIG. 25B, when data of a first slice (slice 0) is input to the encoder, context A, which is context information, is generated by encoding. Then, when data of a second slice (slice 1) is encoded by the encoder, context B is generated. When data of a third slice (slice 2) is encoded by the encoder, context A' is generated. In addition, context A" is generated when data of a fourth slice (slice 3) is encoded by the encoder, and context C is generated when data of a fifth slice (slice 4) is encoded by the encoder. For example, context A' refers to context A but is independent (or different) from context A. That is, context A' is the context configured by updating context A.

Then, the reception device stores the context of each slice in the context buffer.

At this time, when all contexts are stored in the context buffer without control of the context buffer as shown in FIG. 25C, the storage space may become insufficient or the cost may increase to secure a larger storage space.

Therefore, the present disclosure proposes a method to efficiently control the context buffer. FIGS. 25D and 25E are diagrams illustrating examples of context buffer control according to embodiments.

Referring to FIG. 25D, when data of the first slice (slice 0) is input to the encoder of the transmission device, context A, which is context information, is generated by encoding. Since context A is used by one or more subsequent slices (e.g., slice 2, slice 3, and other slices not shown), context A is stored in the context buffer in the reception device. In this case, the transmission device may transmit information about slices (e.g., slice 2 and slice 3) that use the context of slice 0 to the reception device through signaling information (e.g., buffer control related information). Accordingly, the reception device may efficiently control the buffer (or context buffer). For example, the total number of slices (=N) (e.g., num_context_reuse_minus1) that use context A among the subsequent slices may be transmitted to the reception device through signaling information (e.g., buffer control related information or counter). For example, in the case of FIG. 25A, N may be 3. For N greater than 0, when context A is referenced N times by other slices after context A is stored in the context buffer of the reception device, context A may be removed from the context buffer. In FIG. 25D, "in" means storing the context in the context buffer, and 'out' means removing the context from the context buffer.

According to embodiments, since slice 0 is used by slice 2, slice 3, and other slices not shown, context A, which is the context of slice 0, is not removed from the context buffer, but is kept stored (context A(in)).

According to embodiments, slice 1 is independently coded (or decoded) without a relation to slice 0 and subsequent slices, and therefore context B, which is the context of slice 2, may be removed from the context buffer immediately after being processed (context B(in/out)). According to embodiments, when slice 0 is processed, slice 1 may be processed in parallel at the same time. Thereby, the execution time may be shortened.

According to embodiments, slice 2 refers to slice 0, but has no relation to subsequent slices. Accordingly, context A', which is the context of slice 2, may be removed immediately after being processed in the context buffer (context A'(in/out)). Since coding (or decoding) of slice 2 is performed based on context A, which is the context (or context information) of slice 0, coding (or decoding) of slice 0 may start after coding (or decoding) of slice 0 is completed. Since slice 2 is not referenced by a subsequent slice, it may be deleted from the context buffer after coding (or decoding) thereof is completed.

According to embodiments, since slice 3 is used in slice 4 and other slices not shown, context A", which is the context of slice 3, is not removed from the context buffer, but is kept stored (context A"(in)). Similarly to slice 2, coding (or decoding) of slice 3 is performed based on context A of slice 0. Accordingly, coding (or decoding) of slice 3 may be performed in parallel with coding (or decoding) of slice 2 at the same time. Thereby, the execution time may be shortened. However, the context generated in slice 3 (that is, context A") is not removed after being stored in the context buffer because it is used for coding (or decoding) of a subsequent slice. The context A" stored in the context buffer is used for coding (or decoding) of slice 4.

According to embodiments, slice 4 refers to slice 3, but has no relation to subsequent slices. Accordingly, context C, which is the context of slice 4, may be removed immediately after being processed in the context buffer (context C(in/out)).

According to embodiments, the period during which the context generated after encoding of a specific slice is stored in the context buffer may be determined based on the number of times the slice is referenced by at least one subsequent slice.

When there is additional information about the context buffer as described above, the context buffer may be efficiently managed by removing the context from the context buffer when the context is no longer used based on information about whether the context is additionally used and how many times the context is additional used. That is, the context of a slice that has no relation to subsequent slices may be removed immediately after being processed in the context buffer. Thereby, the context buffer may be efficiently controlled. In addition, when parallel processing can be performed based on dependency information, the execution time may be shortened through simultaneous execution.

25(e) shows an example of context buffer control performed when two or more slices are processed in parallel.

For example, when slice 0 and slice 1 are processed in parallel, context A of slice 0 and context B of slice 1 are stored in the context buffer simultaneously. In this regard, since slice 0 is used by slice 2, slice 3, and other slices not shown, context A is not removed from the context buffer, but is kept stored (context A(in)). However, slice 1 has no relation to slice 0 and subsequent slices, and therefore context B is removed from the context buffer immediately after being processed (context B(in/out)).

As another example, when slice 2 and slice 3 are processed in parallel, context A' of slice 2 and context A" of slice 3 are stored in the context buffer simultaneously. Since slice 2 is not used in subsequent slices, context A' is removed immediately after being processed in the context buffer (context A'(in/out)). However, slice 3 is used in slice 4, and therefore context A" is not removed from the context buffer, but is kept stored (context A"(in)).

Hereinafter, a continuous slice operation (neighbor continuation) will be described.

According to embodiments, when coding is performed by dividing slices, positionally adjacent nodes may be present in different slices.

FIGS. 26A to 26D are diagrams illustrating examples of a neighbor structure according to embodiments.

As an example, in the neighbor structure of FIGS. 26A to 26D, a node 53000 positioned at the center is present at the boundary of a slice, nodes 1, 8, and 32 may be present in the same slice, but nodes 2, 4 and 16 may be present in one or more different slices. In this case, considering the relation with neighbor (or peripheral) nodes, the neighbor nodes may or may not be used depending on whether the dependency between slices. For example, when neighbor nodes are used, the dependency between slices and a slice including each neighbor node may be signaled. FIGS. 26A to 26D show examples of 6 dependent neighbor nodes, 18 dependent neighbor nodes, and 32 dependent neighbor nodes along with a node positioned at the center. When the dependency is not acknowledged, neighbor search may be used on the assumption that there is no corresponding neighbor node, that all neighbor nodes are occupied, or that the neighbor nodes are non-occupied (that is, unoccupied). When such assumption is used, relevant information may be transmitted to the reception device through signaling information. In this case, there may be a possibility of parallel processing in the sense that each slice may be processed independently. Conversely, when the information about the neighbor node is used accurately, the result of processing of the neighbor slice may be required. Such relation to neighbor nodes may be used in operations such as obtaining an occupancy map of geometry coding, neighbor search of LoD generation, and prediction of RAHT.

While FIGS. 26A to 26D are described in consideration of a case where a tree is divided into slices, continuation information, context usage information, and a neighbor reference status may be used even for a bitstream divided into bricks, which are a concept including a subtree, or tiles or frames, which are divided by regions.

Figure 27:
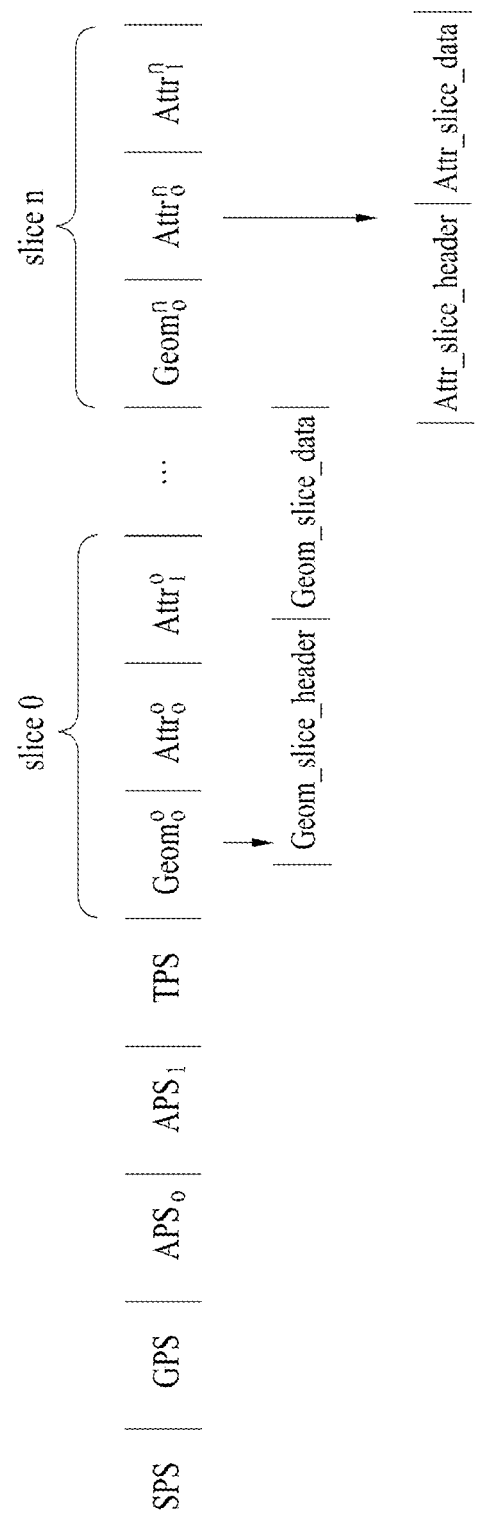
FIG. 27 is a diagram illustrating an example of a bitstream structure of point cloud data for transmission/reception according to embodiments.

FIG. 27 is a diagram illustrating an example of a bitstream structure of point cloud data for transmission/reception according to embodiments. According to embodiments, the bitstream output from the point cloud video encoder of any one of FIGS. 1, 2, 4, 12, and 42 may take the form of FIG. 27.

According to embodiments, the bitstream of the point cloud data provides tiles or slices such that the point cloud data may be divided into regions and processed. The regions of the bitstream may have different importance levels. Accordingly, when the point cloud data is partitioned into tiles, different filters (encoding methods) or different filter units may be applied to the respective tiles. When the point cloud data is partitioned into slices, different filters or different filter units may be applied to the respective slices.

When the point cloud data is partitioned into regions and compressed, the transmission device and the reception device according to the embodiments may transmit and receive a bitstream in a high-level syntax structure for selective transmission of attribute information in the partitioned regions.

The transmission device according to the embodiments may transmit point cloud data according to the bitstream structure as shown in FIG. 27. Accordingly, a method to apply different encoding operations and use a good-quality encoding method for an important region may be provided. In addition, efficient encoding and transmission may be supported according to the characteristics of point cloud data, and attribute values may be provided according to user requirements.

The reception device according to the embodiments may receive the point cloud data according to the bitstream structure as shown in FIG. 27. Accordingly, different filtering (decoding) methods may be applied to the respective regions (tiles or regions partitioned into slices), rather than a complexly decoding (filtering) method being applied to the entire point cloud data. Therefore, better image quality in a region important to the user and an appropriate latency to the system may be ensured.

When a geometry bitstream, an attribute bitstream, and/or a signaling bitstream (or signaling information) according to embodiments are configured in one bitstream (or G-PCC bitstream) as shown in FIG. 27, the bitstream may include one or more sub-bitstreams. The bitstream according to the embodiments may include a sequence parameter set (SPS) for sequence-level signaling, a geometry parameter set (GPS) for signaling of geometry information coding, and one or more attribute parameter sets (APSs) APSo and APSi for signaling of attribute information coding, a tile inventory (or referred to as TPS) for tile-level signaling, and one or more slices (slice 0 to slice n). That is, the bitstream of point cloud data according to the embodiments may include one or more tiles. Each tile may be a slice group including one or more slices (slice 0 to slice n). The tile inventory (i.e., TPS) according to the embodiments may include information about each of one or more tiles (e.g., coordinate value information and height/size information about a tile bounding box). Each slice may include one geometry bitstream (Geom0) and/or one or more attribute bitstreams (Attr0, Attr1). For example, slice 0 may include one geometry bitstream Geom0$^0$ and one or more attribute bitstreams Attr0$^0$ and Attr1$^0$.

The geometry bitstream in each slice may be composed of a geometry slice header (geom_slice_header) and geometry slice data (geom_slice_data). According to embodiments, the geometry bitstream in each slice may be referred to as a geometry data unit, the geometry slice header may be referred to as a geometry data unit header, and the geometry slice data may be referred to as geometry data unit data.

The attribute bitstream in each slice may be composed of an attribute slice header (attr_slice_header) and attribute slice data (attr_slice_data). According to embodiments, the attribute bitstream in each slice may be referred to as an attribute data unit, the attribute slice header may be referred to as an attribute data unit header, and the attribute slice data may be referred to as attribute data unit data.

According to embodiments, parameters required for encoding and/or decoding of point cloud data may be newly defined in parameter sets (e.g., SPS, GPS, APS, and TPS (or referred to as a tile inventory), etc.) of the point cloud data and/or the header of the corresponding slice. For example, they may be added to the GPS in encoding and/or decoding of geometry information, and may be added to the tile (TPS) and/or slice header in tile-based encoding and/or decoding.

According to embodiments, information related to slice (referred to as slice related information) and/or information related to buffer control (referred to as buffer control related information) may be signaled in at least one of the SPS, the GPS, the APS, the TPS, or an SEI message. Also, the information related to slice (referred to as slice related information) and/or the information related to buffer control (referred to as buffer control related information) may be signaled in at least one of the geometry slice header (referred to as a geometry data unit header) or the attribute slice header (referred to as an attribute data unit header).

According to embodiments, the slice related information and/or the buffer control related information may be defined in a corresponding position or a separate position depending on an application or system such that the range and method to be applied may be used differently. A field, which is a term used in syntaxes that will be described later in the present disclosure, may have the same meaning as a parameter or a syntax element.

That is, the signal (e.g., the slice related information and/or the buffer control related information) may have different meanings depending on the position where the signal is transmitted. When the signal is defined in the SPS, it may be equally applied to the entire sequence. When the signal is defined in the GPS, this may indicate that the signal is used for position reconstruction. When the signal is defined in the APS, this may indicate that the signal is applied to attribute reconstruction. When the signal is defined in the TPS, this may indicate that the signaling is applied only to points within a tile. When the signal is delivered in a slice, this may indicate that the signaling is applied only to the slice. In addition, when the fields (or referred to as syntax elements) are applicable to multiple point cloud data streams as well as the current point cloud data stream, they may be carried in a superordinate parameter set.

According to embodiments, parameters (which may be referred to as metadata, signaling information, or the like) may be generated by the metadata processor (or metadata generator), signaling processor, or processor of the transmission device, and may be transmitted to the reception device and used in the decoding/reconstruction operation. For example, the parameters generated and transmitted by the transmission device may be acquired by the metadata parser of the reception device.

In this embodiment, it has been described that information is defined independently of the coding technique. However, in other embodiments, the information may be defined in connection with the coding technique. In order to support regionally different scalability, the information may be defined in the tile parameter set.

Alternatively, a network abstract layer (NAL) unit may be defined and relevant information (e.g., the slice related information and/or the buffer control related information) for selecting a layer, such as layer id, may be delivered. Thereby, a bitstream may be selected even at a system level.

FIG. 28 shows an embodiment of a syntax structure of a sequence parameter set (SPS) (seq_parameter_set( )) according to the present disclosure. The SPS may contain sequence information about a point cloud data bitstream.

The SPS according to the embodiments may include a main_profile_compatibility_flag field, a unique_point_positions_constraint_flag field, a level_idc field, an sps_seq_parameter_set_id field, an sps_bounding_box_present_flag field, an sps_source_scale_factor field, an numerator_minus1 field, an source_scale_factor_denominator_minus1 field, an sps_num_attribute_sets field, an log 2_max_frame_idx field, an axis_coding_order field, an sps_bypass_stream_enabled_flag field, and an sps_extension_flag field.

The main_profile_compatibility_flag field may indicate whether the bitstream conforms to a main profile. For example, the main_profile_compatibility_flag field equal to 1 may indicate that the bitstream conforms to the main profile. For another example, the main_profile_compatibility_flag field equal to 0 may indicate that the bitstream conforms to a profile other than the main profile.

When the value of the unique_point_positions_constraint flag field is 1, all output points may have unique positions in each point cloud frame referred to by the current SPS. When the value of the unique_point_positions_constraint flag field is 0, two or more output points may have the same position in a point cloud frame referred to by the current SPS. For example, even though all points are unique in each slice, slices and other points within a frame may overlap. In this case, the unique_point_positions_constraint_flag field is set to 0.

The level_idc field indicates a level to which the bitstream conforms.

The sps_seq_parameter_set id field provides an identifier for the SPS for reference by other syntax elements.

The sps_bounding_box_present_flag field may indicate whether a bounding box is present in the SPS. For example, the sps_bounding_box_present_flag field equal to 1 indicates that a bounding box is present in the SPS and the sps_bounding_box_present_flag field equal to 0 indicates that the size of the bounding box is undefined.

When the sps_bounding_box_present_flag field is equal to 1, the SPS according to embodiments may further include an sps_bounding_box_offset_x field, an sps_bounding_box_offset_y field, an sps_bounding_box_offset_z field, an sps_bounding_box_offset log 2_scale field, an sps_bounding_box_size_width field, an sps_bounding_box_size_height field, and an sps_bounding_box_size_depth field.

The sps_bounding_box_offset_x field indicates the x offset of the source bounding box in the Cartesian coordinates. When the x offset of the source bounding box is not present, the value of sps_bounding_box_offset_x is 0.

The sps_bounding_box_offset_y field indicates the y offset of the source bounding box in the Cartesian coordinates. When the y offset of the source bounding box is not present, the value of sps_bounding_box_offset_y is 0.

The sps_bounding_box_offset_z field indicates the z offset of the source bounding box in the Cartesian coordinates.

When the z offset of the source bounding box is not present, the value of sps_bounding_box_offset_z is 0.

The sps_bounding_box_offset log 2_scale field indicates a scale factor to scale the quantized x, y, and z source bounding box offsets.

The sps_bounding_box_size_width field indicates the width of the source bounding box in the Cartesian coordinates. When the width of the source bounding box is not present, the value of the sps_bounding_box_size_width field may be 1.

The sps_bounding_box_size_height field indicates the height of the source bounding box in the Cartesian coordinates. When the height of the source bounding box is not present, the value of the sps_bounding_box_size_height field may be 1.

The sps_bounding_box_size_depth field indicates the depth of the source bounding box in the Cartesian coordinates. When the depth of the source bounding box is not present, the value of the sps_bounding_box_size_depth field may be 1.

The sps_source_scale_factor_numerator_minus1 field plus 1 indicates the scale factor numerator of the source point cloud.

The sps_source_scale_factor_denominator_minus1 field plus 1 indicates the scale factor denominator of the source point cloud.

The sps_num_attribute_sets field indicates the number of coded attributes in the bitstream.

The SPS according to embodiments includes an iteration statement repeated as many times as the value of the sps_num_attribute_sets field. In an embodiment, i is initialized to 0, and is incremented by 1 each time the iteration statement is executed. The iteration statement is repeated until the value of i becomes equal to the value of the sps_num_attribute_sets field. The iteration statement may include an attribute_dimension_minus1 [i] field and an attribute_instance_id[i] field. The attribute_dimension_minus1 [i] field plus 1 specifies the number of components of the i-th attribute.

The attribute_instance_id[i] field specifies an instance ID of the i-th attribute.

According to embodiments, when a value of attribute_dimension_minus1 [i] field is greater than 1, the iteration statement may further include an attribute_secondary_bitdepth_minus [i] field, an attribute_cicp_colour_primaries[i] field, an attribute_cicp_transfer_characteristics[i] field, an attribute_cicp_matrix_coeffs[i] field, an attribute_cicp_video_full_range_flag[i] field, and a known_attribute_label_flag[i] field.

The attribute_secondary_bitdepth_minus [i] plus 1 specifies a bitdepth for a second component of the i-th attribute signal(s).

The attribute_cicp_colour_primaries[i] field indicates chromaticity coordinates of the color attribute source primaries of the i-th attribute.

The attribute_cicp_transfer_characteristics[i] field either indicates the reference opto-electronic transfer characteristic function of the colour attribute as a function of a source input linear optical intensity with a nominal real-valued range of 0 to 1 or indicates the inverse of the reference electro-optical transfer characteristic function as a function of an output linear optical intensity.

The attribute_cicp_matrix_coeffs[i] field describes the matrix coefficients used in deriving luma and chroma signals from the green, blue, and red, or Y, Z, and X primaries.

The attribute_cicp_video_full_range_flag[i] field indicates the black level and range of the luma and chroma signals as derived from E'Y, E'PB, and E'PR or E'R, E'G, and E'B real-valued component signals.

The known_attribute_label_flag[i] field specifies whether a know_attribute_label[i] field or an attribute_label_four bytes[i] field is signaled for the i-th attribute. For example, the value of the known_attribute_label_flag[i] field equal to 0 specifies that the known_attribute_label field is signaled for the ith attribute. The known_attribute_label_flag[i] field equal to 1 specifies that the attribute_label_four bytes[i] field is signaled for the ith attribute.

The known_attribute_label[i] field indicates the type of the i-th attribute. For example, when the value of the known_attribute_label[i] field is 0, it may indicate that the i-th attribute is color. When the value of the known_attribute_label[i] field is 1, it may indicate that the i-th attribute is reflectance. When the value of the known_attribute_label [i] field is 2, it may indicate that the i-th attribute is frame index. In addition, when the value of the known_attribute_label[i] field is 4, it indicates that the i-th attribute is transparency. When the value of the known_attribute_label [i] field is 5, it indicates that the i-th attribute is normals.

The attribute_label_four bytes[i] field indicates a known attribute type in a 4-byte code.

According to embodiments, when the value of the attribute_label_four bytes[i] is 0, it may indicate that the i-th attribute is color. When the value of the attribute_label_four_bytes[i] field is 1, it may indicate that the i-th attribute is reflectance. When the value of the attribute_label_four bytes[i] field is 2, it may indicate that the i-th attribute is frame index. When the value of the attribute_label_four bytes[i] field is 4, it may indicate that the i-th attribute is transparency. When the value of the attribute_label_four bytes[i] field is 5, it may indicate that the i-th attribute is normals.

The log 2_max_frame_idx field specifies the number of bits used to signal a frame_idx syntax variable.

The axis_coding_order field i specifies the correspondence between the X, Y, and Z output axis labels and the three position components in the reconstructed point cloud RecPic [pointidx] [axis] with axis=0, ..., 2.

The sps_bypass_stream_enabled_flag field equal to 1 may specify that the bypass coding mode is used on reading the bitstream. As another example, the sps_bypass_stream_enabled_flag field equal to 0 may specify that the bypass coding mode is not used on reading the bitstream.

The sps_extension_flag field indicates whether the sps_extension_data syntax structure is present in the corresponding SPS syntax structure. For example, when the sps_extension_present_flag field is equal to 1, it indicates that the sps_extension_data syntax structure is present in the SPS syntax structure. When the sps_extensionpresent_flag field is equal to 0, it indicates that the sps_extension_data syntax structure is not present in the SPS syntax structure.

According to embodiments, when the sps_extension_flag field is equal to 1, the SPS may further include a sps_extension_data_flag field.

The sps_extension_data_flag field may have any value.

FIG. 29 shows another embodiment of a syntax structure of an SPS (sequency_parameter_set( )) according to embodiments.

The SPS of FIG. 29 may further include a field sps_entropy_continuation_enabled_flag. For example, sps_entropy_continuation_enabled_flag equal to 1 indicates that a slice's initial entropy context state may depend upon the final entropy context state of the preceeding slice. sps_entropy_continuation_enabled_flag equal to 0 specifies that the initial entropy context state of each slice is independent.

According to embodiments, the field sps_entropy_continuation_enabled_flag of FIG. 29 may be included any position in the SPS of FIG. 28.

FIG. 30 shows an embodiment of a syntax structure of the geometry parameter set (GPS) (geometry_parameter_set( )) according to the present disclosure. The GPS according to the embodiments may contain information on a method of encoding geometry information about point cloud data contained in one or more slices.

According to embodiments, the GPS may include a gps_geom_parameter_set_id field, a gps_seq_parameter_set_id field, a gps_box_present_flag field, a unique_geometry_points_flag field, a geometry_planar_mode_flag field, a geometry_angular_mode_flag field, a neighbour_context_restriction flag field, an inferred_direct_coding_mode_enabled_flag field, a bitwise_occupancy_coding_flag field, an adjacent_child_contextualization_enabled_flag field, a log 2_neighbour_avail_boundary field, a log 2_intra_pred_max_node_size field, a log 2_trisoup_node_size field, a geom_scaling_enabled_flag field, a gps_implicit_geom_partition_flag field, and a gps_extension_flag field.

The gps_geom_parameter_set_id field provides an identifier for the GPS for reference by other syntax elements.

The gps_seq_parameter_set_id field specifies the value of sps_seq_parameter_set_id for the active SPS.

The gps_box_present flag field specifies whether additional bounding box information is provided in a geometry slice header that references the current GPS. For example, the gps_box_present_flag field equal to 1 may specify that additional bounding box information is provided in a geometry header that references the current GPS. Accordingly, when the gps_box_present_flag field is equal to 1, the GPS may further include a gps_gsh_box_log 2_scale_present_flag field.

The gps_gsh_box_log 2_scale_present_flag field specifies whether the gps_gsh_box_log 2_scale field is signaled in each geometry slice header that references the current GPS. For example, the gps_gsh_box_log 2_scale_present_flag field equal to 1 may specify that the gps_gsh_box_log 2_scale field is signaled in each geometry slice header that references the current GPS. As another example, the gps_gsh_box_log 2_scale_present_flag field equal to 0 may specify that the gps_gsh_box_log 2_scale field is not signaled in each geometry slice header and a common scale for all slices is signaled in the gps_gsh_box_log 2_scale field of the current GPS.

When the gps_gsh_box_log 2_scale_present_flag field is equal to 0, the GPS may further include a gps_gsh_box_log 2_scale field.

The gps_gsh_box_log 2_scale field indicates the common scale factor of the bounding box origin for all slices that refer to the current GPS.

The unique_geometry_points_flag field indicates whether, in all slices that refer to the current GPS, all output points have unique positions within a slice. For example, the unique_geometry_points_flag field equal to 1 indicates that in all slices that refer to the current GPS, all output points have unique positions within a slice. The unique_geometry_points flag field equal to 0 indicates that in all slices that refer to the current GPS, the two or more of the output points may have the same position within a slice.

The geometry_planar_mode_flag field indicates whether the planar coding mode is activated. For example, the geometry_planar_mode_flag field equal to 1 indicates that the planar coding mode is activated. The geometry_planar_mode_flag equal to 0 indicates that the planar coding mode is not activated.

When the geometry_planar_mode_flag field is equal to 1, that is, TRUE, the GPS may further include a geom_planar_mode_th_idcm field, a geom_planar_mode_th[1] field, and a geom_planar_mode_th[2] field.

The geom_planar_mode_th_idcm field may specify a value of a threshold of activation for the direct coding mode.

The geom_planar_mode_th[i] field specifies, for i in the range 0 . . . 2, the value of the threshold of activation for the planar coding mode along the i-th most probable direction for the planar coding mode to be efficient.

The geometry_angular_mode_flag field indicates whether the angular coding mode is active. For example, when the geometry_angular_mode_flag field is equal to 1, it may indicate that the angular coding mode is active. When the geometry_angular_mode_flag field is equal to 0, it may indicate that the angular coding mode is not active.

When the value of the geometry_angular_mode_flag field is 1, that is, TRUE, the GPS may further include a lidar_head_position[0] field, a lidar_head_position[1] field, a lidar_head_position[2] field, a number_lasers field, a planar_buffer_disabled field, a implicit qtbt_angular_max_node_min_dim_log 2_to_split_z field, and an implicit qtbt_angular_max_diff_to_split_z field.

The lidar_head_position[0] field, the lidar_head_position[1] field, and the lidar_head_position[2] field may represent (X, Y, Z) coordinates of the lidar head in a coordinate system with the internal axes.

The number_lasers field indicates the number of lasers used for the angular coding mode.

According to embodiments, the GPS includes an iteration statement iterated as many times as the value of the number_lasers field. In this case, according to an embodiment, i is initialized to 0, and is incremented by 1 each time the iteration statement is executed. The iteration statement is iterated until the value of i becomes equal to the value of the number_lasers field. This iteration statement may include a laser_angle[i] field and a laser_correction[i] field.

The laser_angle[i] field indicates the tangent of the elevation angle of the i-th laser relative to the horizontal plane defined by the 0-th and first internal axes.

The laser_correction[i] field indicates correction of the i-th laser position related to the lidar_head_position[2] field along the second internal axis.

When the planar_buffer_disabled field is equal to 1, it indicates that tracking the closest nodes using a buffer is not used in the process of coding the planar mode flag field and the plane position in the planar mode. When the planar_buffer_disabled field is equal to 0, it indicates that tracking the closest nodes using a buffer is used.

The implicit qtbt_angular_max_node_min_dim_log 2_to_split_z field indicates a log 2 value of a node size below which horizontal split of nodes is preferred to vertical split.

The implicit qtbt_angular_max_diff_to_split_z field indicates the log 2 value of the maximum vertical over horizontal node size ratio allowed for a node.

The neighbour_context_restriction flag field equal to 0 indicates that geometry node occupancy of the current node is coded with the contexts determined from neighboring nodes which are located inside the parent node of the current node. The neighbour_context_restriction flag field equal to 1 indicates that geometry node occupancy of the current node is coded with the contexts determined from neighboring nodes which are located inside or outside the parent node of the current node.

The inferred_direct coding_mode_enabled_flag field indicates whether the direct_mode_flag field is present in the geometry node syntax. For example, the inferred_direct coding_mode_enabled_flag field equal to 1 indicates that the direct_mode flag field may be present in the geometry node syntax. For example, the inferred_direct coding_mode_enabled_flag field equal to 0 indicates that the direct_mode flag field is not present in the geometry node syntax.

The bitwise_occupancy_coding_flag field indicates whether geometry node occupancy is encoded using bitwise contextualization of the syntax element occupancy map. For example, the bitwise_occupancy_coding_flag field equal to 1 indicates that geometry node occupancy is encoded using bitwise contextualisation of the syntax element occupancy map. For example, the bitwise_occupancy_coding_flag field equal to 0 indicates that geometry node occupancy is encoded using the dictionary encoded syntax element occupancy byte.

The adjacent_child_contextualization_enabled_flag field indicates whether the adjacent children of neighboring octree nodes are used for bitwise occupancy contextualization. For example, the adjacent_child_contextualization_enabled_flag field equal to 1 indicates that the adjacent children of neighboring octree nodes are used for bitwise occupancy contextualization. For example, the adjacent_child_contextualization_enabled_flag field equal to 0 indicates that the children of neighbouring octree nodes are not used for the occupancy contextualization.

The log 2_neighbour_avail_boundary field specifies the value of the variable NeighbAvailBoundary that is used in the decoding process. For example, when the neighbour_context_restriction flag field is equal to 1, NeighbAvailabilityMask may be set equal to 1. For example, when the neighbour_context_restriction_flag field is equal to 0, NeighbAvailabilityMask may be set equal to 1<<log 2_neighbour_avail_boundary.

The log 2_intra_pred_max_node_size field specifies the octree node size eligible for occupancy intra prediction.

The log 2_trisoup_node_size field specifies the variable TrisoupNodeSize as the size of the triangle nodes.

The geom_scaling_enabled_flag field indicates whether a scaling process for geometry positions is invoked during the geometry slice decoding process. For example, the geom_scaling_enabled_flag field equal to 1 specifies that a scaling process for geometry positions is invoked during the geometry slice decoding process. The geom_scaling_enabled_flag field equal to 0 specifies that geometry positions do not require scaling.

The geom_base_qp field specifies the base value of the geometry position quantization parameter.

The gps_implicit_geom_partition_flag field specifies whether the implicit geometry partition is enabled for the sequence or slice. For example, the gps_implicit_geom_partition_flag field equal to 1 specifies that the implicit geometry partition is enabled for the sequence or slice. The gps_implicit_geom_partition_flag field equal to 0 specifies that the implicit geometry partition is disabled for the sequence or slice. When the gps_implicit_geom_partition_flag field is equal to 1, the following two fields, that is, gps_max_num_implicit qtbt_before_ot and gps_min_size_implicit qtbt are signaled.

The gps_max_num_implicit qtbt_before_ot field specifies the maximal number of implicit QT and BT partitions before OT partitions. The variable K is then initialized by the gps_max_num_implicit_qtbt_before_ot field as follows:

K=gps_max_num_implicit_qtbt_before_ot.

The gps_min_size_implicit_qtbt field specifies the minimal size of implicit QT and BT partitions. The variable M is then initialized by the gps_min_size_implicit_qtbt field as follows:

M=gps_min_size_implicit_qtbt.

The gps_extension_flag field specifies whether the gps_extension_data syntax structure is present in the GPS syntax structure. For example, the gps_extension_flag field equal to 1 specifies that the gps_extension_data syntax structure is present in the GPS syntax. For example, the gps_extension_flag field equal to 0 specifies that this syntax structure is not present in the GPS syntax.

When the value of the gps_extension_flag field is equal to 1, the GPS according to the embodiments may further include a gps_extension_data_flag field.

The gps_extension_data_flag field may have any value. Its presence and value do not affect the decoder conformance to profiles.

According to embodiments, the GPS may further include a field geom_tree_type. For example, geom_tree_type equal to 0 indicates that the position information (or geometry) is coded using an octree. geom_tree_type equal to 1 indicates that the position information (or geometry) is coded using a predictive tree.

FIG. 31 shows an embodiment of a syntax structure of a GPS (geometry_parameter_set( )) including slice related information and/or buffer control related information according to embodiments.

According to embodiments, the GPS may include a field geom_slice_segmentation_enabled_flag.

For example, geom_slice_segmentation_enabled_flag equal to 1 may indicate that the geometry bitstream is divided into multiple slices and transmitted. In this case, it may be informed through additional conditions that parallel processing, scalable transmission, and spatial scalability are possible. Also, geom_slice_segmentation_enabled_flag equal to 1 may indicate that the geometry bitstream is transmitted in each single slice.

According to embodiments, the slice related information and/or the buffer control related information of FIG. 31 may be included at any position in the GPS of FIG. 30.

FIG. 32 shows an embodiment of a syntax structure of the attribute parameter set (APS) (attribute_parameter_set( )) according to the present disclosure. The APS according to the embodiments may contain information on a method of encoding attribute information about point cloud data contained in one or more slices.

The APS according to the embodiments may include an aps_attr_parameter_set_id field, an aps_seq_parameter_set_id field, an attr_coding_type field, an aps_attr_initial_qp field, an aps_attr_chroma_qp_offset field, an aps_slice_qp_delta_present_flag field, and an aps_extension_flag field.

The aps_attr_parameter_set id field provides an identifier for the APS for reference by other syntax elements.

The aps_seq_parameter_set_id field specifies the value of sps_seq_parameter set_id for the active SPS.

The attr_coding_type field indicates the coding type for the attribute.

According to embodiments, when the value of the attr_coding_type field is 0, it may indicate the coding type is predicting weight lifting. When the value of the attr_coding_type field is 1, it may indicate that the coding type is RAHT. When the value of the attr_coding_type field is 2, it may indicate that the coding type is fix weight lifting.

The aps_attr_initial_qp field specifies the initial value of the variable SliceQp for each slice referring to the APS.

The aps_attr_chroma_qp_offset field specifies the offsets to the initial quantization parameter signaled by the syntax aps_attr_initial_qp.

The aps_slice_qp_delta_present_flag field specifies whether the ash_attr_qp_delta_luma and ash_attr_qp_delta_chroma syntax elements are present in the attribute slice header (ASH). For example, the aps_slice_qp_delta_present_flag field equal to 1 specifies that the ash_attr_qp_delta_luma and ash_attr_qp_delta_chroma syntax elements are present in the ASH. For example, the aps_slice_qp_delta_present_flag field specifies that the ash_attr_qp_delta_luma and ash_attr_qp_delta_chroma syntax elements are not present in the ASH.

When the value of the attr_coding_type field is 0 or 2, that is, the coding type is predicting weight lifting or fix weight lifting, the APS according to the embodiments may further include a lifting_num_pred_nearest neighbours_minus1 field, a lifting_search_range_minus1 field, and a lifting_neighbour_bias[k] field.

The lifting_num_pred_nearest neighbours_minus1 field plus 1 specifies the maximum number of nearest neighbors to be used for prediction. According to embodiments, a value of NumPredNearedtNeighbours is set equal to a value of the lifting_num_pred_nearest neighbours_minus1 field.

The lifting_search_range_minus1 field plus 1 specifies the search range used to determine nearest neighbors to be used for prediction and to build distance-based levels of detail. The variable LiftingSearchRange for specifying a search range may acquire by adding 1 to a value of the lifting_search_range_minus1 field (LiftingSearchRange=lifting_search_range_minus1+1).

The lifting_neighbour_bias[k] field specifies a bias used to weight the k-th components in the calculation of the Euclidean distance between two points as part of the nearest neighbor derivation process.

According to embodiments, when the value of the attr_coding_type field is 2, that is, when the coding type indicates fix weight lifting, the APS may further include a lifting_scalability_enabled_flag field.

The lifting_scalability_enabled_flag field specifies whether the attribute decoding process allows the pruned octree decode result for the input geometry points. For example, the lifting_scalability_enabled_flag field equal to 1 specifies that the attribute decoding process allows the pruned octree decode result for the input geometry points. The lifting_scalability_enabled_flag field equal to 0 specifies that that the attribute decoding process requires a complete octree decode result for the input geometry points.

When the value of the lifting_scalability_enabled_flag field is false, the APS according to the embodiments may further include a lifting_num_detail_levels_minus1 field.

The lifting_num_detail_levels_minus1 field plus 1 specifies the number of levels of detail for the attribute coding. The variable LevelDetailCount for specifying the number of LODs may acquire by adding 1 to a value of the lifting_num_detail_levels_minus1 field (LevelDetailCount=lifting_num_detail_levels_minus1+1).

According to embodiments, when the value of the lifting_num_detail_levels_minus1 field is greater than 1, the APS may further include a lifting_lod_regular_sampling_enabled_flag field.

The lifting_lod_regular_sampling_enabled_flag field specifies whether levels of detail (LOD) are built by a regular sampling strategy. For example, the lifting_lod_regular_sampling_enabled_flag field equal to 1 specifies that levels of detail (LOD) are built by using a regular sampling strategy. The lifting_lod_regular_sampling_enabled_flag filed equal to 0 specifies that a distance-based sampling strategy is used instead.

When the value of the lifting_scalability_enabled_flag field is false, the APS according to embodiments may include an iteration statement repeated as many times as the value of the lifting_num_detail_levels_minus1 field. In an embodiment, the index (idx) is initialized to 0 and incremented by 1 every time the iteration statement is executed, and the iteration statement is repeated until the index (idx) is greater than the value of the lifting_num_detail_levels_minus1 field. This iteration statement may include a lifting_sampling_period_minus2 [idx] field when the value of the lifting_lod_regular_sampling_enabled_flag field is true (e.g., 1), and may include a lifting_sampling_distance_squared_scale_minus1 [idx] field when the value of the lifting_lod_regular_sampling_enabled_flag field is false (e.g., 0). Furthermore, when the value of the idx is not 0 (i.e., idx !=0), the APS may further include a lifting_sampling_distance_squared_offset [idx] field.

The lifting_sampling_period_minus2 [idx] field plus 2 specifies the sampling period for the level of detail idx.

The lifting_sampling_distance_squared_scale_minus1 [idx] field plus 1 specifies a scale factor for the derivation of the square of the sampling distance for the LOD idx.

The lifting_sampling_distance_squared_offset [idx] field specifies an offset for the derivation of the square of the sampling distance for the LOD idx.

When the value of the attr_coding_type field is 0, that is, when the coding type is predicting weight lifting, the APS according to the embodiments may further include a lifting_adaptive_prediction_threshold field, a lifting_intra_lod_prediction_num_layers field, a lifting_max_num_direct_predictors field, and an inter_component_prediction_enabled flag field.

The lifting_adaptive_prediction_threshold field specifies the threshold to enable adaptive prediction. According to embodiments, the variable AdaptivePredictionThreshold specifying a threshold to switch an adaptive predictor selection mode is set equal to a value of the lifting_adaptive_prediction_threshold field (AdaptivePredictionThreshold=lifting_adaptive_prediction_threshold).

The lifting_intra_lod_prediction_num_layers field specifies the number of LOD layers where decoded points in the same LOD layer could be referred to generate a prediction value of a target point. For example, the lifting_intra_lod_prediction_num_layers field equal to a value of the variable LevelDetailCount indicates that target point could refer to decoded points in the same LOD layer for all LOD layers. For example, the lifting_intra_lod_prediction_num_layers field equal to 0 indicates that target point could not refer to decoded points in the same LoD layer for any LoD layers. The lifting_max_num_direct_predictors field specifies the maximum number of predictors to be used for direct prediction. The value of the lifting_max_num_direct_predictors field shall be in the range of 0 to LevelDetailCount.

The inter_component_prediction_enabled_flag field specifies whether the primary component of a multi component attribute is used to predict the reconstructed value of non-primary components. For example, if the inter_component_prediction_enabled_flag field equal to 1 specifies that the primary component of a multi component attribute is used to predict the reconstructed value of non-primary components. The inter_component_prediction_enabled_flag field equal to 0 specifies that all attribute components are reconstructed independently.

When the value of the attr_coding_type field is 1, that is, when the attribute coding type is RAHT, the APS according to the embodiments may further include an raht_prediction_enabled_flag field.

The raht_prediction_enabled_flag field specifies whether the transform weight prediction from the neighbor points is enabled in the RAHT decoding process. For example, the raht_prediction_enabled_flag field equal to 1 specifies the transform weight prediction from the neighbor points is enabled in the RAHT decoding process. The raht_prediction_enabled_flag field equal to 0 specifies that the transform weight prediction is disabled in the RAHT decoding process.

According to embodiments, when the value of the raht_prediction_enabled_flag field is TRUE, the APS may further include a raht prediction_threshold0 field and a raht_prediction_threshold1 field.

The raht prediction_threshold0 field specifies a threshold to end the transform weight prediction from the neighbour points.

The raht_prediction_threshold1 field specifies a threshold to skip the transform weight prediction from the neighbour points.

The aps_extension_flag field specifies whether the aps_extension_data syntax structure is present in the APS syntax structure. For example, the aps_extension_flag field equal to 1 specifies that the aps_extension_data syntax structure is present in the APS syntax structure. For example, the aps_extension_flag field equal to 0 specifies that this syntax structure is not present in the APS syntax structure.

When the value of the aps_extension_flag field is 1, the APS according to the embodiments may further include an aps_extension_data_flag field.

The aps_extension_data_flag field may have any value. Its presence and value do not affect decoder conformance to profiles.

The APS according to the embodiments may further include information related to LoD-based attribute compression.

FIG. 32 shows an embodiment of a syntax structure of an APS (attribute_parameter_set( )) including slice related information and/or buffer control related information according to embodiments.

According to embodiments, the APS may a field attr_slice_segmentation_enabled_flag.

For example, attr_slice_segmentation_enabled_flag equal to 1 may indicate that the attribute bitstream is divided into multiple slices and transmitted. In this case, it may be informed through additional conditions that parallel processing, scalable transmission, and spatial scalability are possible. Also, attr_slice_segmentation_enabled_flag equal to 1 may indicate that the attribute bitstream is transmitted in each single slice.

According to embodiments, the segmented (separated) slice related information of FIG. 33 and/or information related to direct coding may be included at any position in the APS of FIG. 32.

FIG. 34 shows an embodiment of a syntax structure of geometry_slice_bitstream( ) according to embodiments.

The geometry slice bitstream (geometry_slice_bitstream( )) according to the embodiments may include a geometry slice header (geometry_slice_header( )) and geometry slice data (geometry_slice_data( )). According to embodiments, the geometry slice bitstream may be referred to as a geometry data unit, the geometry slice header may be referred to as a geometry data unit header, and the geometry slice data may be referred to as geometry data unit data.

FIG. 35 shows an embodiment of a syntax structure of the geometry slice header (geometry_slice_header( )) according to the present disclosure.

A bitstream transmitted by the transmission device (or a bitstream received by the reception device) according to the embodiments may contain one or more slices. Each slice may include a geometry slice and an attribute slice. The geometry slice includes a geometry slice header (GSH). The attribute slice includes an attribute slice header (ASH).

The geometry slice header (geometry_slice_header( )) according to embodiments may include a gsh_geometry_parameter_set_id field, a gsh_tile_id field, a gsh_slice_id field, a frame_idx field, a gsh_num_points field, and a byte_alignment( ) field.

When the value of the gps_box_present_flag field included in the GPS is 'true' (e.g., 1), and the value of the gps_gsh_box_log 2_scale_present_flag field is 'true' (e.g., 1), the geometry slice header (geometry_slice_header( )) according to the embodiments may further include a gsh_box_log 2_scale field, a gsh_box_origin_x field, a gsh_box_origin_y field, and a gsh_box_origin_z field.

The gsh_geometry_parameter_set_id field specifies the value of the gps_geom_parameter_set_id of the active GPS.

The gsh_tile_id field specifies the value of the tile id that is referred to by the GSH.

The gsh_slice_id field specifies the slice header (or id of the slice) for reference by other syntax elements.

The frame_idx field specifies the log 2_max_frame_idx+1 least significant bits of a notional frame number counter. Consecutive slices with differing values of frame_idx form parts of different output point cloud frames. Consecutive slices with identical values of frame_idx without an intervening frame boundary marker data unit form parts of the same output point cloud frame.

The gsh_num_points field specifies the maximum number of coded points within the corresponded slice. It is a requirement of bitstream conformance that a value of the gsh_num_points field is greater than or equal to the number of decoded points in the slice.

The gsh_box_log 2_scale field specifies the scaling factor of the bounding box origin for the slice.

The gsh_box_origin_x field specifies the x value of the bounding box origin scaled by the value of the gsh_box_log 2_scale field.

The gsh_box_origin_y field specifies the y value of the bounding box origin scaled by the value of the gsh_box_log 2_scale field.

The gsh_box_origin_z field specifies the z value of the bounding box origin scaled by the value of the gsh_box_log 2_scale field.

In this case, the variables slice_origin_x, slice_origin_y, and slice_origin_z may be derived as follows.

If the gps_gsh_box_log 2_scale_present_flag field is equal to 0, originScale is set equal to gsh_box_log 2_scale.

If the gps_gsh_box_log 2_scale_present_flag field is equal to 1, originScale is set equal to gps_gsh_box_log 2_scale.

If the gps_box_present_flag field is equal to 0, the values of the variables slice_origin_x, slice_origin_y, and slice_origin_z are inferred to be 0.

If the gps_box_present_flag field is equal to 1, the following equations will be applied to the variables slice_origin_x, slice_origin_y, and slice_origin_z.

slice_origin_x=gsh_box_origin_x<<originScale
slice_origin_y=gsh_box_origin_y<<originScale
slice_origin_z=gsh_box_origin_z<<originScale When the value of the gps_implicit_geom_partition_flag field is 'true' (i.e., 0), the geometry slice header ((geometry_slice_header( ))) may further include a gsh_log 2_max_nodesize_x field, a gsh_log 2_max_nodesize_y_minus_x field, and a gsh_log 2_max_nodesize_z_minus_Y field. When the value of the gps_implicit_geom_partition_flag field is 'false' (i.e., 1), the geometry slice header may further include a gsh_log 2_max_nodesize field.

The gsh_log 2_max_nodesize_x field specifies the bounding box size in the x dimension, i.e., MaxNodesizeXLog2 that is used in the decoding process as follows.

MaxNodeSizeXLog2=gsh_log 2_max_nodesize_x
MaxNodeSizeX=1<<MaxNodeSizeXLog2

The gsh_log 2_max_nodesize_y_minus_x field specifies the bounding box size in the y dimension, i.e., MaxNodesizeYLog2 that is used in the decoding process as follows.

MaxNodeSizeYLog2=gsh_log 2_max_nodesize_y_minus_x+MaxNodeSizeXLog2.
MaxNodeSizeY=1<<MaxNodeSizeYLog2.

The gsh_log 2_max_nodesize_z_minus_Y field specifies the bounding box size in the z dimension, i.e., MaxNodesizeZLog2 that is used in the decoding process as follows.

MaxNodeSizeZLog2=gsh_log 2_max_nodesize_z_minus_y+MaxNodeSizeYLog2
MaxNodeSizeZ=1<<MaxNodeSizeZLog2

When the value of the gps_implicit_geom_partition_flag field is 1, the gsh_log 2_max_nodesize field is obtained as follows.

gsh_log 2_max_nodesize=max{MaxNodeSizeXLog2, MaxNodeSizeYLog2, MaxNodeSizeZLog2}

The gsh_log 2_max_nodesize field specifies the size of the root geometry octree node when the gps_implicit_geom_partition_flag field is equal to 0.

Here, the variables MaxNodeSize and MaxGeometryOctreeDepth are derived as follows.

MaxNodeSize=1<<gsh_log 2_max_nodesize
MaxGeometryOctreeDepth=gsh_log 2_max_nodesize-log 2_trisoup_node_size When the value of the geom_scaling_enabled_flag field is 'true', the geometry slice header (geometry_slice_header( )) according to the embodiments may further include a geom_slice_qp_offset field and a geom_octree_qp_offsets_enabled_flag field.

The geom_slice_qp_offset field specifies an offset to the base geometry quantization parameter geom_base_qp.

The geom_octree_qp_offsets_enabled_flag field specifies whether the geom_octree_qp_ofsets_depth field is present in the geometry slice header. For example, the geom_octree_qp_offsets_enabled_flag field equal to 1 specifies that the geom_octree_qp_offsets_depth field is present in the geometry slice header. The geom_octree_qp_offsets_enabled_flag field equal to 0 specifies that the geom_octree_qp_offsets_depth field is not present.

The geom_octree_qp_offsets_depth field specifies the depth of the geometry octree.

FIG. 36 shows an embodiment of a syntax structure of a geometry data unit header (or referred to as a geometry slice header) including slice related information and/or buffer control related information according to embodiments.

The geometry data unit header according to the embodiments may include a field slice_id and a field dependent_neighbour_enabled_flag.

slice id specifies an identifier for identifying a data unit (i.e., a slice). That is, slice_id may specify an indicator for distinguishing a slice or a data unit, and carry the indicator for a data unit (or called a slice) belonging to a slice layer. Alternatively, slice id may identify the corresponding slice header for reference by other syntax elements.

For example, dependent_neighbour_enabled_flag equal to 1 may indicate that neighbor information outside the slice should be used in the coding operation. dependent_neighbour_enabled_flag equal to 0 may indicate that the neighbor relation is estimated using only the internal information without using the neighbor information outside the slice.

When the value of sps_entropy_continuation_enabled_flag is False (i.e., 0), the geometry data unit header according to the embodiments may further include a field gsh_entropy_continuation_flag. When the value of sps_entropy_continuation_enabled_flag is True (i.e., 1), the geometry data unit header may further include a field gsh_prev_slice_id.

The field sps_entropy_continuation_enabled_flag is included in the SPS. When the value of this field is 0, it specifies that the initial entropy context state of each slice is independent.

For example, gsh_entropy_continuation_flag equal to 1 may indicate that the parsing state used in the entropy coding of the current geometry data unit is dependent upon the final parsing state of the previous geometry data unit. Also, gsh_entropy_continuation_flag equal to 1 may indicate that the parsing state used in the entropy coding of the attribute data unit that refers to the current geometry data unit is dependent upon the final parsing state of the previous attribute data unit.

For example, gsh_entropy_continuation_flag equal to 0 may indicate that the parsing state used in the entropy coding of the current geometry data unit and attribute data unit that refers to the current geometry data unit do not depend upon any previous data unit. According to embodiments, it is a requirement of bitstream conformance that gsh_entropy_continuation_flag is equal to 0 when the current geometry data unit is the first data unit in a point cloud frame.

gsh_prev_slice_id specifies the value of gsh_slice_id (or slice id) of the preceding (or previous) geometry data unit in bitstream order.

When geom_slice_segmentation_enabled_flag is equal to 1, the geometry data unit header may further include a field context_reuse flag. Also, when context_reuse_flag is equal to 1, the geometry data unit header may further include a field num_context_reuse_minus1.

geom_slice_segmentation_enabled_flag equal to 1 indicates that the geometry bitstream is divided into multiple slices and transmitted.

For example, context_reuse_flag field equal to 1 may indicate that the context of the current slice is used in at least one subsequent slice. According to embodiments, when the reception device uses the context buffer control, the context of the current slice may be stored in the context buffer for at least one subsequent slice. context_reuse flag equal to 0 may indicate that the context of the current slice is not used for the subsequent slices.

num_context_reuse_minus1 plus 1 may indicate the number of times the context of the current slice is used for subsequent slices.

For example, when the reception device uses the context buffer control, the context of the current slice may be referenced as many times as the num_context_reuse_minus1+1 through a counter (referred to as a context reference counter) and then deleted from the context buffer.

The geometry data unit header according to the embodiments includes an iteration statement that is repeated as many times as the value of num_context_reuse_minus1. In an embodiment, i is initialized to 0, and is incremented by 1 each time the iteration statement is executed. The iteration statement is repeated until the value of i becomes equal to the value of num_context_reuse_minus1. The iteration statement may include a field subsequent_slice_id.

The field subsequent_slice_id may specify an identifier for identifying the i-th subsequent slice that uses the current context. That is, the field subsequent_slice_id may be used to specify a subsequent slice using the context of the current slice.

For example, when the reception device uses the context buffer control and a slice (i.e., a subsequent slice) specified through subsequent_slice_id is provided, the counter (or referred to as a context reference counter) may be decremented as shown below or the current context may be referenced as many times as num_context_reuse_minus1+1 through the counter and then deleted from the context buffer. That is, each time the current context is used in a subsequent slice, the counter is decremented by 1. Then, when the counter reaches 0, the context is deleted from the context buffer.

NumContextReuse=num_context_reuse_minus1+1
If(subsequent_slice_id==slice id)
NumContextReuse=NumContextReuse−1

The geometry data unit header according to embodiments may further include a field num_neighbour_slice when dependent_neighbour_enabled_flag field is equal to 1, and may further include a field neighbor_occupancy_type when dependent neighbour_enabled_flag is equal to 0.

The field num_neighbor slice may indicate the number of slices including the corresponding node when referring to node information outside the slice.

The field neighbor_occupancy_type may define an assumption that is made for a corresponding node when no node information outside the slice is referred to. For example, neighbor_occupancy_type equal to 0 may indicate that there is no corresponding neighbor node. neighbor_occupancy_type equal to 1 may indicate that all neighbor nodes are occupied. neighbor_occupancy_type equal to 2 may indicate that the neighbor nodes are non-occupied nodes. neighbor_occupancy_type equal to 3 may indicate that occupancy information about nodes in a slice symmetrical with respect to a central node is used.

The geometry data unit header according to the embodiments includes an iteration statement that is repeated as many times as the value of num_neighbor_slice. In an embodiment, i is initialized to 0, and is incremented by 1 each time the iteration statement is executed. The iteration statement is repeated until the value of i becomes equal to the value of num_neighbor_slice field. The iteration statement may include a field neighbor slice_id.

The field neighbor_slice_id may specify an identifier for identifying the i-th slice including the corresponding node when referring to node information outside the slice.

According to embodiments, the slice related information and/or the buffer control related information of FIG. 36 may be included at any position in the geometry slice header (i.e., the geometry data unit header) of FIG. 35.

FIG. 37 shows an embodiment of a syntax structure of geometry slice data (geometry_slice_data( )) according to the present disclosure. The geometry slice data (geometry_slice_data( )) according to the embodiments may carry a geometry bitstream belonging to a corresponding slice (or data unit).

The geometry_slice_data( ) according to the embodiments may include a first iteration statement repeated as many times as by the value of MaxGeometryOctreeDepth. In an embodiment, the depth is initialized to 0 and is incremented by 1 each time the iteration statement is executed, and the first iteration statement is repeated until the depth becomes equal to MaxGeometryOctreeDepth. The first iteration statement may include a second loop statement repeated as many times as the value of NumNodesAtDepth. In an embodiment, nodeidx is initialized to 0 and is incremented by 1 each time the iteration statement is executed. The second iteration statement is repeated until nodeidx becomes equal to NumNodesAtDepth. The second iteration statement may include xN=NodeX[depth][nodeIdx], yN=NodeY[depth][nodeIdx], zN=NodeZ[depth][nodeIdx], and geometry_node(depth, nodeIdx, xN, yN, zN). MaxGeometryOctreeDepth indicates the maximum value of the geometry octree depth, and NumNodesAtDepth[depth] indicates the number of nodes to be decoded at the corresponding depth. The variables NodeX[depth][nodeIdx], NodeY[depth][nodeIdx], and NodeZ[depth][nodeIdx] indicate the x, y, z coordinates of the Idx-th node in decoding order at a given depth. The geometry bitstream of the node of the depth is transmitted through geometry_node(depth, nodeIdx, xN, yN, zN).

The geometry slice data (geometry_slice_data( )) according to the embodiments may further include geometry_trisoup_data( ) when the value of the log 2_trisoup_node_size field is greater than 0. That is, when the size of the triangle nodes is greater than 0, a geometry bitstream subjected to trisoup geometry encoding is transmitted through geometry trisoup_data( ).

FIG. 38 shows an embodiment of a syntax structure of attribute_slice_bitstream( ) according to the present disclosure. According to embodiments, the attribute slice bitstream is referred to as an attribute data unit, the attribute slice header is referred to as an attribute data unit header, and the attribute slice data is referred to as an attribute data unit data.

The attribute slice bitstream (attribute_slice_bitstream ( )) according to the embodiments may include an attribute slice header (attribute_slice_header( )) and attribute slice data (attribute_slice_data( )).

FIG. 39 shows an embodiment of a syntax structure of an attribute slice header (attribute_slice_header( )) according to the present disclosure.

The attribute slice header (attribute_slice_header( )) according to the embodiments may include an ash_attr_parameter_set_id field, an ash_attr_sps_attr_idx field, an ash_attr_geom_slice_id field, an ash_attr_layer_qp_delta_present_flag field, and an ash_attr_region_qp_delta_present_flag field.

When the value of the aps_slice_qp_delta_present_flag field of the APS is 'true' (e.g., 1), the attribute_slice_header ( ) may further include an ash_attr_qp_delta_luma field and when the value of the attribute_dimension_minus1 [ash_attr_sps_attr_idx] field is greater than 0, the attribute_slice_header( ) may further include an ash_attr_qp_delta_chroma field.

The ash_attr_parameter_set_id field specifies the value of the aps_attr_parameter_set_id field of the current active APS.

The ash_attr_sps_attr_idx field specifies an attribute set in the currently active SPS.

The ash_attr_geom_slice_id field specifies the value of the gsh_slice_id field of the current geometry slice header.

The ash_attr_qp_delta_luma field specifies a luma delta quantization parameter (qp) derived from the initial slice qp in the active attribute parameter set.

The ash_attr_qp_delta_chroma field specifies the chroma delta qp derived from the initial slice qp in the active attribute parameter set.

The variables InitialSliceQpY and InitialSliceQpC are derived as follows.

InitialSliceQpY=aps_attrattr_initial_qp+ash_attr_qp_delta_luma

InitialSliceQpC=aps_attrattr_initial_qp+aps_attr_chroma_qp_offset+ash_attr_qp_delta_chroma The ash_attr_layer_qp_delta_present flag field indicates whether the ash_attr_layer_qp_delta_luma field and the ash_attr_layer_qp_delta_chroma field are present in the attribute slice header (ASH) for each layer. For example, the ash_attr_layer_qp_delta_present flag field equal to 1 indicates that the ash_attr_layer_qp_delta_luma field and the ash_attr_layer_qp_delta_chroma field are present in the ASH. The ash_attr_layer_qp_delta_present_flag field equal to 0 indicates that the ash_attr_layer_qp_delta_luma field and the ash_attr_layer_qp_delta_chroma field are absent from the ASH.

When the value of the ash_attr_layer_qp_delta_present_flag field is TRUE, the attribute slice header may further include an ash_attr_num_layer_qp_minus1 field.

The ash_attr_num_layer qp_minus1 plus 1 field indicates the number of layers in which the ash_attr_qp_delta_luma field and the ash_attr_qp_delta_chroma field are signaled. When the ash_attr_num_layer_qp field is not signaled, the value of the ash_attr_num_layer qp field will be 0. According to embodiments, NumLayerQp, which specifies the number of layers, may be obtained acquired by adding 0 to the value of the ash_attr_num_layer_qp_minus1 field (NumLayerQp=ash_attr_num_layer_qp_minus1+1).

According to embodiments, when the value of the ash_attr_layer_qp_delta_present_flag field is TRUE, the geometry slice header may include an iteration statement according to the value of NumLayerQp. In this case, according to an embodiment, i is initialized to 0, and is incremented by 1 each time the iteration statement is executed. The iteration statement is iterated until the value of i becomes equal to the value of NumLayerQp. This iteration statement includes an ash_attr_layer_qp_delta_luma[i] field. In addition, when the value of the attribute_dimension_minus1[ash_attr_sps_attr_idx] field is greater than 0, the iteration statement may further include an ash_attr_layer_qp_delta_chroma[i] field.

The ash_attr_layer_qp_delta_luma field indicates the luma delta quantization parameter (qp) from the InitialSliceQpY in each layer.

The ash_attr_layer_qp_delta_chroma field indicates the chroma delta qp from the InitialSliceQpC in each layer.

The variables SliceQpY[i] and SliceQpC[i] with i=0, . . . , NumLayerQPNumQPLayer-1 are derived as follows.

for (i=0; i<NumLayerQPNumQPLayer; i++) {
SliceQpY[i]=InitialSliceQpY+ash_attr_layer_qp_delta_luma[i]
SliceQpC[i]=InitialSliceQpC+ash_attr_layer_qp_delta_chroma[i]
}

When the value of the ash_attr_region_qp_delta_present_flag field is equal to 1, the attribute slice header (attribute_slice_header( )) according to the embodiments indicates that ash_attr_region_qp_delta, region bounding box origin, and size are present in the current attribute slice header. The ash_attr_region_qp_delta_present_flag field equal to 0 indicates the ash_attr_region_qp_delta, region bounding box origin and size are not present in the current ASH.

In other words, when the ash_attr_layer_qp_delta_present_flag field is equal to 1, the attribute slice header may further include an ash_attr_qp_region_box_origin_x field, an ash_attr_qp_region_box_origin_y field, an ash_attr_qp_region_box_origin_z field, an ash_attr_qp_region_box_width field, an ash_attr_qp_region_box_height field, an ash_attr_qp_region_box_depth field, and an ash_attr_region_qp_delta field.

The ash_attr_qp_region_box_origin_x field indicates the x offset of the region bounding box relative to slice_origin_x.

The ash_attr_qp_region_box_origin_y field indicates the y offset of the region bounding box relative to slice_origin_y.

The ash_attr_qp_region_box_origin_z field i indicates the z offset of the region bounding box relative to slice_origin_z.

The ash_attr_qp_region_box_size_width field indicates the width of the region bounding box.

The ash_attr_qp_region_box_size_height field indicates the height of the region bounding box.

The ash_attr_qp_region_box_size_depth field indicates the depth of the region bounding box.

The ash_attr_region_qp_delta field specifies the delta qp from the SliceQpY[i] and SliceQpC[i] of the region specified.

According to embodiments, the variable RegionboxDeltaQp specifying the region box delta quantization parameter is set equal to the value of the ash_attr_region_qp_delta field (RegionboxDeltaQp=ash_attr_region_qp_delta).

FIG. 40 shows an embodiment of a syntax structure of an attribute data unit header (or referred to as an attribute slice header) including slice related information and/or buffer control related information according to embodiments.

The attribute data unit header may include a field slice_id and a field dependent_neighbor enabled flag.

The slice_id field indicates an identifier for identifying a corresponding data unit (i.e., a slice). That is, the slice_id field indicates an indicator for distinguishing a slice or a data unit, and may deliver an indicator for a data unit (or called a slice) belonging to a slice layer. Alternatively, the slice_id field may identify a corresponding slice header for reference by other syntax elements.

For example, dependent_neighbour_enabled_flag equal to 1 may indicate that neighbor information outside the slice should be used in the coding operation. dependent_neighbour_enabled_flag equal to 0 may indicate that the neighbor relation is estimated using only the internal information without using the neighbor information outside the slice.

When the value of sps_entropy_continuation_enabled_flag is False (i.e., 0), the attribute data unit header according to the embodiments may further include a field ash_entropy_continuation_flag. When the value of sps_entropy_continuation_enabled_flag is True (i.e., 1), the attribute data unit header may further include a field ash_prev_slice_id.

The field sps_entropy_continuation_enabled_flag is included in the SPS. When the value of this field is 0, it specifies that the initial entropy context state of each slice is independent.

For example, ash_entropy_continuation_flag equal to 1 may indicate that the parsing state used in the entropy coding of the current attribute data unit is dependent upon the final parsing state of the previous attribute data unit. ash_entropy_continuation_flag equal to 0 may indicate that the parsing state used in the entropy coding of the current attribute data unit does not depend upon any previous data unit. According to embodiments, it is a requirement of bitstream conformance that ash_entropy_continuation_flag is equal to 0 when the current attribute data unit is the first data unit in a point cloud frame.

ash_prev_slice_id specifies the value of ash_slice_id (or slice id) of the preceding attribute data unit in bitstream order.

When attr_slice_segmentation_enabled_flag is equal to 1, the attribute data unit header may further include a field context_reuse_flag. Also, when context_reuse flag is equal to 1, the attribute data unit header may further include a field num_context_reuse_minus1.

attr_slice_segmentation_enabled_flag equal to 1 indicates that the attribute bitstream is divided into multiple slices and transmitted.

For example, context_reuse_flag field equal to 1 may indicate that the context of the current slice is used in at least one subsequent slice. According to embodiments, when the reception device uses the context buffer control, the context of the current slice may be stored in the context buffer for at least one subsequent slice. context_reuse flag equal to 0 may indicate that the context of the current slice is not used for the subsequent slices.

num_context_reuse_minus1 plus 1 may indicate the number of times the context of the current slice is used for subsequent slices.

For example, when the reception device uses the context buffer control, the context of the current slice may be referenced as many times as the num_context_reuse_minus1+1 through a counter (referred to as a context reference counter) and then deleted from the context buffer.

The attribute data unit header according to the embodiments includes an iteration statement that is repeated as many times as the value of num_context_reuse_minus1. In an embodiment, i is initialized to 0, and is incremented by 1 each time the iteration statement is executed. The iteration statement is repeated until the value of i becomes equal to the value of num_context_reuse_minus1. The iteration statement may include a field subsequent_slice_id.

The field subsequent_slice_id may specify an identifier for identifying the i-th subsequent slice that uses the current context. That is, the field subsequent_slice_id may be used to specify a subsequent slice using the context of the current slice.

For example, when the reception device uses the context buffer control and a slice (i.e., a subsequent slice) specified through subsequent_slice_id is provided, the counter (or referred to as a context reference counter) may be decremented as shown below or the current context may be referenced as many times as num_context reuse_minus1+1 through the counter and then deleted from the context buffer.
NumContextReuse=num_context_reuse_minus1+1
If(subsequent_slice_id==slice id)
NumContextReuse=NumContextReuse−1

The attribute data unit header according to embodiments may further include a field num_neighbour_slice when dependent_neighbour_enabled_flag field is equal to 1, and may further include a field neighbor_occupancy_type when dependent neighbour_enabled_flag is equal to 0.

The field num_neighbor_slice may indicate the number of slices including the corresponding node when referring to node information outside the slice.

The field neighbor_occupancy_type may define an assumption that is made for a corresponding node when no node information outside the slice is referred to. For example, neighbor_occupancy_type equal to 0 may indicate that there is no corresponding neighbor node. neighbor_occupancy_type equal to 1 may indicate that all neighbor nodes are occupied. neighbor_occupancy_type equal to 2 may indicate that the neighbor nodes are non-occupied nodes. neighbor_occupancy_type equal to 3 may indicate that occupancy information about nodes in a slice symmetrical with respect to a central node is used.

The attribute data unit header according to the embodiments includes an iteration statement that is repeated as many times as the value of num_neighbor_slice. In an embodiment, i is initialized to 0, and is incremented by 1 each time the iteration statement is executed. The iteration statement is repeated until the value of i becomes equal to the value of num_neighbor_slice field. The iteration statement may include a field neighbor slice_id.

The field neighbor_slice_id may specify an identifier for identifying the i-th slice including the corresponding node when referring to node information outside the slice.

According to embodiments, the slice related information and/or the buffer control related information of FIG. 40 may be included at any position in the attribute slice header (i.e., the attribute data unit header) of FIG. 39.

FIG. 41 shows a syntax structure of attribute slice data (attribute_slice_data( )) according to an embodiment of the present disclosure. The attribute slice data (attribute_slice_data( )) may carry an attribute bitstream belonging to a corresponding slice. The attribute slice data may include an attribute or attribute related data in relation to a part or the entirety of the point cloud.

In attribute_slice_data( ) in FIG. 41, dimension=attribute_dimension[ash_attr_sps_attr_idx] represents attribute_dimension of an attribute set identified by ash_attr_sps_attr_idx in the attribute slice header. attribute_dimension indicates the number of components constituting an attribute. The attribute according to the embodiments represents reflectance, color, or the like. Accordingly, the number of components differs among attributes. For example, an attribute corresponding to the color may have three color components (e.g., RGB). Accordingly, an attribute corresponding to the reflectance may be a mono-dimensional attribute, and an attribute corresponding to the color may be a three-dimensional attribute.

The attributes according to the embodiments may be attribute-encoded on a per dimension basis.

For example, the attribute corresponding to the reflectance and the attribute corresponding to the color may be attribute-encoded, respectively. The attributes according to embodiments may be attribute-encoded regardless of dimensions. For example, the attribute corresponding to the reflectance and the attribute corresponding to the color may be attribute-encoded together.

In FIG. 41, zerorun specifies the number of 0 prior to residual.

In FIG. 41, i denotes an i-th point value of the attribute. According to an embodiment, the fields attr_coding_type and lifting_adaptive_prediction_threshold are signaled in the APS.

MaxNumPredictors of FIG. 41 is a variable used in the point cloud data decoding operation, and may be acquired based on the value of lifting_adaptive_prediction threshold field signaled in the APS as follows.
MaxNumPredictors=lifting_max_num_direct_predicots+1

Here, lifting_max_num_direct_predictors indicates the maximum number of predictors to be used for direct prediction.

According to the embodiments, predIndex[i] specifies the predictor index (or prediction mode) to decode the i-th point value of the attribute. The value of predIndex[i] is in the range from 0 to the value of lifting_max_num_direct_predictors.

FIG. 42 shows a structure of a point cloud data transmission device according to embodiments.

The transmission device of FIG. 42 corresponds to the transmission device 10000 of FIG. 1, the point cloud video encoder 10002 of FIG. 1, the transmitter 10003 of FIG. 1, the acquisition 20000/encoding 20001/transmission 20002 of FIG. 2, the encoder of FIG. 4, the transmission device of FIG. 12, the device of FIG. 14, the encoder of FIG. 20, and the like. Each component of FIG. 42 may correspond to hardware, software, a processor, and/or a combination thereof.

The encoder and the transmitter according to the embodiments operate as described below.

When point cloud data is input to the transmission device, a geometry encoder 60010 encodes position information (geometry data (e.g., XYZ coordinates, phi-theta coordinates, etc.)) in the point cloud data, and an attribute encoder 60020 encodes attribute data (e.g., color, reflectance, intensity, grayscale, opacity, medium, material, glossiness, etc.) in the point cloud data.

The compressed (encoded) data is divided into units for transmission. The data may be divided by a sub-bitstream generator 60040 into units suitable to select necessary information in the bitstream unit according to layering structure information and may then be packed.

According to embodiments, the geometry bitstream output from the geometry encoder 60010 and/or the attribute bitstream output from the attribute encoder 60020 are input to the sub-bitstream generator 60040. The sub-bitstream generator 60040 configures multiple slices by segmenting each bitstream into multiple sub-bitstreams based on the slice related information and/or buffer control related information output from the metadata generator 60030. For details of the segmentation of each bitstream and the configuration of slices, reference will be made to FIGS. 17 to 24 described above, and descriptions of the details will be omitted. According to embodiments, the slice related information includes layering structure information. The slice related information indicates the configuration, sorting, and selection of a bitstream, and slice configuration described with reference to FIGS. 17 to 24, and represents the information shown in FIGS. 27 to 41 and the like.

According to embodiments, slice related information including layering structure information, and/or buffer control related information may be generated by the metadata generator 60030.

The slice related information and/or buffer control related information may be included in at least one of the SPS, GPS, TPS, APS, geometry slice header, attribute slice header, and SEI message to be transmitted to the reception device. The slice related information and/or buffer control related information may include one or more of the fields sps_entropy_continuation_enabled_flag, geom_slice_segmentation_enabled_flag, attr_slice_segmentation_enabled_flag, slice id, gsh_entropy_continuation_flag, gsh_prev_slice_id, context_reuse_flag, num_context_reuse_minus1, subsequent slice_id, dependent_neighbour_enabled_flag, num_neighbour_slice, neighbour_slice_id, neighbour_occupancy_type, ash_continuation_flag, ash_prev_slice_id. For details of each field mentioned above, reference will be made to the description of FIGS. 27 to 41, and detailed description of the fields will be omitted.

In another embodiment, the sub-bitstream generator 60040 may segment each bitstream, generate slice related information (or layering structure information) indicating segmentation processing, and transmit the slice related information to the metadata generator 60030. The metadata generator 60030 may receive information indicating geometry encoding processing and attribute encoding processing from the encoders 60010 and 60020, and generate metadata (parameters).

According to embodiments, the sub-bitstream generator 60040 performs a slice segmentation operation based on the slice related information and/or buffer related information provided by the metadata generator 60030 in order to transmit multiple sub-bitstreams segmented from a geometry bitstream through multiple slices. In addition, the sub-bitstream generator 60040 performs the slice segmentation operation based on the slice related information and/or buffer related information provided by the metadata generator 60030 in order to transmit multiple sub-bitstreams segmented from an attribute bitstream through multiple slices. That is, each of the geometry bitstream (or geometry data) and the attribute bitstream (or attribute data) may be transmitted through multiple slices. Accordingly, the reception device may perform selective decoding or parallel decoding.

According to embodiments, multiple slices containing the geometry data may be transmitted first, and then multiple slices containing the attribute data may be transmitted. For details, reference will be made to the description of FIG. 23 and description of the details will be omitted herein.

According to other embodiments, slices of the geometry data and slices of the attribute data may be transmitted according to layers. For details, reference will be made to the description of FIG. 24 and description of the details will be omitted herein.

According to embodiments, the multiple slices may be independent of each other or may have a dependency relationship with each other. According to embodiments, for octree-based geometry coding, compression performance may be enhanced by sequentially and cumulatively using context information about previous nodes. In addition, in neighbor search and intra prediction, decoded occupancy information about a neighbor (or peripheral) node is first used. In this case, information about the previous slice may be used. Alternatively, the information about the preceding slice may be used for parallel processing. In this case, dependency between slices occurs. In another embodiment, at least one slice may be independent without a relation to another slice. For details of the slice having a dependency and/or an independent slice, reference will be made to the description of FIGS. 20 to 25, and description of the details will be omitted herein.

According to embodiments, when data (e.g., geometry data or attribute data) belonging to each slice is encoded by the encoder, a context is generated for each slice. In this regard, when the context is continuously used, it is necessary to control the context buffer of the reception device. According to embodiments, details about the context buffer control have been described with reference to FIGS. 25A to 26D, and thus description thereof will be omitted. Also, signaling information (e.g., slice related information and/or buffer control related information) for control of the context buffer of the reception device has been described with reference to FIGS. 27 to 41, and thus description thereof will omitted herein.

The multiplexer 60060 multiplexes the multiple segments output from the sub-bitstream generator 60040 and the signaling information generated by the metadata generator 60050 and outputs multiplexed data to the transmitter 60070. Multiplexing of the multiplexer 60050 may be performed for each layer. For details of the slice related information and/or buffer control related information generated by the metadata generator 60030, refer to FIGS. 27 to 48.

The transmitter 60060 according to the embodiments transmits the data (or a bitstream in slices) multiplexed by the multiplexer 60050. The bitstream according to the embodiments may be encapsulated in a file or segment (e.g., a streaming segment) and transmitted over various networks such as a broadcasting network and/or a broadband network. Although not shown in the figure, the transmitter 60060 may include an encapsulator (or an encapsulation module) configured to perform an encapsulation operation.

FIG. 43 shows a structure of a point cloud reception device according to embodiments.

The reception device according to the embodiments of FIG. 43 corresponds to the reception device 10004, the receiver 10005 of FIG. 1, the point cloud video decoder 10006 of FIG. 1, the transmission 20002/decoding 20003/rendering 20004 of FIG. 2, the decoder of FIG. 10, the decoder of FIG. 11, the reception device of FIG. 13, the device of FIG. 14, and the like. Each component of FIG. 43 may correspond to hardware, software, a processor, and/or a combination thereof.

The decoder/receiver according to the embodiments operates as follows.

When a bitstream is input to a receiver 65010 of the reception device, the receiver 65010 outputs a bitstream to a demultiplexer 65020, and the demultiplexer 65020 divides the bitstream into a bitstream including geometry information and attribute information, signaling information including slice related information and/or buffer control related information.

The bitstream including the divided geometry information and attribute information is output to a sub-bitstream classifier 65040, and the divided signaling information is output to the metadata parser 65030.

The sub-bitstream classifier 65040 processes the bitstream including the geometry information and the attribute information based on information in the header of each of the one or more slices, and/or the slice related information, and/or the buffer control related information. Then, it outputs the bitstream (or sub-bitstream) including the geometry information to a geometry decoder 65060, and outputs the bitstream (or sub-bitstream) including the attribute information to an attribute decoder 65080.

Alternatively, in this process, a layer required by the receiver may be selected. Geometry data and attribute data may be reconstructed from the classified bitstream according to the characteristics of the data by the geometry decoder 65060 and the attribute decoder 65080, respectively, and may then be converted into a format for final output by the renderer 65090.

According to embodiments, the sub-bitstream classifier may classify/select a bitstream based on the metadata (e.g., slice related information and/or buffer control related information) acquired by the metadata parser 65030.

The slice related information and/or buffer control related information may be received through at least one of the SPS, GPS, TPS, APS, geometry slice header, attribute slice header, or SEI message. The slice related information and/or buffer control related information may include one or more of the fields sps_entropy_continuation_enabled_flag, geom_slice_segmentation_enabled_flag, attr_slice_segmentation_enabled_flag, slice_id, gsh_entropy_continuation_flag, gsh_prev_slice_id, context_reuse_flag, num_context_reuse_minus1, subsequent slice id, dependent_neighbour_enabled_flag, num_neighbour_slice, neighbour_slice_id, neighbour_occupancy_type, ash_continuation flag, and ash_prev_slice_id. For details of each field mentioned above, reference will be made to the description of FIGS. 27 to 41, and detailed description of the fields will be omitted.

According to embodiments, the point cloud data includes position (i.e., geometry) information about each point and attribute information such as color/brightness/reflectance, which are compressed and transmitted to the reception device. In this regard, in order to allow the reception device to decode or represent only a part of the point cloud data according to the performance of the reception device or the transmission speed, the transmission device may divide the point cloud data (or the coded bitstream) into multiple slices. Then, multiple slices are signaled and dependencies between the slices are defined. Thereby, the current slice uses information generated in the previous slice. In this case, the buffer of the reception device needs to be controlled.

According to embodiments, the geometry decoder 60060 may control the geometry buffer 65050 based on the slice related information and/or buffer control related information provided from the metadata parser 65030. According to an embodiment, the geometry buffer 65050 may be the context buffer described with reference to FIGS. 25A to 26E. For example, when the geometry context of the current slice is used in a subsequent slice, the geometry context of the current slice is stored in the geometry buffer 65050 and matched. The stored information may be used until the context counter (e.g., N or num_reuse_minus1) becomes 0 or when a matching subsequent slice identifier (slice id) is received. Alternatively, when neighbor node information (e.g., dependent_neighbour_enabled_flag==1) is used as described with reference to FIGS. 26A to 26D, the node information may be stored in the geometry buffer 65050 and used when necessary. For details the management (or control) of the geometry buffer 65050, reference will be made to FIGS. 25A to 25E and FIG. 41, and a description of the details will be omitted herein.

According to embodiments, the attribute decoder 60680 may control the attribute buffer 65070 based on the slice related information and/or buffer control related information provided from the metadata parser 65030. According to an embodiment, the attribute buffer 65070 may be the context buffer described with reference to FIGS. 25A to 26D. For details the management (or control) of the attribute buffer 65070, reference will be made to FIGS. 25A to 25E and FIG. 41, and a description of the details will be omitted herein.

As described above, for efficient management of the buffer (or context buffer) of the reception device, signaling may be provided to indicate whether coding information/node information (e.g., slice related information and/or buffer control related information) about the current slice is used in a subsequent slice, and storage and deletion of the context of the current slice in the buffer may be managed based on the indication. Thereby, the buffer of the receiver may be efficiently managed. That is, even when the transmission device divides the point cloud data into multiple slices and transmits the same, the compression efficiency may be enhanced by allowing continuous coding information and/or neighbor node information to be used. In addition, since the reception device is allowed to recognize whether coding information/node information (e.g., slice related information and/or buffer control related information) about the current slice is used in a subsequent slice, buffer management may be efficiently performed. For example, the reception device may efficiently manage resources by predetermining whether the context of the current slice is used in a subsequent slice.

A point cloud data transmission method, a point cloud data transmission device, a point cloud data reception method, and a point cloud data reception device according to embodiments may provide a good-quality point cloud service.

A point cloud data transmission method, a point cloud data transmission device, a point cloud data reception method, and a point cloud data reception device according to embodiments may achieve various video codec methods.

A point cloud data transmission method, a point cloud data transmission device, a point cloud data reception method, and a point cloud data reception device according to embodiments may provide universal point cloud content such as an autonomous driving service.

A point cloud data transmission method, a point cloud data transmission device, a point cloud data reception method, and a point cloud data reception device according to embodiments may perform space-adaptive partition of point cloud data for independent encoding and decoding of the point cloud data, thereby improving parallel processing and providing scalability.

A point cloud data transmission method, a point cloud data transmission device, a point cloud data reception method, and a point cloud data reception device according to embodiments may perform encoding and decoding by partitioning the point cloud data in units of tiles and/or slices, and signal necessary data therefor, thereby improving encoding and decoding performance of the point cloud.

For the point cloud data, a point cloud data transmission method, a point cloud data transmission device, a point cloud data reception method, and a point cloud data reception device according to embodiments may divide and transmit compressed data according to a predetermined criterion. In addition, when layered coding is used, the compressed data may be divided and transmitted according to layers. Accordingly, the storage and transmission efficiency of the transmission device may be increased.

With a point cloud data transmission method, a point cloud data transmission device, a point cloud data reception method, and a point cloud data reception device according to embodiments, when a bitstream is divided and transmitted in slices, the receiver may selectively deliver the bitstream to the decoder according to the density of the point cloud data to be represented according to decoder performance or application field. In this case, since selection is made before decoding, decoder efficiency may be increased, and decoders of various performances may be supported.

With a point cloud data transmission method, a point cloud data transmission device, a point cloud data reception method, and a point cloud data reception device according to embodiments, signaling may be provided to indicate whether coding information/node information about the current slice is used in a subsequent slice, and storage and deletion of the context of the current slice in the buffer may be managed based on the indication for efficient management of the buffer (or context buffer) of the reception device. Thereby, the buffer of the receiver may be efficiently managed. That is, even when the transmission device divides the point cloud data into multiple slices and transmits the same, the compression efficiency may be enhanced by allowing continuous coding information and/or neighbor node information to be used. In addition, since the reception device is allowed to recognize whether coding information/node information about the current slice is used in a subsequent slice, buffer management may be efficiently performed. For example, the receiver may efficiently manage resources by predetermining whether the context of the current slice is used in a subsequent slice.

Each part, module, or unit described above may be a software, processor, or hardware part that executes successive procedures stored in a memory (or storage unit). Each of the steps described in the above embodiments may be performed by a processor, software, or hardware parts. Each module/block/unit described in the above embodiments may operate as a processor, software, or hardware. In addition, the methods presented by the embodiments may be executed as code. This code may be written on a processor readable storage medium and thus read by a processor provided by an apparatus.

In the specification, when a part "comprises" or "includes" an element, it means that the part further comprises or includes another element unless otherwise mentioned. Also, the term " . . . module(or unit)" disclosed in the specification means a unit for processing at least one function or operation, and may be implemented by hardware, software or combination of hardware and software.

Although embodiments have been explained with reference to each of the accompanying drawings for simplicity, it is possible to design new embodiments by merging the embodiments illustrated in the accompanying drawings. If a recording medium readable by a computer, in which programs for executing the embodiments mentioned in the foregoing description are recorded, is designed by those skilled in the art, it may fall within the scope of the appended claims and their equivalents.

The apparatuses and methods may not be limited by the configurations and methods of the embodiments described above. The embodiments described above may be configured by being selectively combined with one another entirely or in part to enable various modifications.

Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the apparatuses of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the apparatus according to the embodiments may include one or more processors capable of executing one or more programs. The one or more programs may perform any one or more of the operations/methods according to the embodiments or include instructions for performing the same. Executable instructions for performing the method/operations of the apparatus according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this document, the term "/" and "," should be interpreted as indicating "and/or." For instance, the expression "A/B" may mean "A and/or B." Further, "A, B" may mean "A and/or B." Further, "A/B/C" may mean "at least one of A, B, and/or C." "A, B, C" may also mean "at least one of A, B, and/or C." Further, in the document, the term "or" should be interpreted as "and/or." For instance, the expression "A or B" may mean 1) only A, 2) only B, and/or 3) both A and B. In other words, the term "or" in this document should be interpreted as "additionally or alternatively."

Various elements of the embodiments may be implemented by hardware, software, firmware, or a combination thereof. Various elements in the embodiments may be implemented by a single chip, for example, a single hardware circuit. Optionally, the components may be implemented as separate chips, respectively. According to embodiments, at least one of the components according to the embodiments may be implemented in one or more processors including instructions for performing operations according to embodiments.

In addition, the operations according to the embodiments described in the present disclosure may be performed by a transmission/reception device including one or more memories and/or one or more processors according to embodiments. The one or more memories may store programs for processing/controlling operations according to embodiments. The one or more processors may control various operations described in the present disclosure. The one or more processors may be referred to as controllers or the like. The operations according to the embodiments may be performed by firmware, software, and/or a combination thereof. The firmware, software, and/or a combination thereof may be stored in a processor or a memory.

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signal unless context clearly dictates otherwise.

The terminology used to describe the embodiments is used for the purpose of describing particular embodiments only and is not intended to be limiting of the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted, when a specific condition is satisfied, to perform the related operation or interpret the related definition according to the specific condition.

Embodiments may include variations/modifications within the scope of the claims and their equivalents.

It will be apparent to those skilled in the art that various modifications and variations can be made in the present invention without departing from the spirit and scope of the invention. Thus, it is intended that the present invention cover the modifications and variations of this invention provided they come within the scope of the appended claims and their equivalents.

What is claimed is:

1. A method of transmitting point cloud data, the method comprising:
   encoding geometry data of the point cloud data;
   encoding attribute data of the point cloud data based on the geometry data; and
   transmitting the encoded geometry data, the encoded attribute data, and signaling data,
   wherein the encoded geometry data is included in a plurality of slices,
   wherein the signaling data includes slice related information and buffer control related information,
   wherein the buffer control related information includes flag information indicating whether or not a context of a current slice is referenced by at least one other slice, and
   wherein the context of the current slice is not stored in a buffer of a receiving system for at least one other slice based on the flag information indicating that the context of the current slice is not referenced by the at least one other slice.

2. The method of claim 1,
   wherein the context of the current slice is stored in the buffer of the receiving system for decoding the at least one other slice based on the flag information indicating that the context of the current slice is referenced by the at least one other slice.

3. The method of claim 1,
   wherein the buffer control related information further includes information identifying a number of times the context of the current slice is referenced based on the context of the current slice being referenced by the at least one other slice.

4. An apparatus for transmitting point cloud data, the apparatus comprising:
   a geometry encoder configured to encode geometry data of the point cloud data;
   an attribute encoder configured to encode attribute data of the point cloud data based on the geometry data; and
   a transmitter configured to transmit the encoded geometry data, the encoded attribute data, and signaling data,
   wherein the encoded geometry data is included in a plurality of slices,
   wherein the signaling data includes slice related information and buffer control related information,
   wherein the buffer control related information includes flag information indicating whether or not a context of a current slice is referenced by at least one other slice, and
   wherein the context of the current slice is not stored in a buffer of a receiving system for at least one other slice based on the flag information indicating that the context of the current slice is not referenced by the at least one other slice.

5. The apparatus of claim 4,
   wherein the context of the current slice is stored in the buffer of the receiving system for decoding the at least one other slice based on the flag information indicating that the context of the current slice is referenced by the at least one other slice.

6. The apparatus of claim 4, wherein the buffer control related information further includes information identifying a number of times the context of the current slice is referenced based on the context of the current slice being referenced by the at least one other slice.

7. A method of receiving point cloud data, the method comprising:
receiving geometry data, attribute data, and signaling data;
decoding the geometry data based on the signaling data;
decoding the attribute data based on the signaling data and the decoded geometry data; and
rendering the point cloud data based on the signaling data, the decoded geometry data, and the decoded attribute data,
wherein the geometry data is included in a plurality of slices,
wherein the signaling data includes slice related information and buffer control related information,
wherein the buffer control related information includes flag information indicating whether or not a context of a current slice is referenced by at least one other slice, and
wherein, based on the flag information indicating that the context of the current slice is not referenced by the at least one other slice, the context of the current slice is not stored in a buffer for at least one other slice.

8. The method of claim 7,
wherein the buffer control related information further includes information identifying a number of times the context of the current slice is referenced based on the context of the current slice being referenced by the at least one other slice.

9. The method of claim 7,
wherein, based on the flag information indicating that the context of the current slice is referenced by the at least one other slice, the context of the current slice is stored in the buffer for decoding the at least one other slice.

10. An apparatus for receiving point cloud data, the apparatus comprising:
a receiver configured to receive geometry data, attribute data, and signaling data;
a geometry decoder configured to decode the geometry data based on the signaling data;
an attribute decoder configured to decode the attribute data based on the signaling data and the decoded geometry data; and
a renderer configured to render the point cloud data based on the signaling data, the decoded geometry data, and the decoded attribute data,
wherein the geometry data is included in a plurality of slices,
wherein the signaling data includes slice related information and buffer control related information,
wherein the buffer control related information includes flag information indicating whether or not a context of a current slice is referenced by at least one other slice, and
wherein, based on the flag information indicating that the context of the current slice is not referenced by the at least one other slice, the context of the current slice is not stored in a buffer for at least one other slice.

11. The apparatus of claim 10,
wherein the buffer control related information further includes information identifying a number of times the context of the current slice is referenced based on the context of the current slice being referenced by the at least one other slice.

12. The apparatus of claim 10,
wherein, based on the flag information indicating that the context of the current slice is referenced by the at least one other slice, the context of the current slice is stored in the buffer for decoding the at least one other slice.

* * * * *